(12) United States Patent
Kozuka et al.

(10) Patent No.: US 12,413,808 B2
(45) Date of Patent: Sep. 9, 2025

(54) VIDEO DISPLAY SYSTEM, INFORMATION PROCESSING METHOD, AND RECORDING MEDIUM

(71) Applicant: Panasonic Intellectual Property Management Co., Ltd., Osaka (JP)

(72) Inventors: Masayuki Kozuka, Tokyo (JP); Yoshihiro Mori, Osaka (JP); Junya Suzuki, Kyoto (JP); Yoshiichiro Kashiwagi, Kyoto (JP); Yasutoshi Yamamoto, Osaka (JP); Toshiro Nishio, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 18/286,346

(22) PCT Filed: Apr. 18, 2022

(86) PCT No.: PCT/JP2022/018086
§ 371 (c)(1),
(2) Date: Oct. 10, 2023

(87) PCT Pub. No.: WO2022/220305
PCT Pub. Date: Oct. 20, 2022

(65) Prior Publication Data
US 2025/0085543 A1    Mar. 13, 2025

Related U.S. Application Data

(60) Provisional application No. 63/176,004, filed on Apr. 16, 2021.

(51) Int. Cl.
*H04N 21/431* (2011.01)
*G02B 27/01* (2006.01)
(Continued)

(52) U.S. Cl.
CPC ..... *H04N 21/4316* (2013.01); *G02B 27/0172* (2013.01); *G06F 3/011* (2013.01);
(Continued)

(58) Field of Classification Search
CPC ........ G06F 3/011; G02B 27/0172; G09G 5/36
See application file for complete search history.

(56) References Cited

U.S. PATENT DOCUMENTS 9,794,514 B1    10/2017 Yoakum
9,911,238 B2     3/2018 Doronichev et al.
(Continued)

FOREIGN PATENT DOCUMENTS

CA    3032295 A1    2/2018
EP    3793259 A1    3/2021
(Continued)

OTHER PUBLICATIONS

Extended European Search Report dated Aug. 27, 2024 issued in the corresponding European Patent Application No. 22788231.3.
(Continued)

*Primary Examiner* — Muhammad N Edun
(74) *Attorney, Agent, or Firm* — Rimon P.C.

(57) ABSTRACT

A video display system includes: an observation device, a data obtainment unit that obtains data related to a movement direction of the capturing unit, and a metadata composition unit that obtains metadata based on the obtained data; and a VR device including: a reception unit that receives the metadata; an orientation estimation unit that estimates an orientation of the display device; a differential calculation unit that calculates a relative movement direction of the capturing unit based on a difference between the orientation of the display device and the movement direction of the capturing unit in the metadata; a presentation unit that presents the calculated relative movement direction to a user
(Continued)

of a display device; a video generation unit that generates a display video; and a VR device including a display device that displays the display video.

17 Claims, 44 Drawing Sheets

(51) Int. Cl.
    *G06F 3/01*     (2006.01)
    *G06F 40/58*     (2020.01)
    *G06T 5/50*     (2006.01)
    *G06T 7/20*     (2017.01)
    *G06T 15/00*     (2011.01)
    *G06T 17/00*     (2006.01)
    *G09G 5/36*     (2006.01)
    *H04N 21/218*     (2011.01)
    *H04N 21/235*     (2011.01)
    *H04N 21/439*     (2011.01)
    *H04N 21/472*     (2011.01)
    *H04N 21/4788*     (2011.01)
    *H04N 21/81*     (2011.01)

(52) U.S. Cl.
    CPC .............. *G06F 3/013* (2013.01); *G06F 40/58* (2020.01); *G06T 5/50* (2013.01); *G06T 7/20* (2013.01); *G06T 15/00* (2013.01); *G06T 17/00* (2013.01); *G09G 5/36* (2013.01); *H04N 21/21805* (2013.01); *H04N 21/2353* (2013.01); *H04N 21/439* (2013.01); *H04N 21/472* (2013.01); *H04N 21/4788* (2013.01); *H04N 21/8106* (2013.01); *H04N 21/816* (2013.01); *G06T 2207/20221* (2013.01)

(56) References Cited

U.S. PATENT DOCUMENTS

| | | | |
|---|---|---|---|
| 2013/0038692 A1 | 2/2013 | Ohtomo et al. | |
| 2016/0117853 A1 | 4/2016 | Zhong et al. | |
| 2016/0300392 A1 | 10/2016 | Jonczyk et al. | |
| 2017/0061231 A1 | 3/2017 | Higa | |
| 2017/0142486 A1 | 5/2017 | Masuda | |
| 2017/0329144 A1 | 11/2017 | Usami | |
| 2018/0196425 A1 | 7/2018 | Kobayashi | |
| 2018/0249148 A1* | 8/2018 | Roulet | H04N 23/698 |
| 2019/0052838 A1* | 2/2019 | Ashkenazi | G06T 7/70 |
| 2019/0139430 A1 | 5/2019 | Ghatage et al. | |
| 2019/0266424 A1 | 8/2019 | Nishimura et al. | |
| 2020/0160740 A1 | 5/2020 | Nedivi | |
| 2020/0218072 A1 | 7/2020 | Inatani et al. | |
| 2020/0341714 A1 | 10/2020 | Yuasa et al. | |
| 2020/0363866 A1 | 11/2020 | Gerard et al. | |
| 2021/0225017 A1* | 7/2021 | Holzer | G06T 7/75 |

FOREIGN PATENT DOCUMENTS

| | | |
|---|---|---|
| JP | 2002-169901 A | 6/2002 |
| JP | 2007-207260 A | 8/2007 |
| JP | 2012-010418 A | 1/2012 |
| JP | 2013-038622 A | 2/2013 |
| JP | 2015-005967 A | 1/2015 |
| JP | 2016-090773 A | 5/2016 |
| JP | 2018-112809 A | 7/2018 |
| JP | 2019-503612 A | 2/2019 |
| JP | 2019-036025 A | 3/2019 |
| JP | 2019-075075 A | 5/2019 |
| JP | 2019-149016 A | 9/2019 |
| JP | 2019-164216 A | 9/2019 |
| JP | 2019-195169 A | 11/2019 |
| JP | 2019-197939 A | 11/2019 |
| JP | 6727388 B2 | 7/2020 |
| JP | 2020-120388 A | 8/2020 |
| JP | 2020-176995 A | 10/2020 |
| WO | 2015/170461 A1 | 11/2015 |
| WO | 2016/009864 A1 | 1/2016 |
| WO | 2017/108668 A1 | 6/2017 |
| WO | 2019/150675 A1 | 8/2019 |
| WO | 2020/116493 A1 | 6/2020 |

OTHER PUBLICATIONS

Extended European Search Report dated Sep. 10, 2024 issued in the corresponding European Patent Application No. 22788228.9.
Extended European Search Report dated Sep. 12, 2024 issued in the corresponding European Patent Application No. 22788230.5.
Extended European Search Report dated Sep. 18, 2024 issued in the corresponding European Patent Application No. 22788229.7.
International Search Report issued on Jun. 28, 2022 in International Patent Application No. PCT/JP2022/018086, with English translation.
International Search Report issued on Jul. 5, 2022 in International Patent Application No. PCT/JP2022/018087, with English translation.
International Search Report issued on Jul. 5, 2022 in International Patent Application No. PCT/JP2022/018088, with English translation.
International Search Report issued on Jun. 28, 2022 in International Patent Application No. PCT/JP2022/018089, with English translation.
Office Action dated Dec. 24, 2024 issued in the corresponding Japanese Patent Application No. 2023-514694, w/ English Translation.
Office Action dated Jan. 3, 2025 issued in the corresponding U.S. Appl. No. 18/286,357.

* cited by examiner (L)　　　　　　　　　　(R)

FIG. 36

| Type | Data configuration | Comments |
|---|---|---|
| Metadata type | | Code indicating for VR use |
| Version number | | Version of metadata in question |
| Function code | 0 or 0001 | Reset, indicate invalid (0), or indicate data structure (0001) |
| Reference position | X, Y, Z or latitude, longitude, altitude | If 0 or particular pattern, position at time of reset is used as reference value |
| Camera position | X, Y, Z or latitude, longitude, altitude | Absolute coordinates or relative coordinates from reference-based coordinates |
| Guide position | Horizontal rotation angle, elevation angle, horizontal distance, or X, Y, Z | Relative position from position in front of camera |
| Movement direction, speed | Direction (orientation) of movement, speed | Direction from front of camera or orientation with north as front, speed is absolute value of speed or speed in X,Y and orientation or direction from front of camera |
| Target count | n | No target when 0 |
| Position of target (1) | Horizontal rotation angle, elevation angle, horizontal distance, or X, Y, Z | Relative position from position in front of camera |
| Position of target (2) | Horizontal rotation angle, elevation angle, horizontal distance, or X, Y, Z | Relative position from position in front of camera |
| ⋮ | ⋮ | |
| Position of target (n) | Horizontal rotation angle, elevation angle, horizontal distance, or X, Y, Z | Relative position from position in front of camera |
| Verification code | | Code such as CRC for checking metadata consistency |

FIG. 44

| Type | Data configuration | Comments |
|---|---|---|
| Metadata type | | Code indicating for VR use |
| Version number | | Version of metadata in question |
| Function code | 0 or 0002 | Code indicating graphics data (0002) |
| Blend information | Color information such as RGB information, blend coefficient | When blend information for blending a background video is to be used to blend on a per-pixel basis, the blend information is a per-pixel blend coefficient like alpha plane information, and prepended blend type and blend information size is required. |
| Graphic size | X, Y pixel values | |
| Graphic display position mode | [0th bit] 0: changeable on VR system side; 1: not changeable by VR system [1st bit] 0: position in VR space; 1: position of VR video | Bit assign |
| Graphics data display position | If position in VR space: X, Y, Z or latitude, longitude, altitude If position in VR video: X, Y or angle | If it is a position within VR space, it is a relative position from position of camera or guide |
| Graphics data type | | e.g., JPEG or PNG |
| Graphics data size | | Bytes |
| Graphics data | | Data corresponding to the type |
| Verification code | | Code such as CRC for checking metadata consistency |

FIG. 45

| Type | Data configuration | Comments |
|---|---|---|
| Metadata type | | Code indicating for VR use |
| Version number | | Version of metadata in question |
| Function code | 0 or 0003 | Code indicating metadata from VR system (0003) |
| VR system ID | | Number indicating which VR system it is. Specified by specific metadata from observation system or cloud when connected |
| VR system state | | Indicates whether VR system is in use, the state of the battery, whether a controller is connected, etc. |
| Reference position | X, Y, Z or latitude, longitude, altitude | If 0 or particular pattern, position at time of reset is used as reference value |
| VR system position | X, Y, Z or latitude, longitude, altitude | Relative position from absolute coordinates or reference position |
| Controller state | | Indicates state of button or keypad. 0 indicates nothing is being operated. |
| Verification code | | Code such as CRC for checking metadata consistency |

VIDEO DISPLAY SYSTEM, INFORMATION PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2022/018086, filed on Apr. 18, 2022, which in turn claims the benefit of U.S. Provisional Patent Application No. 63/176,004, filed on Apr. 16, 2021, the entire disclosures of which Applications are incorporated by reference herein.

TECHNICAL FIELD

The present disclosure relates to a video display system, an information processing method, and a recording medium.

BACKGROUND ART

In recent years, there has been much development of display devices that are worn on the head, commonly known as head-mounted displays. For example, Patent Literature (PTL) 1 discloses a head-mounted display that can present (i.e., display) video of content and video of the outside world. In the head-mounted display disclosed in PTL 1, the luminance of at least one of the video of content or the video of the outside world is adjusted to reduce the discomfort of the user when switching between the video of content and the video of the outside world.

CITATION LIST

Patent Literature

[PTL 1] Japanese Unexamined Patent Application Publication No. 2016-090773

SUMMARY OF INVENTION

Technical Problem

There are applications for display devices such as head-mounted displays that take advantage of their highly immersive nature, such as simulating an experience at a certain location by viewing video from a remote location. In such cases, the display device is required to provide appropriate video.

The present disclosure has been conceived in view of the above, and has an object to provide a video display system and the like that are capable of displaying appropriate video.

Solution to Problem

In order to achieve the above object, a video display system according to one aspect of the present disclosure is for displaying a display video via a display device, and includes: an observation device including a capturing unit configured to capture a wide-angle video, a data obtainment unit configured to obtain data related to a movement direction of the capturing unit, a metadata composition unit configured to obtain metadata based on the data obtained, and a transmission unit configured to transmit, together with the metadata, the wide-angle video captured; and a VR device including: a reception unit configured to receive the wide-angle video and the metadata; an orientation estimation unit configured to estimate an orientation of the display device; a differential calculation unit configured to calculate a relative movement direction based on a difference between the orientation of the display device estimated and the movement direction of the capturing unit in the metadata, the relative movement direction being a movement direction of the capturing unit relative to the orientation of the display device; a presentation unit configured to present the relative movement direction calculated to a user of the display device; a video generation unit configured to generate, from the wide-angle video received, the display video including a portion corresponding to a viewing area corresponding to the orientation of the display device as estimated by the orientation estimation unit; and the display device that displays the display video.

An information processing method according to one aspect of the present disclosure is for displaying a display video on a display device, and includes: receiving metadata based on data related to a movement direction of a capturing unit configured to capture a wide-angle video; and calculating and outputting a relative movement direction based on a difference between an estimated orientation of the display device and the movement direction of the capturing unit in the metadata, the relative movement direction being a movement direction of the capturing unit relative to the orientation of the display device.

General or specific aspects of the present disclosure may be realized as a system, a device, an integrated circuit, a computer program, a computer readable recording medium such as a CD-ROM, or any given combination thereof.

Advantageous Effects of Invention

The present disclosure provides a video display system and the like that are capable of displaying appropriate video.

BRIEF DESCRIPTION OF DRAWINGS

FIG. 36 illustrates an example of the metadata structure according to an implementation example.

FIG. 44 illustrates another example of the metadata structure according to an implementation example.

FIG. 45 illustrates yet another example of the metadata structure according to an implementation example.

DESCRIPTION OF EMBODIMENTS

Knowledge Forming the Basis of Disclosure

Figure 1:
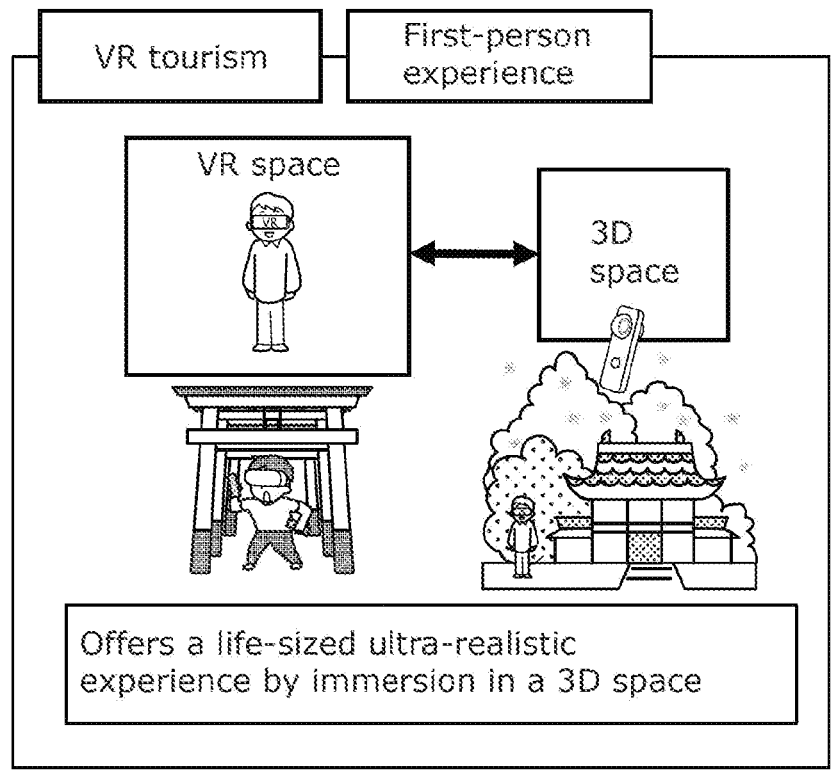
FIG. 1 is for illustrating a conventional example.

In recent years, display devices have been developed that enable a user to wear the display unit on their heads, placed in front of their eyes, and thus view displayed images on a screen that appears to be large. Such a display device is known as a head-mounted display (HMD), and allows images to optically appear as a large screen. Some HMDs also allow the video being viewed to appear three-dimensionally by displaying video with a disparity shift corresponding to the user's right and left eyes. Recent improvements in communication quality have made it possible to view video captured by remotely located observation devices in real time with a delay of only a few to tens of milliseconds, enabling the viewer to experience the scene as if they were there without having to visiting the site. Utilizing this technology, virtual tourism experiences such as sightseeing tours, exhibition tours, inspection tours, factory tours, and visits to art and other types of museums, zoos, and aquariums (hereinafter referred to as "pseudo tourism" or "VR (virtual reality) tourism") have also come about.

Cameras capable of capturing 360-degree (full circle in the horizontal plane) video (also referred to as an omnidirectional camera) are used as observation devices in VR tourism. Video captured by such an observation device has a wide viewing angle, and the display device used by the user is capable of cutting out a portion of the video in any given direction and displaying the cut out portion. For example, if the display device includes a function for detecting the direction in which the user is facing, the display device can cut out and display a portion of the 3D video space in accordance with the user's orientation, making it possible to provide a viewing experience that meets the needs of many users from a video captured by a single camera.

Here, when the user is watching some video in a given direction and the observation device moves, there user may experience some unintended movement in the video. For example, if the observation device moves such that the 3D video space moves to the 12 o'clock orientation while the user is facing 2 o'clock in the 3D video space, the video will suddenly move to the 10 o'clock orientation from the user's perspective. Such movement causes sensory incongruency between the virtual space and the real space, and is one factor that causes user discomfort. This phenomenon, also known as VR sickness, makes it difficult to watch videos for long periods of time.

In view of the above, in order to inhibit such VR sickness, the present disclosure has an object to provide a video display system that can present to the user the direction in which the video moves when the video moves. Although the description in the present disclosure presents an example in which 360-degree wide-angle video is captured by the observation device, a wide-angle video may be, for example, a video captured over 270 degrees, 180 degrees, or 150 degrees, or some other given angular range. The wide-angle video may be at least wider than the angle at which the user views the video displayed on their display device. Although the present disclosure describes a video display system that assumes video movement occurring in the horizontal plane, the present disclosure can also be applied to video movement occurring in an intersecting plane that intersects the horizontal plane, including vertical components.

Hereinafter, conventional video display systems and the like will be described in further detail with reference to the drawings. FIG. 1 is for illustrating a conventional example. As illustrated in FIG. 1, a service called VR tourism (first-person experience) has conventionally been offered. With VR tourism, if a local space is properly reproduced in VR, it is possible to experience tourism as if one were in that location. Examples of services with 360° camera photography include FirstAirlines (https://firstairlines.jp/index.html) and Travel Aid (https://www.tokyotravelpartners.jp/kaigotabisuke-2/). Examples of services with 3D computer graphics (CG) include Google Earth VR and Boulevard (https://www.blvrd.com/).

Figure 2:
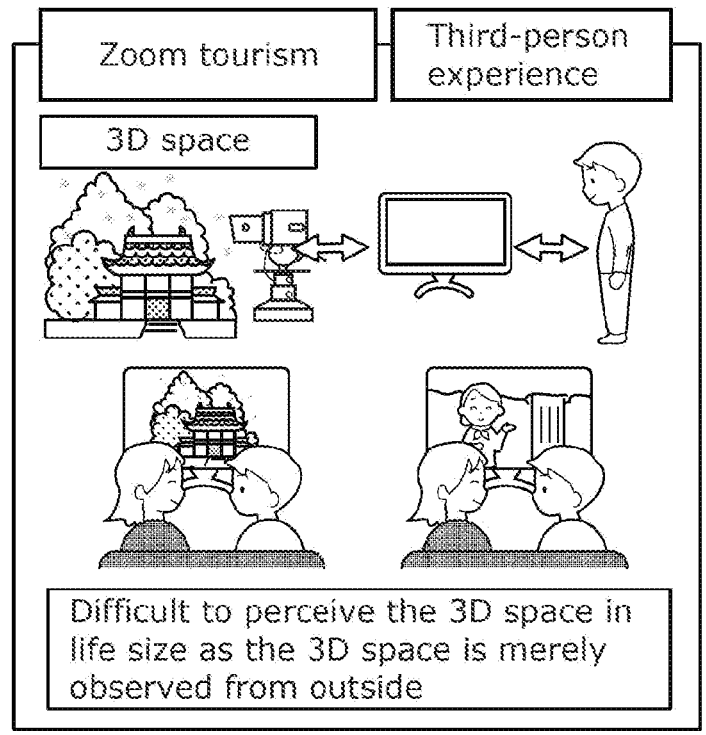
FIG. 2 is for illustrating a conventional example.

FIG. 2 is for illustrating a conventional example. As illustrated in FIG. 2, in addition to VR tourism, other services for viewing such videos from a third-person perspective by displaying videos captured at the site on a display device such as a television (also called third-person experiences) are also offered. A third-person experience offers features such as user-specific services, such as guides by experts, that can be monetized if they fit the individual's interests.

Figure 3:
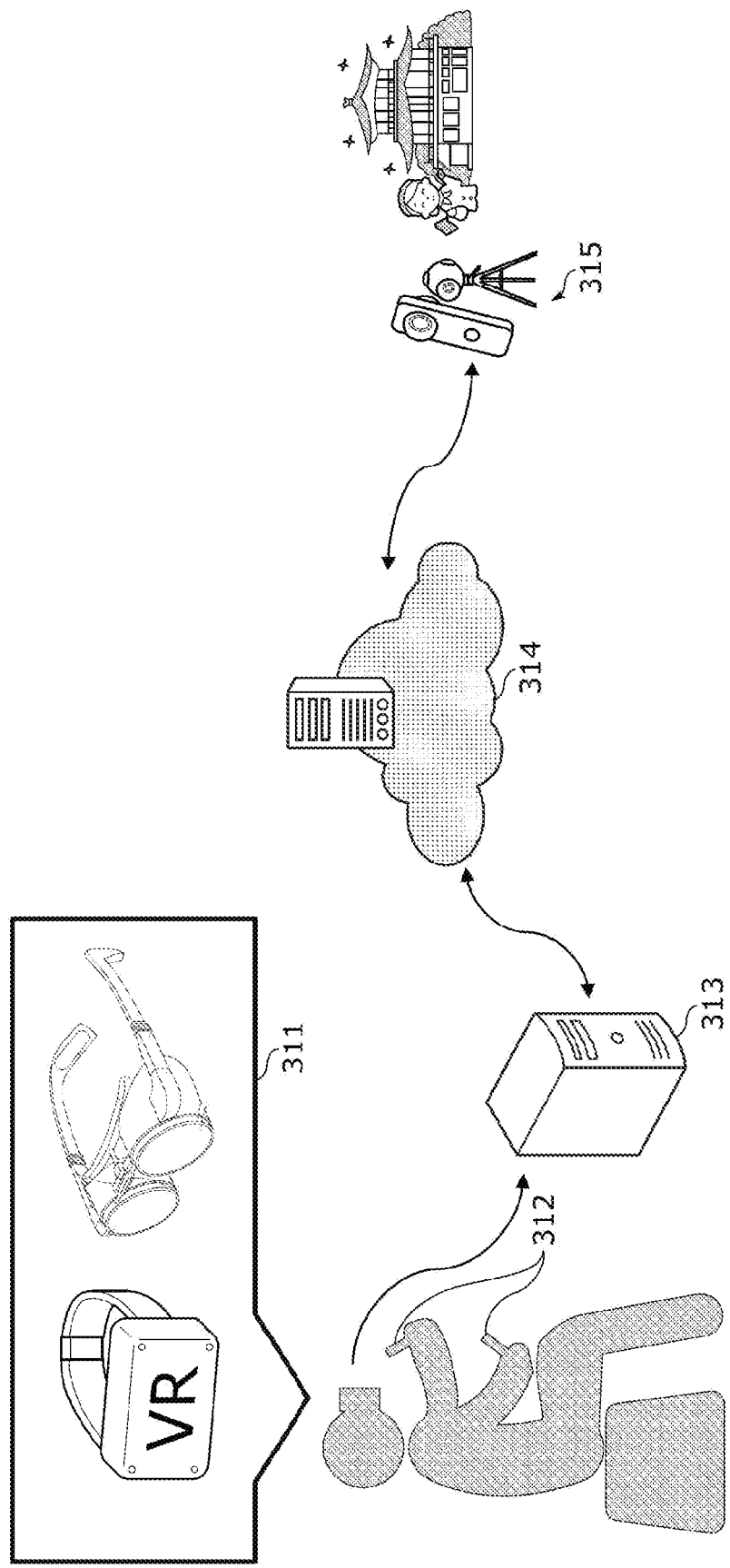
FIG. 3 is for illustrating a conventional example.

FIG. 3 is for illustrating a conventional example. As illustrated in FIG. 3, when developing VR tourism, the basic configuration requires a VR system main unit, a controller, a computer/smartphone, a network/cloud, and an observation system. Conventionally, the VR system main units were solely HMD units, which are heavy and cover the face considerably, but smaller units that are more like glasses are becoming more widespread as they are easier to use for long periods of time. There are two types of VR system main units: the all-in-one type in which the VR system main unit performs all the necessary functions, and the tethered type in which some functions are left to, for example, a computer/smartphone. The controller is used for, for example, menu selection and to move through the VR space. In some cases, the computer/smartphone may include only communication functionality, and in other cases may be a part of the VR system.

The network/cloud connects observation system 315 and VR system 311, and may implement some functions of the observation system or the VR system on a cloud-based computer system 314. The observation system utilizes a 360° camera with wireless capability or a 360°, 180°, or wide-angle camera connected wirelessly or over a wire to a computer or smartphone. Through these devices, users 312 can view the guide and the buildings and scenery to be visited in the VR space.

Although VR tourism utilizing a 360° camera is used as an example here, VR tourism may utilize anything that allows participants using VR glasses to change their viewpoints, such as a 180° camera. Moreover, although some examples include capturing video and providing a guide of actual scenery, sightseeing can also be realized by using a virtual camera in a virtual space constructed using computer graphics instead of actual scenery, by having guides enter such a virtual space using, for example, VR glasses, and by playing videos in the virtual space. Accordingly, the present invention can be applied to such applications. A typical example of the above is VR travel to areas and spaces that are not easily accessible to the average traveler, such as the moon.

Figure 4:
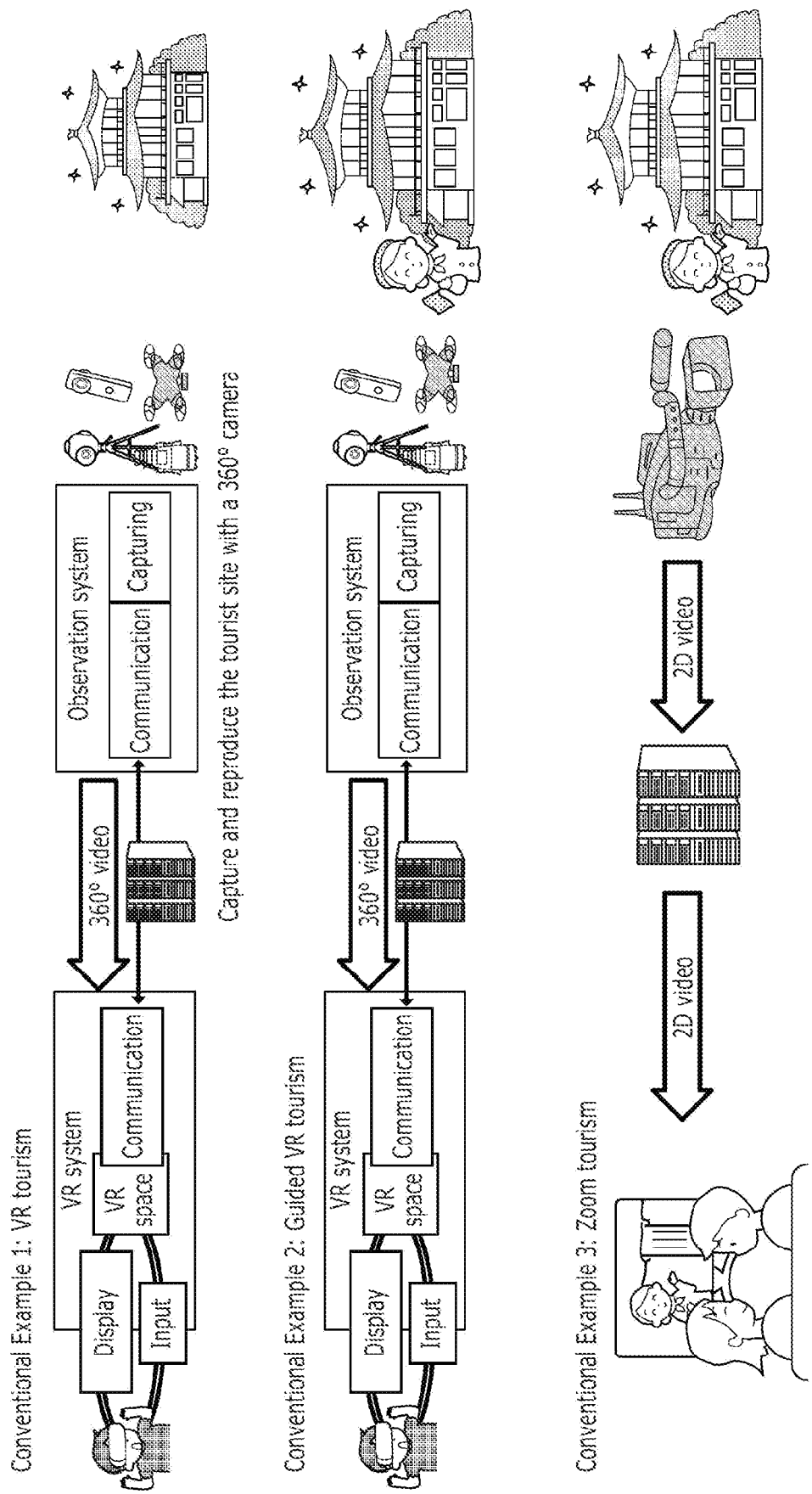
FIG. 4 is for illustrating a conventional example.

FIG. 4 is for illustrating a conventional example. FIG. 4 illustrates a schematic configuration of a VR tourism service utilizing 360° camera photography (upper row: without guide (hereinafter referred to as Conventional Example 1), middle row: with guide (hereinafter referred to as Conventional Example 2)) and a conventional example of a Zoom (registered trademark) sightseeing service, which is one example of a third-person experience (lower row (hereinafter referred to as Conventional Example 3)). In the present invention, audio, audio data, and audio information include not only spoken conversation but also audio signals including music and possibly ultrasonic waves outside the audible bandwidth. In VR tourism services, the observation system (tourism destination) side can send out pre-recorded videos, and the VR system side can operate a 360° camera, robot, or drone to view VR videos on the VR system side. As illustrated in the middle row, it is also possible to have a guide or camera operator on the observation system side and experience the VR video from a 360° camera or the like as VR using the VR system. As illustrated in the lower row, in the third-person experience, 2D video is sent in 2D from the observation system side through an audio visual remote conversation service that a plurality of people participate in such as Zoom, allowing visitors to view and experience video of tourism destinations from a remote location.

Figure 5:
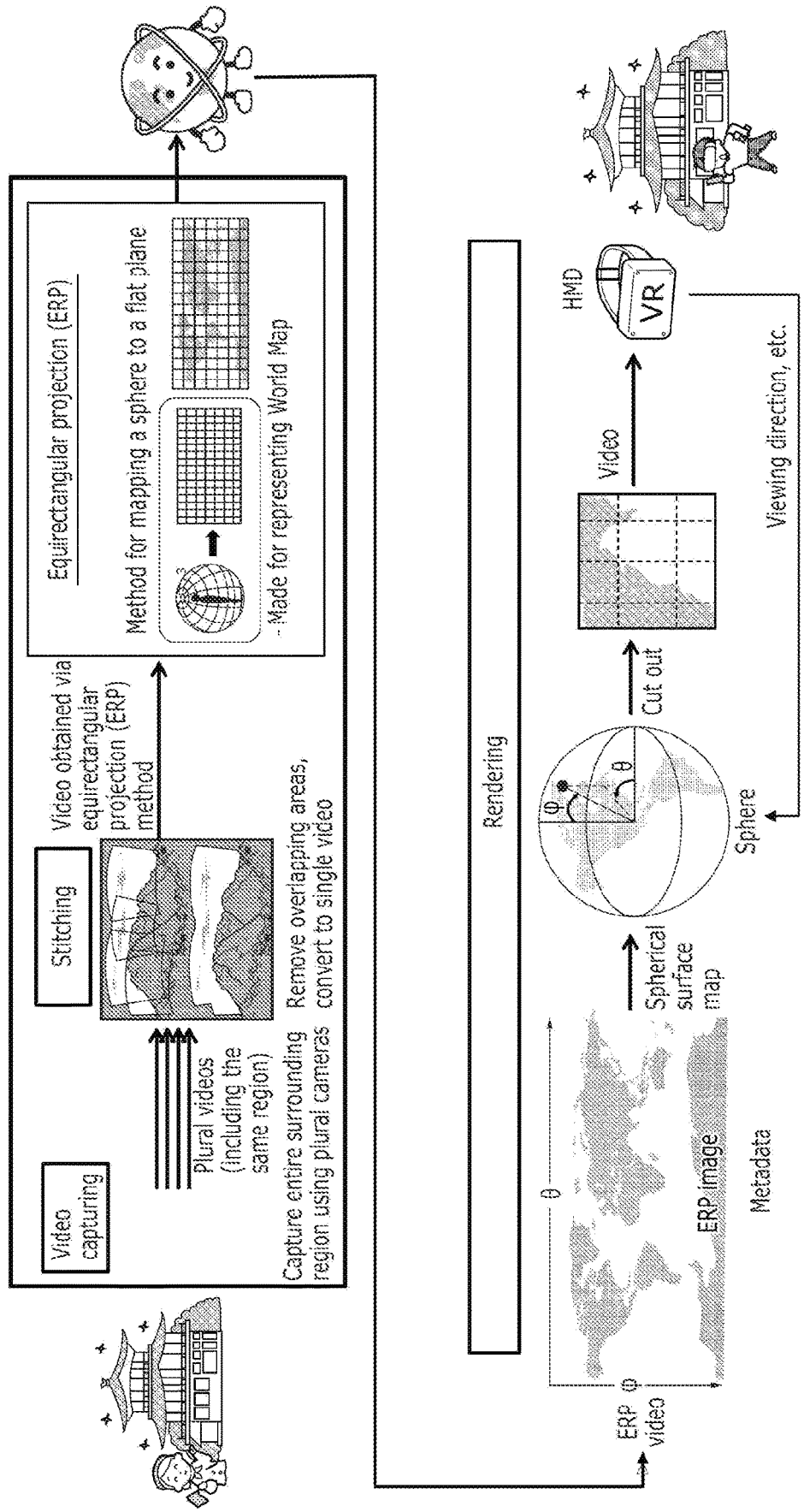
FIG. 5 is for illustrating a conventional example.

FIG. 5 is for illustrating a conventional example. Next, the overall system configuration for Conventional Example 2 will be described. Conventional Example 1 differs from Conventional Example 2 in that a pre-recorded VR video is used or operations are performed from the VR system side, and the differences between the two will also be explained. The observation system according to Conventional Example 2 includes a camera for capturing VR video such as a 360° camera, and a communication device for sending the captured information to a remote location.

The 360° camera for capturing VR video combines (stitches) videos from a plurality of cameras that capture video in different directions into a single video, maps it onto a flat surface using, for example, the equirectangular projection (ERP) method, compresses it appropriately as an ERP image, and sends it along with audio data captured by, for example, a microphone from the communication device to the VR system at the remote location. The 360° camera may be equipped on a robot or a drone, for example. The 360° camera or the robot or drone equipped with the 360° camera is operated by the photographer or guide. In Conventional Example 1, the 360° camera or the robot or drone equipped with the 360° camera may be operated on the VR system side, or the pre-recorded video or the like may be received on the VR system side.

On the VR system side, contrary to the observation system, the received flat video (ERP image) is converted into a spherical video, a portion of the spherical video is cut out according to the observer's orientation and position and then displayed on the VR display device. In Conventional Example 3, the received video is 2D, so it is displayed as 2D, and in most cases, a 2D display device such as a tablet, smartphone, or TV will be used. The above also applies to cases in which pre-recorded video is received in Conventional Example 1.

In cases in which the 360° camera or the robot or drone equipped with the 360° camera is operated on the VR system side, there are instances where the observation system operates in conjunction with the orientation and position from the VR system side or operates according to key presses made via a mouse, a tablet, a joystick, and/or a keyboard, or by menus and icons being selected on a screen. Here, appropriate control data needs to be sent from the VR system side to the observation system and the situation on the observation system side, i.e., the orientation and position on the observation system side needs to be sent to the VR system.

Figure 6:
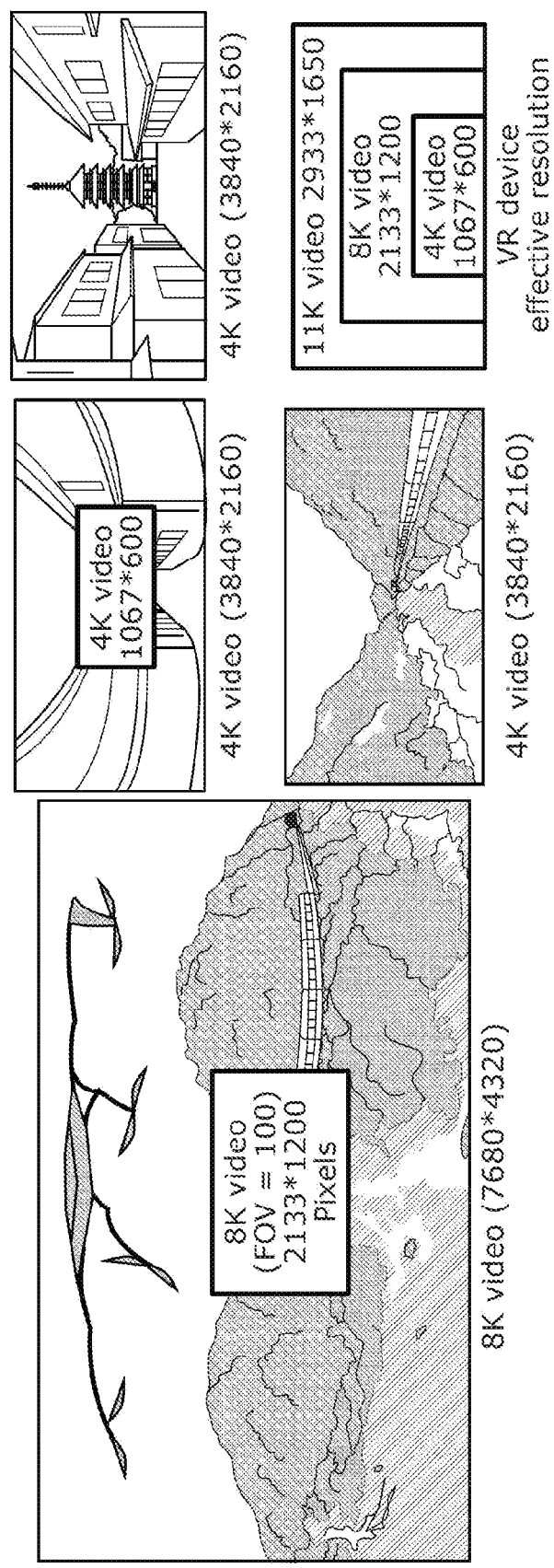
FIG. 6 is for illustrating a conventional example.

FIG. 6 is for illustrating a conventional example. The resolution of a 360° video when viewed on a VR system will be described while comparing and contrasting 360° video and regular video illustrated in FIG. 6. When a 360° 4K video is viewed on VR equipment with a viewing angle (FOV) of 100 degrees, the resolution of the video cut out for VR display is only 1067×600 (about twice that of SD video). Since a VR system using a 2K×2K resolution panel for one eye displays video on a square panel, the vertical direction is further stretched by a factor of two, resulting in a very low resolution video.

The resolution of the VR display for 8K video is 2133×1200, which is 1.23 times the full HD (1920×1080) surface area in terms of data volume, but the vertical direction is stretched by a factor of 2, so the resolution of the video is approximately full HD. For 11K video (10560×5940), the VR resolution is 2933×1650, which is equivalent to the VR system.

In order to provide a high-resolution, highly realistic VR tourism experience, it is necessary to capture at least 8K, preferably 11K. Capturing 8K and 11K requires larger equipment, higher video transfer rates, and greater storage capacity. This makes both capturing and streaming expensive.

Therefore, it is essential to make the system easy to understand and use, to avoid VR sickness, and to lower the unit cost per user to make it more available to a large number of users. Effective use of VR recorded content will also be important for viable business.

Figure 7:
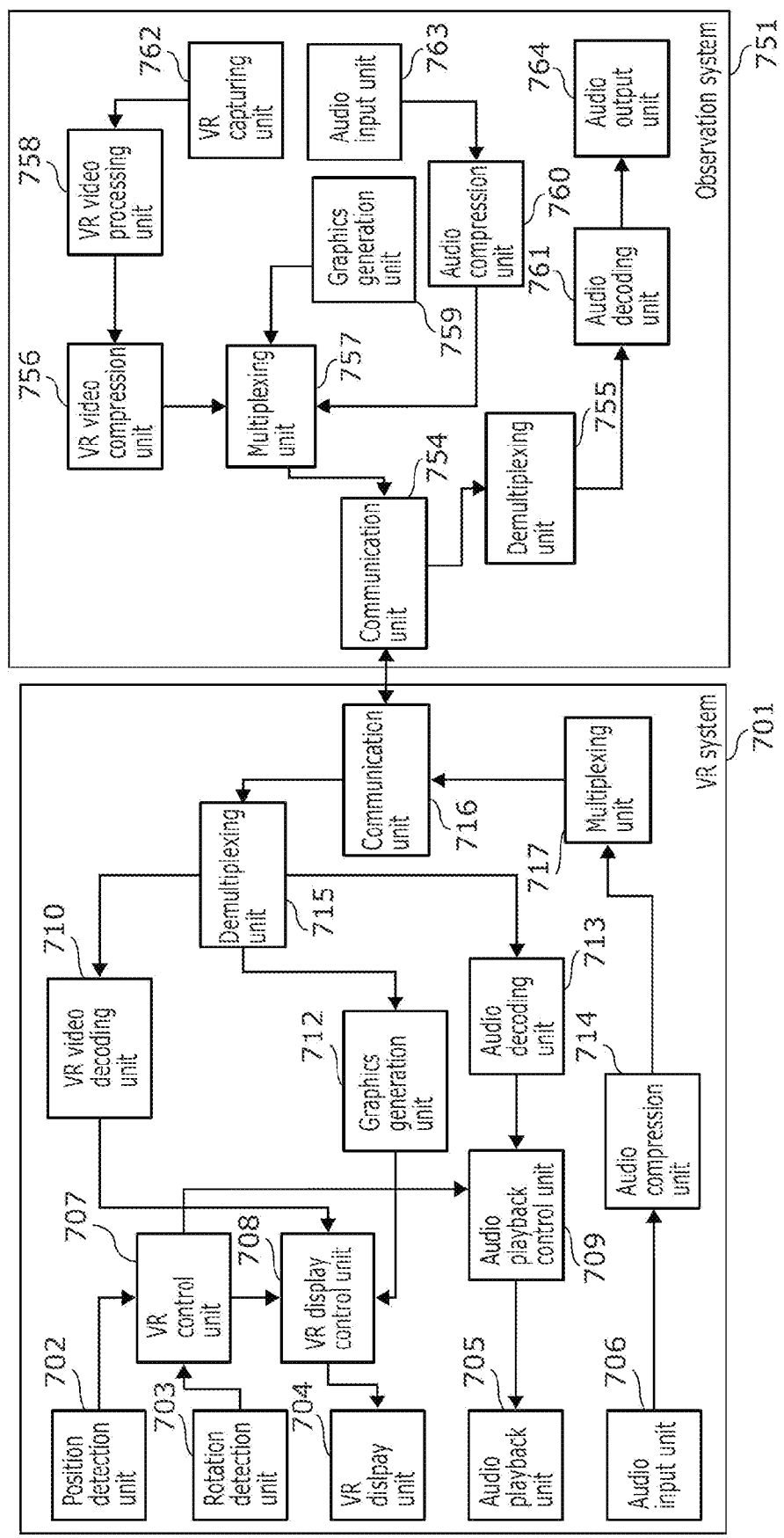
FIG. 7 is for illustrating a conventional example.

FIG. 7 is for illustrating a conventional example. Next, the main functions of Conventional Examples 1 and 2 will be described. Observation system 751 of Conventional Examples 1 and 2 includes: VR capturing unit 762 (VR capturing camera) for capturing VR video; VR video processing unit 758 that processes the video captured by VR capturing unit 762 to make images suitable for transmission; VR video compression unit 756 that compresses the VR video processed by VR video processing unit 758 to a data rate and video signal format suitable for transmission; audio input unit 763 including a microphone for receiving audio from the guide and surrounding area; audio compression unit 760 that compresses the audio signal input via audio input unit 763 to a data rate and audio signal format suitable for transmission; graphics generation unit 759 that generates auxiliary information as graphics; multiplexing unit 757 that converts the video signal compressed by VR video compression unit 756, the audio signal compressed by audio compression unit 760, and the graphics information compressed by graphics generation unit 759 into signals suitable for transmission; communication unit 754 for transmitting communication observation signals multiplexed by multiplexing unit 757 to a plurality of VR systems 701 and receiving communication audio signal from the plurality of VR systems 701; demultiplexing unit 755 that extracts compressed audio signals from the communication audio signals received by communication unit 754; audio decoding unit 761 that extracts audio signals from the compressed audio signals from demultiplexing unit 755; and audio output unit 764 for outputting the audio signals decoded by audio decoding unit 761 as sound.

In this example, VR video processing unit 758, VR video compression unit 756, and graphics generation unit 759 are realized in the GPU, while audio compression unit 760, multiplexing unit 757, demultiplexing unit 755, and audio decoding unit 761 are realized in the CPU, but this example is non-limiting; in a simpler configuration, the CPU and the GPU may be realized as a single processor with their original functional configuration and operation.

VR capturing unit 762 is, for example, a 360° camera, and more specifically includes a plurality of cameras that capture images in different directions. The outputs of the cameras are combined (stitched) in the VR video processing unit to create a single video, which is mapped onto a flat surface using, for example, the equirectangular projection (ERP) method, and the result is output as an ERP image.

In contrast to observation system 751, VR system 701 according to Conventional Examples 1 and 2 includes: communication unit 716 that receives communication observation signals transmitted from observation system 751 or transmits, to observation system 751 as communication audio information, audio input via VR system 701; demultiplexing unit 715 that demultiplexes and outputs the compressed VR video (ERP image), graphics information, and compressed audio information from the communication observation signal from communication unit 716; VR video decoding unit 710 that decodes the compressed VR video (ERP image) from demultiplexing unit 715; VR display control unit 708 that converts ERP images from VR video decoding unit 710 into spherical video, cuts out a portion according to control information from VR control unit 707 to obtain video displayable on VR display unit 704, and outputs graphics information from graphics generation unit 712 that converts graphics information output from demultiplexing unit 715 into graphics to be displayed, along with VR video to be displayed on VR display unit 704; and VR display unit 704 that outputs VR video from VR display control unit 708 for viewing by both eyes. The respective outputs of rotation detection unit 703 that detects the front, back, left, and right tilting of VR display unit 704 or the direction of the whites of the eyes and position detection unit 702 that detects the front, back, left, and right tilting of VR display unit 704 and position in the height direction are transmitted to VR control unit 707, and according to the output of VR control unit 707, the video to be displayed on VR display unit 704 and the audio output by the audio playback control unit and audio playback unit 709 are appropriately controlled. Compressed audio information demultiplexed by demultiplexing unit 715 is decoded in audio decoding unit 713 and transmitted to audio playback control unit 709 as audio information. In audio playback control unit 709, according to the control information from VR control unit 707, the balance in the left, right, front, and back directions is corrected and in some cases frequency characteristics processing, delay processing and creation of alarms for VR system 701 are carried out. Graphics generation unit 712 also generates graphics for displaying system menus and warnings for VR system 701, which are superimposed on the VR images and displayed on VR display unit 704. VR system 701 includes audio input unit 706 for receiving input of audio (speech) by the user of VR system 701, and audio information from audio input unit 706 is compressed by audio compression unit 714 into compressed audio information, transmitted to multiplexing unit 717, and sent to observation system 751 from communication unit 716 as communication audio information.

Figure 8:
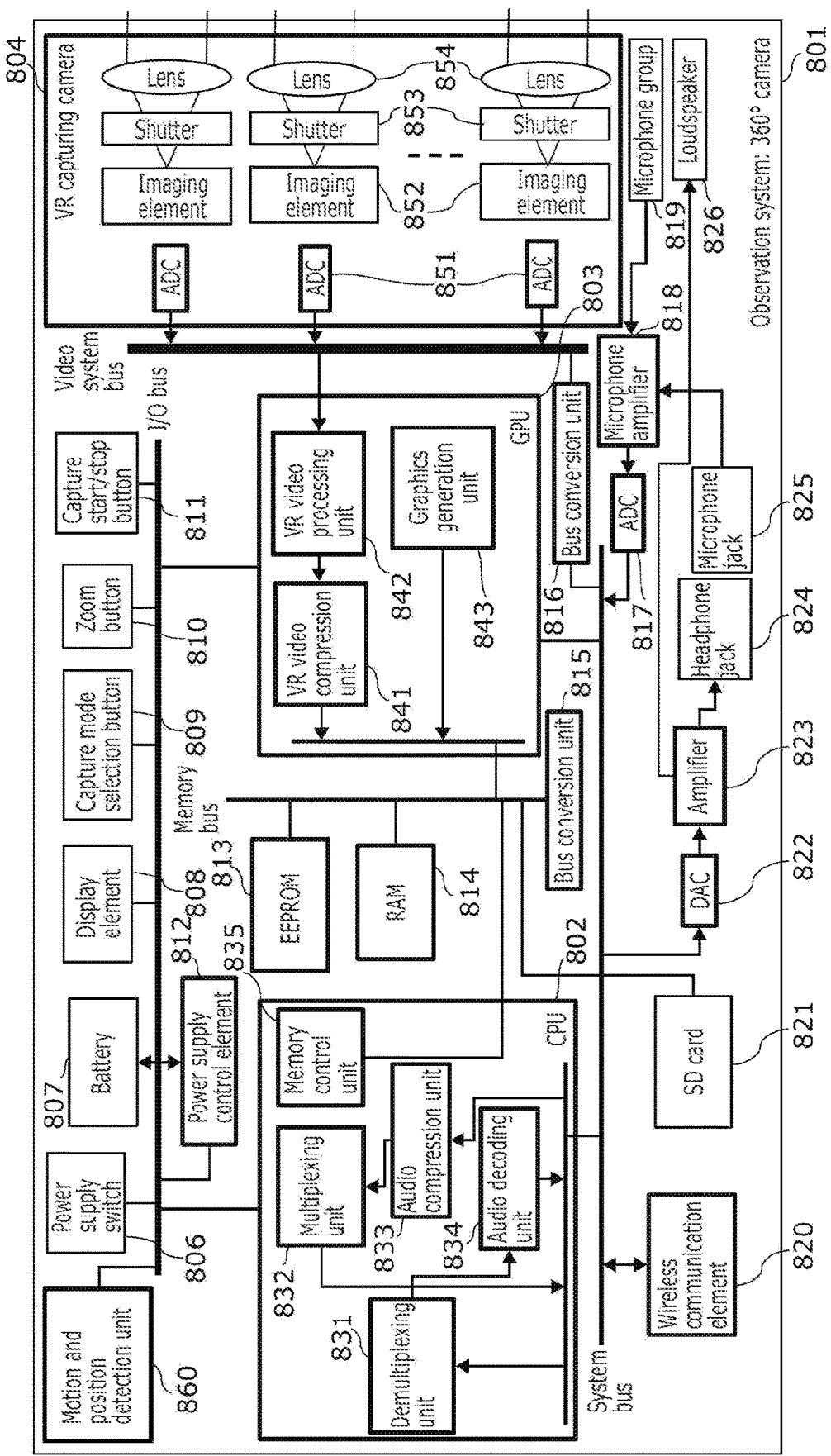
FIG. 8 is for illustrating a conventional example.

FIG. 8 is for illustrating a conventional example. Next, a typical realization example of 360° camera 801 will be described as a typical realization example of the observation system according to Conventional Example 2.

A typical example of 360° camera 801 combines two imaging systems each including ultra-wide angle lens 854, shutter 853, and imaging element 852, and captures 360° video all around (in the front, back, up, and down directions). Since two or more imaging systems may be combined to capture higher quality images, in this example, VR capturing camera 804 is illustrated as including two or more imaging systems. The imaging system may consist of a combination of independent cameras, in which case there is generally a high-speed digital video interface after ADC 851 for the video, and with this, the independent cameras are connected to high-speed digital video input connected to the video system bus connected to the graphics processing unit (GPU) 803 or central processing unit (CPU) 802, but the imaging system is described here as an integrated unit.

The main components of 360° camera 801 are: VR capturing camera 804 including the above-described plurality of imaging systems; GPU 803 that mainly processes video data and graphics; CPU 802 that performs general data processing, input/output processing, and overall control of 360° camera 801; Electrical Erasable Programmable ROM (EEPROM) 813 that stores programs for operating CPU 802 and GPU 803; RAM 814 that is used to store data for CPU 802 and GPU 803; SD card (registered trademark) 821, which is removable memory for storing video, audio, and programs; wireless communication element 820 for wireless communication via WiFi (registered trademark) and Bluetooth (registered trademark) for exchanging data with external devices and receiving operations from external devices; buttons and display element 808 for operating and displaying; battery 807; power supply control element 812; an audio input unit including a plurality of microphones (microphone group 819) or microphone jack 825 for inputting audio, microphone amplifier 818, and ADC 817; an audio output unit including loudspeaker 826 or headphone jack 824, amplifier 823, and DAC 822; a video system bus used to connect mainly VR capturing camera 804 and CPU 802 and read digital video data; a memory bus that connects EEPROM 813, RAM 814, SD card 821, GPU 803, and CPU 802 and transmits and receives data to and from the memory; a system bus to which CPU 802, GPU 803, wireless communication element 820, the audio input unit, and the audio output unit are connected and that transmits and receives data to and from and performs controls pertaining thereto; an I/O bus that controls and performs low-speed data transmission with the buttons and display element 808, power supply control element 812, the audio input unit and audio output unit that are not illustrated in the drawing, and VR capturing camera 804; and a number of bus conversion units 815 and 816 for connecting the above buses. Motion and position detection unit 860 is also connected to the I/O bus. Whether a process is performed by GPU 803 or CPU 802 may differ from this example, and the bus configuration may also differ from this example, but even in such cases, there is no difference in the functional configuration and operations that will be described below.

Each VR capturing camera 804 includes: lens 854 for capturing wide-angle video; imaging element 852 that converts light collected by lens 854 into an electrical signal; shutter 853 that is located between lens 854 and imaging element 852 and shuts out light; an iris (not illustrated) that is located in the same position as shutter 853 and controls the intensity of light from lens 854; and ADC 851 that converts the analog electrical signal from imaging element 852 into a digital video signal. Although not illustrated, each VR capturing camera 804 is controlled by CPU 802 via the I/O bus, and CPU 802 is notified of the states of VR capturing cameras 804.

The buttons include power supply switch 806 to turn the power supply on and off, capture start/stop button 811 to start/stop capturing, capture mode selection button 809 to change the mode of capture, which need not be provided, and zoom button 810 to move lens 854 and digitally control the angle of view and zoom in and out.

Power supply control element 812, which may be integrated with battery 807, stabilizes the voltage, manages the battery capacity, and although not illustrated, supplies power to all elements. In addition, power is supplied to the HMD/VR glasses via USB or AV output.

Each of the functions realized by GPU 803 is realized by dedicated hardware and programs, such as image processing hardware and programs, while the functions realized by CPU 802 are generally realized by general-purpose hardware and programs. As one example, GPU 803 is used to implement VR video processing unit 842, VR video compression unit 841, and graphics generation unit 843. As one example, CPU 802 is used to implement memory control unit 835, multiplexing unit 832, audio compression unit 833, audio decoding unit 834, and demultiplexing unit 831.

Figure 9:
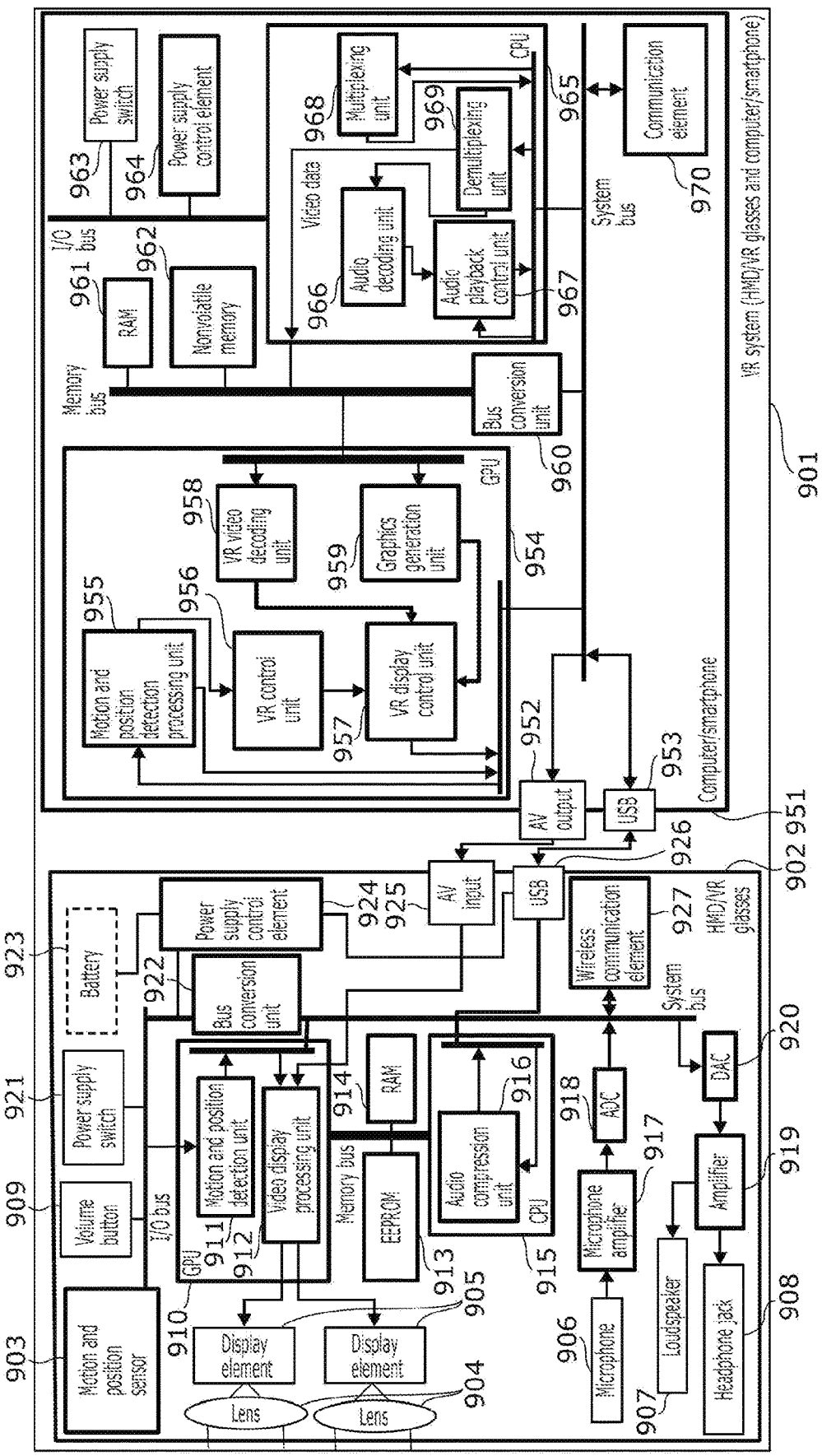
FIG. 9 is for illustrating a conventional example.

FIG. 9 is for illustrating a conventional example. With reference to FIG. 9, next, a typical realization example of VR system 901 will be described as a typical realization example of the observation system according to Conventional Example 2. In the present realization example, VR system 901 includes computer or smartphone 951 and HMD or VR glasses 902 connected thereto. In stand-alone implementation examples of HMD or VR Glasses 902, one can assume that CPU and GPU functions of both will be combined into one, as well as the peripheral functions.

The main components of computer/smartphone 951 of VR system 901 include: WiFi or Ethernet (registered trademark) high-speed communication element 970 for connecting to the observation system; GPU 954 that mainly processes video data and graphics; CPU 965 that performs general data processing and controls the entire computer/smartphone 951; nonvolatile memory 962, such as a hard disk or flash memory, for storing computer programs for operating CPU 965 and GPU 954; RAM 961 for storing data for CPU 965 and GPU 954 to operate; power supply control element 964 for supplying a supply of power to power supply switch 963 and various components; AV output 952 for outputting video and audio signals to HMD/VR 902; an interface such as USB 953 for controlling HMD/VR glasses 902 and obtaining data therefrom; a memory bus for connecting RAM 961 and nonvolatile memory 962 and allowing CPU 965 and GPU 954 to access them; a system bus for CPU 965 and GPU 954 to access AV output 952, USB 953, and communication element 970; a bus connector (bus conversion unit 960) for connecting the system bus and the memory bus; a display device (not illustrated); an input device (not illustrated) for receiving operations; and an other general-purpose interface (not illustrated).

Whether a process is performed by GPU 954 or CPU 965 may differ from this example, and the bus configuration may also differ from this example, but even in such cases, there is no difference in the functional configuration and operations that will be described below. As one example, GPU 954 is used to realize motion and position detection processing unit 955, VR control unit 956, VR display control unit 957, VR video decoding unit 958, and graphics generation unit 959. As one example, CPU 965 is used to realize audio decoding unit 966, audio playback control unit 967, multiplexing unit 968, and demultiplexing unit 969.

AV output 952 and USB 953 can be replaced by a high-speed bidirectional interface, such as USB Type-C (registered trademark). In such cases, HMD/VR glasses 902 should be connected using the same interface or with a converter that converts the interface. Generally, when transmitting video via USB 953, appropriate video compression is performed by CPU 965 or GPU 954 to compress the data and transmitted to HMD/VR glasses 902 via USB 953.

The main components of HMD/VR glasses 902 of VR system 901 include: an audio input unit including microphone 906 for inputting audio, microphone amplifier 917, and ADC 918; an audio output unit including loudspeaker 907 or headphone jack 908, amplifier 919, and DAC 920; a VR display unit including a pair of lenses 904 for the user to view VR video and display element 905; motion and position sensor 903 including a motion and position detection unit including a gyrosensor, camera, or ultrasonic microphone and an orientation detection unit; wireless communication element 927 that uses, for example, Bluetooth technology and is for communicating with a controller (not illustrated), volume button 909 for controlling the volume of output from the audio output unit; power supply switch 921 for turning on and off the power supply of the HMD/VR glasses; power supply control element 924 for controlling the supply of power; a memory bus that connects EEPROM 913, RAM 914, the SD card, GPU 910, and CPU 915 and transmits and receives data therebetween, AV input 925 for receiving video and audio signals from CPU 915, GPU 910, wireless communication element 927, and computer/smartphone 951; an interface such as USB 926 for receiving control signals from computer/smartphone 951 and transmitting video signals, audio signals, and motion and position data; CPU 915 that mainly controls audio compression (realized by audio compression unit 916), switching, and power supply, and controls the entire HMD/VR glasses 902; GPU 910 that mainly performs video display processing (realized by video display processing unit 912) for adjusting video to be displayed on the VR display unit and motion and position detection (realized by motion and position detection unit 911) of correcting/formatting motion and position information to be transmitted to computer/smartphone 951 from information from motion and position sensor 903; EEPROM 913 for storing programs and data for operating CPU 915 and GPU 910; RAM 914 for storing data to be used during operation of CPU 915 and GPU 910; a memory bus for connecting CPU 915, GPU 910, RAM 914, and EEPROM 913; a system bus to which CPU 915, GPU 910, USB 926, the audio input unit, the audio output unit, and wireless communication element 927 are connected and controls and transmits data therebetween; an I/O bus for controlling and low-speed transmission between buttons, power supply control element 924, motion and position sensor 903, the audio input unit (not illustrated), the audio output unit (not illustrated), and the VR capturing camera; and a number of bus conversion units 922 that connect the various buses. Whether a process is performed by GPU 910 or CPU 910 may differ from this example, and the bus configuration may also differ from this example, but even in such cases, there is no difference in the functional configuration and operations that will be described below.

Since the video data from AV input 925 is large and fast, it is shown as being taken directly to GPU 910 if the system bus is not fast enough.

The video information captured by the camera of motion and position sensor 903 may be transmitted to the display element as information for enabling the user to check the surroundings of HMD/VR glasses 902 or to computer/smartphone 951 via USB 926 for monitoring whether the user is in a dangerous situation.

Power supply control element 924 receives a supply of power from USB 926 or AV input 925, stabilizes the voltage, manages the battery capacity, and although not illustrated, supplies power to all elements. In some cases, battery 923 may be provided internally or externally, and may be connected to power supply control element 924.

The states of the buttons and cursor on the controller not illustrated in the drawings are obtained by CPU 915 through wireless communication element 927 and used to control button operations, movement, and applications in the VR space. The position and orientation of the controller are detected by a camera or ultrasonic sensor in the motion and position detection unit, and after appropriate processing by the motion and position sensor, they are used for control by CPU 915 and transmitted to computer/smartphone 951 via USB 926 and used for drawing graphics and image processing executed by GPU 910 or by programs executed by CPU 915. Since basic operations are not directly related to the present invention, description thereof will be omitted.

Figure 10:
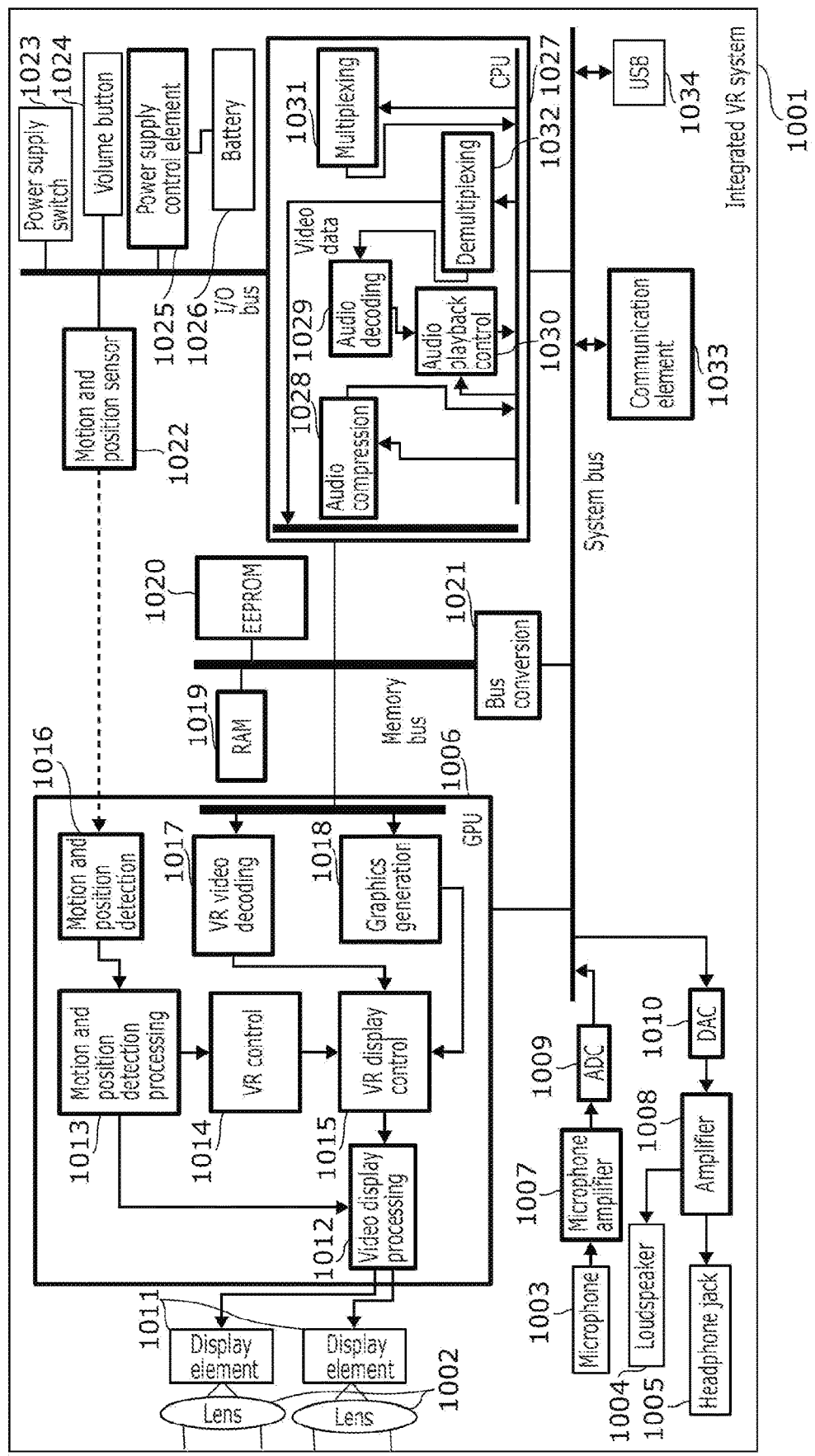
FIG. 10 is for illustrating a conventional example.

FIG. 10 is for illustrating a conventional example. Next, a realization example of integrated VR system 1001 that includes HMD/VR glasses with functions for VR within a computer/smartphone.

As illustrated in FIG. 10, the functions of the computer/smartphone and the functions of HMD/VR glasses are integrated, the CPU functions are integrated into a single CPU, and the GPU functions are integrated into a single GPU.

Communication element 1033 typically uses WiFi technology for wireless communication and includes battery 1026 as it does not include a power cable. Communication element 1033 includes a general purpose interface for a computer, such as USB 1034, for charging and initial setup of battery 1026.

Integrated VR system 1001 does not require AV output, AV input, or USB to connect the computer/smartphone and the HMD/VR glasses, enabling high-quality, delay-free transmission of AV information and efficient control. However, the size limitation of the integrated system may make it impossible to use the high-performance CPU 1027 and GPU 1006 due to power, heat, and space limitations, and may result in limited VR functionality.

However, not being connected by cables increases flexibility and broadens the range of applications.

In addition, by realizing some of the functions on a computer in the cloud, for example, it is possible to compensate for the lack of performance and realize highly functional applications.

Similar to the configurations described with reference to FIG. 8 and FIG. 9, integrated VR system 1001 also includes lens 1002, display element 1011, microphone 1003, microphone amplifier 1007, ADC 1009, loudspeaker 1004, headphone jack 1005, amplifier 1008, DAC 1010, RAM 1019, EEPROM 1020, bus conversion 1021, motion and position sensor 1022, power supply switch 1023, volume button 1024, and power supply control element 1025. Video display processing 1012, motion and position detection processing 1013, VR control 1014, VR display control 1015, motion and position detection 1016, VR video decoding 1017, and graphics generation 1018 are realized using GPU 1006. Audio compression 1028, audio decoding 1029, audio playback control 1030, multiplexing 1031, and demultiplexing 1032 are realized using CPU 1027.

Figure 11:
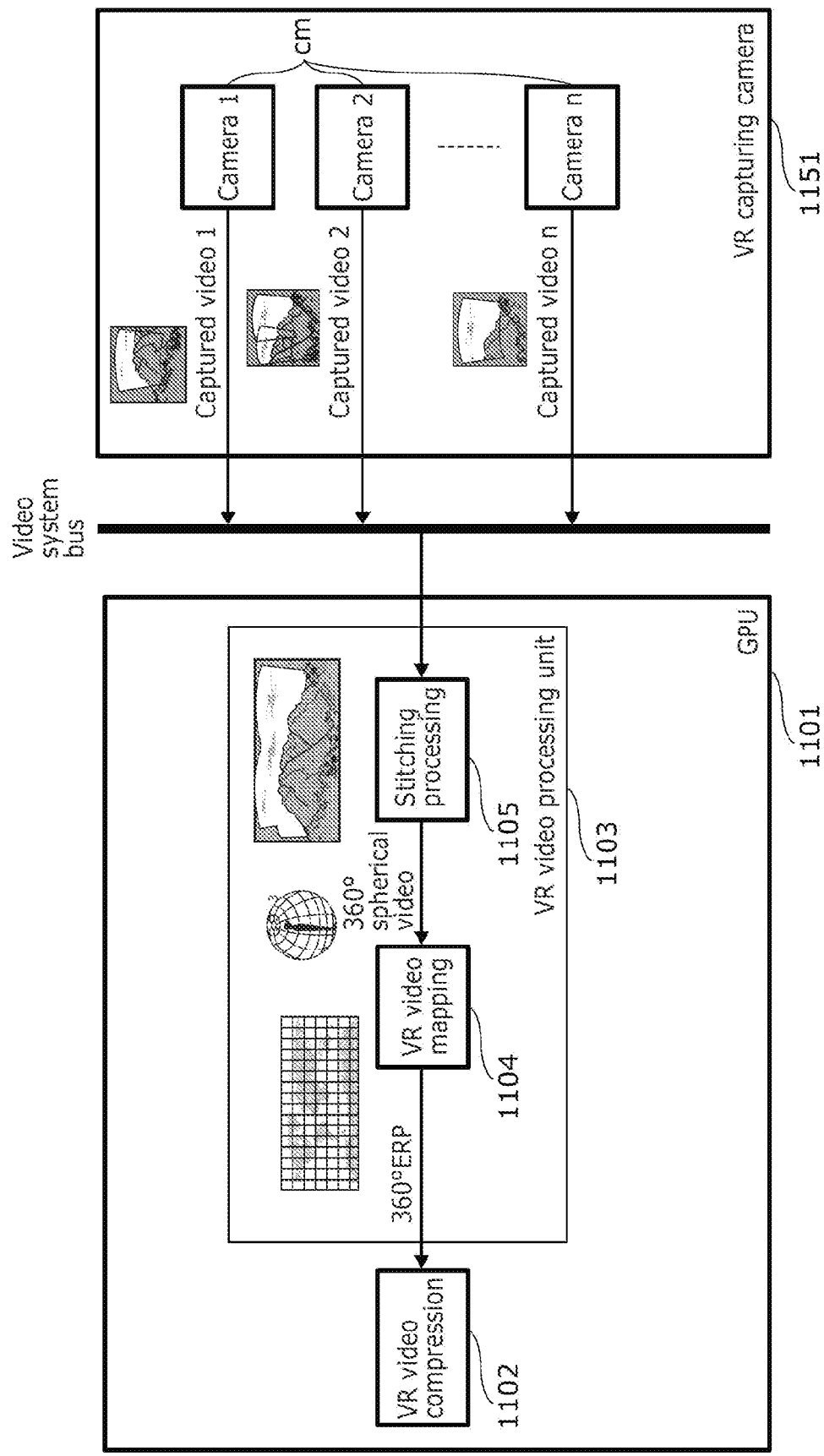
FIG. 11 is for illustrating a conventional example.

FIG. 11 is for illustrating a conventional example. Next, a more detailed configuration of VR video processing unit 1103, which processes the video captured by VR capturing camera 1151 of the observation systems according to Conventional Examples 1 and 2, will be described based on FIG. 11.

As mentioned above, a VR capturing camera includes a plurality of cameras cm, typically with ultra-wide angle lenses, for capturing 360° omnidirectional video, and the individual rectangular videos with the same pixels captured by each camera cm are input to VR video processing unit 1103, which is realized by a program or dedicated circuit in GPU 1101.

In VR video processing unit 1103, the plurality of videos captured by each camera cm are first input to stitching processing unit 1105, which evaluates the direction of each camera cm and the video captured by each camera cm, and then combines and stitches the videos together to form a continuous spherical video. The spherical video data output from stitching processing unit 1105 is mapped to a flat surface by VR video mapping unit 1104 using, for example, the equirectangular projection (ERP) method, and is output from VR video processing unit 1103 as an ERP image, which is then passed to VR video compression unit 1102.

The connection between the video system bus and the cameras is illustrated in the figure such that each camera is connected to the bus, but it is also possible to combine the signals into a single signal in VR capturing camera 1151, transmit the video captured by each camera in a time-division manner to the video bus, and input the video to VR video processing unit 1103. In a simplified configuration, since there are two cameras cm, it is possible to have GPU 1101 receive the output of each of the two cameras instead of using a bus, and have the VR videos captured in parallel received and processed by VR video processing unit 1103.

Figure 12:
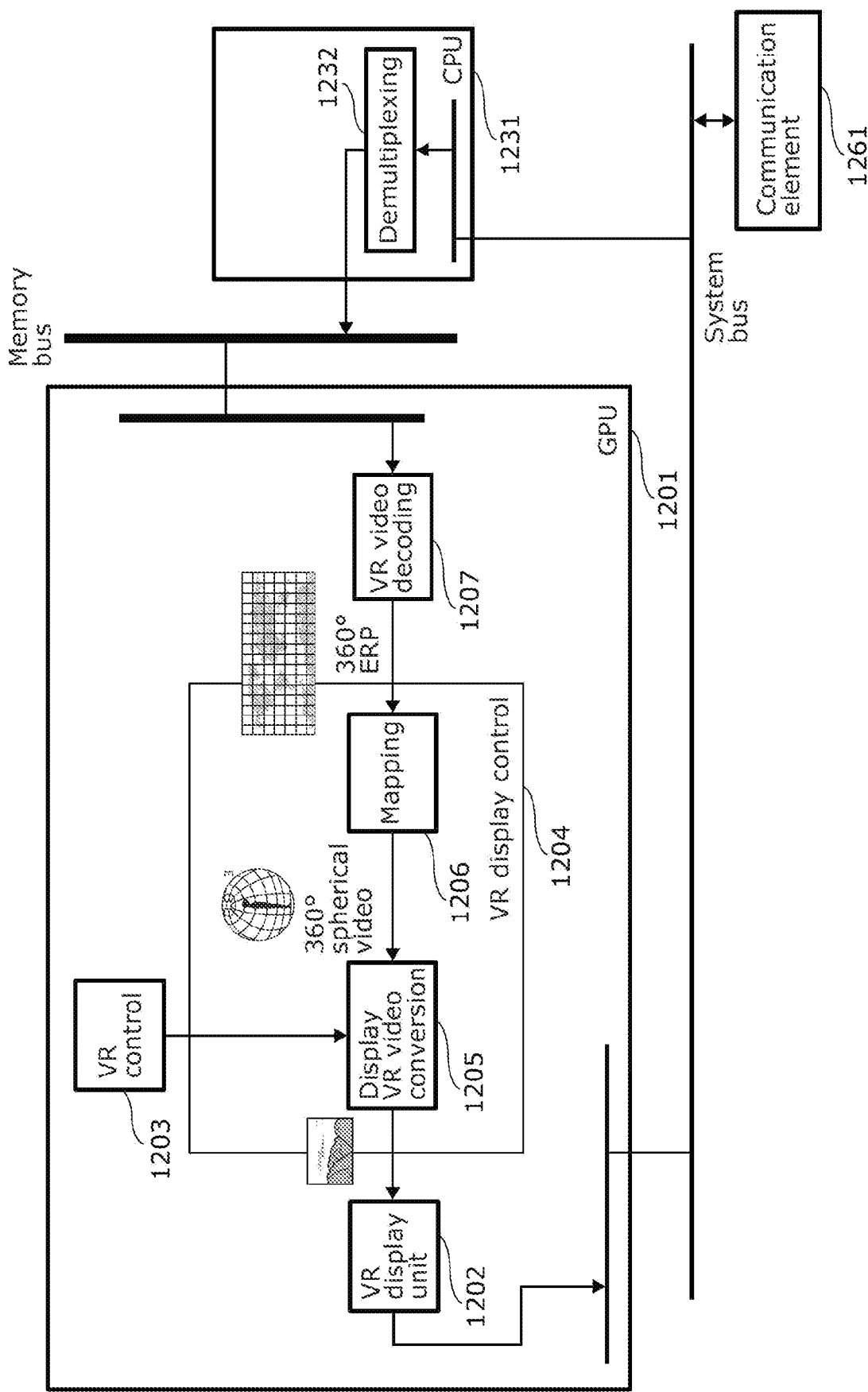
FIG. 12 is for illustrating a conventional example.

FIG. 12 is for illustrating a conventional example. Next, a more detailed configuration of VR display control unit 1204 of the VR systems according to Conventional Examples 1 and 2 will be described based on FIG. 12.

As mentioned above, VR display control unit 1204 is realized by a program or a dedicated circuit in GPU 1201 of the computer/smartphone and includes mapping unit 1206 and display VR video conversion unit 1205.

Operations performed thereby are as follows. Communication element 1261 receives communication data transmitted from the observation system, the compressed video is demultiplexed by demultiplexing unit 1232 of CPU 1231, GPU 1201 receives the video via the memory bus, and VR video decoding unit 1207 decodes the video, thereby generating a flat video (ERP image). The flat video is converted into a 360° spherical video in mapping unit 1206 of VR display control unit 1204, and then in display VR video conversion 1205, the portion to be displayed on VR display unit 1202 is cut out based on control information output by VR control unit 1203.

More specifically, the center of the ERP image is the entire surface and the origin of the 360° spherical video. The initial video of the VR image displayed on VR display unit 1202 is centered on the origin, and depending on the capability of VR display unit 1202, the image for the right eye is slightly to the right and the image for the left eye is slightly to the left, and the initial setting value is used for the height direction to cut out the videos, and the images are displayed on the display elements for the right and left eyes.

From here, the position of the cutout changes depending on whether the VR system rotates to the left or right, looks up or down, etc.

In general, the video from a 360° camera does not change when the VR system is moved, but in the case of CG-generated images, the position changes when the VR system is moved or operated with a controller.

The initial value of the cutout from the 360° spherical video may be from the previous cutout position, but generally, a function is included to restore the initial position.

Figure 13:
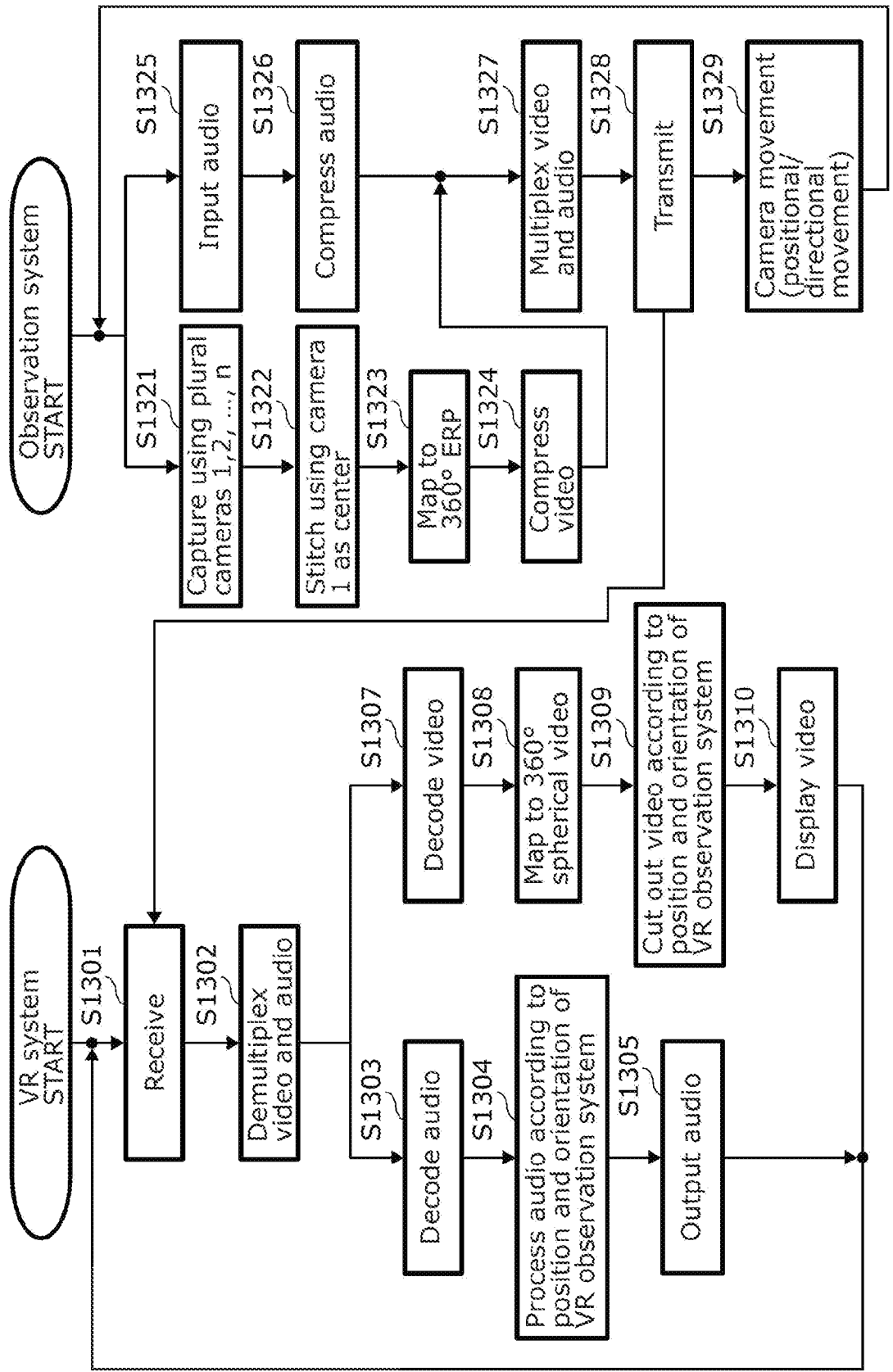
FIG. 13 is for illustrating a conventional example.

FIG. 13 is for illustrating a conventional example. Next, an operation example of Conventional Example 2 will be described based on FIG. 13.

In the observation system, audio is input by the audio input unit (microphone group, microphone jack, microphone amplifier, and ADC) (S1325), and audio compression is performed by the audio compression unit (S1326).

At the same time, video is captured by a plurality of cameras (lenses, shutters, imaging elements, ADCs) in the VR capturing camera (S1321), stitched into a spherical image with camera 1, which is the center camera, as the center in the stitching processing unit of the VR video processing unit (S1322), these are then used to generate an ERP image by the VR image mapping section using the positive distance cylinder The ERP image is then generated by equirectangular projection (ERP) or the like by the VR video mapping unit (S1323), and the ERP image is then appropriately compressed by the VR video compression unit (S1324).

The compressed ERP image and audio information are multiplexed by the multiplexing unit (S1327) into a transmittable format and sent (transmitted) out to the VR system by the wireless communication element (S1328).

Over time, in some cases, the camera moves in a new direction and/or to a new position (S1329), and the audio input and steps from capturing by the plurality of VR capturing cameras to the transmission are repeated.

Although graphics information is omitted here, graphics information may be superimposed on the video before video compression or multiplexed together with video and audio as graphics information.

In the VR system, the computer/smartphone receives the information transmitted from the observation system by the communication element (S1301) and transmits it to the demultiplexing unit. The demultiplexing unit demultiplexes the transmitted compressed video information and compressed audio information (S1302). The compressed audio information demultiplexed by the demultiplexing unit is transmitted to the audio decoding unit for decoding (S1303), thereby generating uncompressed audio information. The audio information is transmitted from the audio decoding unit to the audio playback control unit, where audio processing is performed based on the position and orientation information of the VR observation system transmitted from the VR control unit of the GPU via the system bus (S1304). The audio information that has undergone the audio processing is transmitted to the audio output unit (DAC, amplifier, loudspeaker, and headphone jack) of the HMD/VR glasses via the system bus by way of AV output or USB, and is output as audio (S1305). Audio processing includes controlling the left-right balance and the volume in the space, changing the frequency characteristics, delay, movement within the space, similar processing for only certain sound sources, and adding sound effects.

The compressed video signal is transmitted to the VR video decoding unit of the GPU via the memory bus with the video data from the demultiplexing unit of the CPU of the computer/smartphone, decoded in the VR video decoding unit (S1307) and input to the VR display control unit as an ERP image. In the VR display control unit, the mapping unit maps the ERP video onto the 360° spherical video (S1308), and in the display VR video conversion unit, the appropriate portion of the video is cut out from the 360° spherical video based on the position and orientation information of the VR system from the VR control unit (S1309) and displayed as VR video by the VR display unit (display element and lenses) (S1310).

Video display and audio output are repeated from reception from the observation system.

Graphics may be demultiplexed at the same time as video and audio demultiplexing and superimposed on the VR video by the VR display control unit, or they may be generated in the VR system and superimposed on the VR video, but explanation thereof will be omitted here.

Overview of Disclosure

An overview of the present disclosure is as follows.

A video display system according to one aspect of the present disclosure is for displaying a display video via a display device, and includes: an observation device including a capturing unit configured to capture a wide-angle video, a data obtainment unit configured to obtain data related to a movement direction of the capturing unit, a metadata composition unit configured to obtain metadata based on the data obtained, and a transmission unit configured to transmit, together with the metadata, the wide-angle video captured; and a VR device including: a reception unit configured to receive the wide-angle video and the metadata; an orientation estimation unit configured to estimate an orientation of the display device; a differential calculation unit configured to calculate a relative movement direction based on a difference between the orientation of the display device estimated and the movement direction of the capturing unit in the metadata, the relative movement direction being a movement direction of the capturing unit relative to the orientation of the display device; a presentation unit configured to present the relative movement direction calculated to a user of the display device; a video generation unit configured to generate, from the wide-angle video received, the display video including a portion corresponding to a viewing area corresponding to the orientation of the display device as estimated by the orientation estimation unit; and the display device that displays the display video.

In such video display system, the metadata is used to calculate the relative movement direction indicating the movement direction of the capturing unit. Since the relative movement direction is presented to the user, it is possible to inhibit problems associated with movement of the capturing unit that is unexpected by the user, such as sudden movement of the capturing unit. Therefore, according to this video display system, it is possible to display appropriate video in terms of inhibiting problems associated with the capturing unit moving in a way that is unexpected by the user.

For example, the presentation unit may be configured to: generate and output a graphic indicating the relative movement direction calculated; and cause the video generation unit to superimpose the graphic onto the portion to present the relative movement direction.

With this, graphics can be used to present the relative movement direction to the user.

For example, the graphic may display an arrow indicating the relative movement direction on the display video.

With this, the relative movement direction can be presented to the user through graphics that display an arrow pointing in the relative movement direction on the display video.

For example, the graphic may display, as a mask, an image for covering at least part of the display video other than a part corresponding to the relative movement direction of the mobile object.

With this, the relative movement direction can be presented to the user by means of a graphic that displays, as a mask, an image for covering at least part of the display video other than a part corresponding to the relative movement direction.

For example, the orientation of the display device estimated may be a discrete display direction that changes in units of a first discrete value based on an actual orientation of the display device, and the differential calculation unit may be configured to calculate a difference between the discrete display direction and the movement direction of the capturing unit in the metadata.

This makes it possible to present the relative movement direction, which discretely changes, to the user.

For example, the first discrete value may vary from a minimum when the actual orientation of the display device and an inclination in a horizontal plane in the movement direction of the capturing unit in the metadata are coincident, to a maximum when a difference between the actual orientation of the display device and the inclination in the horizontal plane in the movement direction of the capturing unit in the metadata is a maximum.

This makes it possible to present, to the user, the relative movement direction that discretely changes such that the first discrete value varies from a minimum when the actual orientation of the display device and an inclination in a horizontal plane in the movement direction of the capturing unit in the metadata are coincident, to a maximum when a difference between the actual orientation of the display device and the inclination in the horizontal plane in the movement direction of the capturing unit in the metadata is a maximum.

For example, the movement direction of the capturing unit in the metadata may be a discrete movement direction that changes in units of a second discrete value based on an actual orientation of the display device, and the differential calculation unit may be configured to calculate a difference between the orientation of the display device estimated and the discrete movement direction.

This makes it possible to present the relative movement direction, which discretely changes, to the user.

For example, the observation device may include an input interface for input by an operator who moves the capturing unit, and the data obtainment unit may be configured to obtain the data input by the operator via the input interface.

With this, the metadata can be composed by obtaining data entered by the operator via the input interface.

For example, the observation device may include a position detection unit configured to detect a position of the capturing unit, and the data obtainment unit may be configured to obtain the data based on the position of the capturing unit detected over time by the position detection unit.

With this, data can be obtained and metadata can be composed based on the position of the capturing unit detected over time by the position detection unit.

For example, the capturing unit may be configured to capture the wide-angle video as a virtual video by capturing video in a virtual image space constructed by computer graphics.

With this, in a virtual wide-angle video, it is possible to display appropriate video in terms of inhibiting problems associated with the capturing unit moving in a way that is unexpected by the user.

For example, the video display system may further include an information processing device that includes at least one of functions included in the observation device and the VR device, is connected to the observation device and the VR device over a network, and takes over one or more processes of the observation device or the VR device.

With this, the video display system can be realized by the observation device, the VR device, and the information processing device.

For example, the information processing device may include: a reception unit configured to receive the wide-angle video and the data from the observation device; a metadata composition unit configured to generate metadata based on the wide-angle video and the data; a movement information calculation unit configured to calculate movement information related to movement of the capturing unit in the metadata; a presentation unit configured to generate and output a graphic that indicates the movement information calculated and presents, to a user of the display device, the movement direction of the capturing unit by being superimposed on a portion of the wide-angle video that corresponds to a viewing area corresponding to the orientation of the display device estimated; and a transmission unit configured to transmit the wide-angle video, the graphic, and the metadata.

With this, the video display system can be realized by the observation device, the VR device, and the information processing device.

For example, the information processing device may include: a reception unit configured to receive the wide-angle video and the data from the observation device; a metadata composition unit configured to generate metadata based on the wide-angle video and the data; a movement information calculation unit configured to calculate movement information related to movement of the capturing unit in the metadata; and a transmission unit configured to transmit the wide-angle video, the movement information, and the metadata.

With this, the video display system can be realized by the observation device, the VR device, and the information processing device.

For example, the information processing device may include: a reception unit configured to receive the wide-angle video, the data, and data related to the orientation of the display device; a metadata composition unit configured to generate metadata based on the wide-angle video, the data, and the data related to the orientation of the display device; a differential calculation unit configured to calculate a relative movement direction based on a difference between the orientation of the display device and movement information related to movement of the capturing unit, the relative movement direction being a movement direction of the capturing unit relative to the orientation of the display device; a presentation unit configured to generate and output a graphic that indicates the relative movement direction calculated and presents, to a user of the display device, the relative movement direction by being superimposed on a portion of the wide-angle video that corresponds to a viewing area corresponding to the orientation of the display device estimated; and a transmission unit configured to transmit the wide-angle video, the graphic, and the metadata.

With this, the video display system can be realized by the observation device, the VR device, and the information processing device.

For example, the information processing device may be provided in a cloud connected to a wide-area network, and may be connected to the observation device and the VR device over the wide-area network.

With this, the video display system can be realized by the observation device, the VR device, and the cloud-based information processing device connected to the observation device and the VR device over a wide-area network.

An information processing method according to one aspect of the present disclosure is for displaying a display video on a display device, and includes: receiving metadata based on data related to a movement direction of a capturing unit configured to capture a wide-angle video; and calculating and outputting a relative movement direction based on a difference between an estimated orientation of the display device and the movement direction of the capturing unit in the metadata, the relative movement direction being a movement direction of the capturing unit relative to the orientation of the display device.

Such an information processing method can achieve the same advantageous effects as the video display system described above.

The non-transitory computer-readable recording medium according to one aspect of the present disclosure has recorded thereon a computer program for causing a computer to execute the information processing method described above.

Such a recordable medium can, with the use of a computer, achieve the same advantageous effects as the video display system described above.

Hereinafter, embodiments of the present disclosure will be described with reference to the drawings.

Each embodiment described below shows a general or specific example. The numerical values, shapes, materials, elements, the arrangement and connection of the elements, steps, order of the steps etc., indicated in the following embodiments are mere examples, and therefore do not intend to limit the scope of the claims. Therefore, among elements in the following embodiments, those not recited in any of the independent claims are described as optional elements.

The figures are not necessarily precise illustrations. In the figures, elements that are essentially the same share the same reference signs, and repeated description may be omitted or simplified.

In the present specification, terms indicating relationships between elements, such as "parallel", terms indicating shapes of elements, such as "rectangle", numerical values, and numerical ranges are expressions that include, in addition to their exact meanings, substantially equivalent ranges, including differences such as errors of approximately a few percent, for example.

Embodiments

[Configuration]

Figure 14:
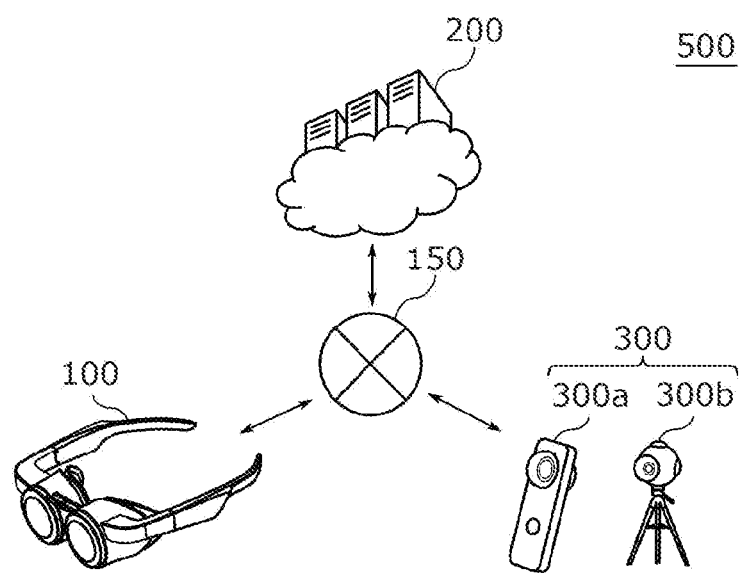
FIG. 14 illustrates the schematic configuration of the video display system according to an embodiment.
Figure 15:
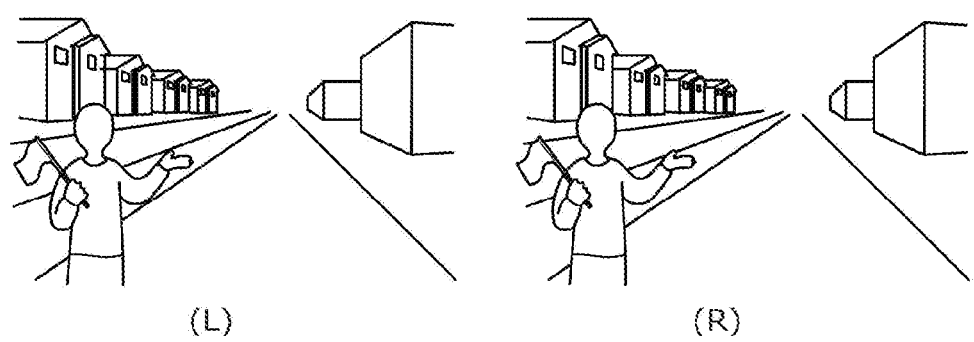
FIG. 15 illustrates one example of video displayed in the video display system according to an embodiment.

First, an overview of the video display system according to an embodiment will be described with reference to FIG. 14 and FIG. 15. FIG. 14 illustrates the schematic configuration of the video display system according to an embodiment. FIG. 15 illustrates one example of video displayed in the video display system according to an embodiment.

As illustrated in FIG. 14, video display system 500 according to the present embodiment is realized by observation device 300, server device 200 connected via network 150, and display device 100 connected via network 150.

Observation device 300 is an omnidirectional camera capable of capturing video of 360 degrees around it. Observation device 300 may be, for example, capturing device 300a that is hand-held, or observation device 300b that is fixed on a tripod or the like. In the case of the hand-held capturing device 300a, it is easy to capture images while moving around. Hereafter, the observation device will be denoted simply as observation device 300 without differentiating between the types (observation device 300a and observation device 300b). Observation device 300 includes an optical element such as a fisheye lens and can capture a wide-angle area, for example 180 degrees, with a single sensor array. A plurality of combinations of optical elements and sensor arrays arranged to complement each other in different wide-angle areas can be used to capture 360 degree wide-angle video. The images captured in each of the plurality of sensor arrays are stitched together by identifying the elements that correspond to each other. This results in a single image that can be mutually transformed between flat and spherical surfaces, for example, an equirectangular projection. By continuously generating such images in the time domain, a video (moving image) that changes in the time domain is generated. Note that the interior of the spherical video is also referred to as the 3D video space.

In the present embodiment, two 3D video spaces with a displacement corresponding to human binocular disparity are generated. These two 3D video spaces may be generated from single 3D video space by, for example, simulation, or they may be generated by two cameras that are displaced by a disparity shift. In the present embodiment, a VR video that allows the user to view any direction in the 3D video space from inside this 3D video space can be displayed.

Network 150 is a communication network for communicably connecting observation device 300, server device 200, and display device 100 with each other. Here, a communication network such as the Internet is used as network 150, but network 150 is not limited to this example. Each of the connection between observation device 300 and network 150, the connection between server device 200 and network 150, and the connection between display device 100 and network 150 may be accomplished via wireless communication or wired communication.

Server device 200 is a device for performing information processing and the like, and is realized using, for example, a processor and memory. Server device 200 may be realized by an edge computer or by a cloud computer. One server device 200 may be provided per video display system 500, or one server device 200 may be provided per a plurality of video display systems 500. Stated differently, server device 200 may perform various processes in a plurality of video display systems 500 in parallel. Note that server device 200 is not an essential component of video display system 500.

For example, a video display system that includes only observation device 300 and display device 100 can be realized by allocating each functional unit of server device 200 (described below) to observation device 300 and display device 100. In particular, if display device 100 is realized using an information processing terminal such as a smartphone that also serves as a display panel, the functional units of server device 200 can be easily realized using, for example, the processor of the information processing terminal. Alternatively, by giving functions of observation device 300 and display device 100 to server device 200, some of the functions of observation device 300 or display device 100 can be reduced and existing observation devices and display devices can be used. Stated differently, a video display system can be easily implemented by consolidating various functions in server device 200. Each functional unit of server device 200 will be described below with reference to, for example, FIG. 16.

Display device 100 is a glasses HMD that supports two lens tubes that are separated from each other by having the temple portions extending from each of the left and right sides engaged with the external ears, thereby holding the two lens tubes in positions corresponding to the user's right and left eyes. The lens tubes of display device 100 have built-in display panels, which project video with a disparity shift to the user's left and right eyes, respectively, as illustrated in FIG. 15, for example. In FIG. 15, (L) shows an image for the left eye corresponding to one frame of the video, and (R) shows an image for the right eye corresponding to the same frame of the video. Display device 100 does not need to be a terminal dedicated to displaying such video. It is possible to realize the display device according to the present disclosure using a display panel included in a smartphone, tablet device, or PC, for example.

Figure 16:
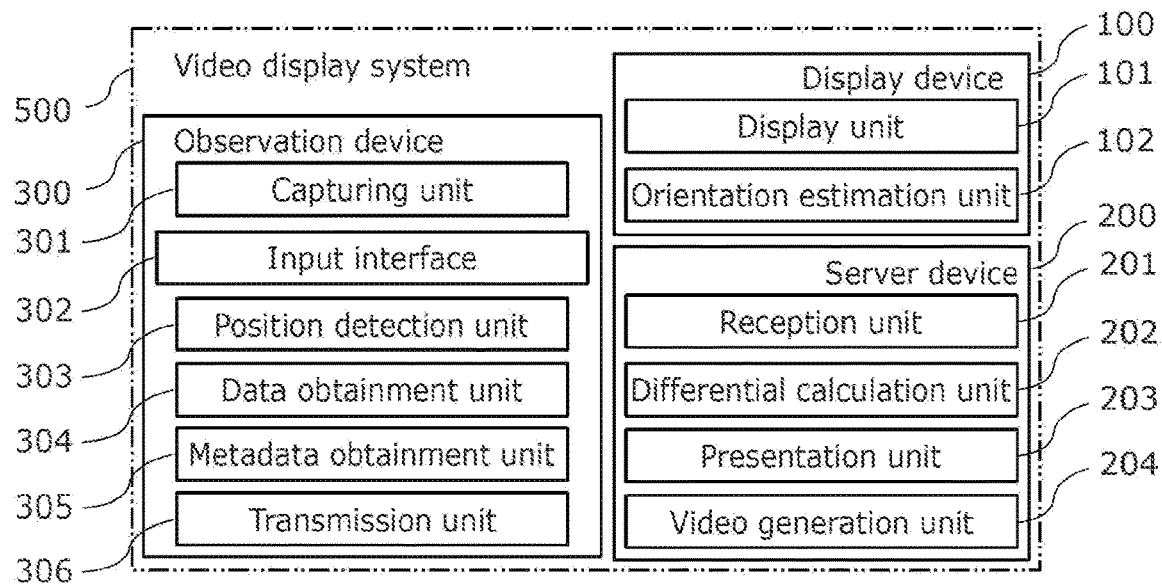
FIG. 16 is a block diagram illustrating the functional configuration of the video display system according to an embodiment.

Hereinafter, video display system 500 according to the present embodiment will be described in greater detail with reference to FIG. 16. FIG. 16 is a block diagram illustrating the functional configuration of the video display system according to an embodiment. As illustrated in FIG. 16 and as described with reference to FIG. 14, video display system 500 includes display device 100, server device 200, and observation device 300.

Display device 100 includes display unit 101 and orientation estimation unit 102. Display unit 101 is a functional unit that outputs an optical signal according to image information using, for example, a backlight and LCD panel, an organic EL panel, or micro LEDs. Display unit 101 controls the output optical signal so that the image is formed on the retina of the user's eye through optical elements such as a lens and an optical panel. Forming the image on the user's retina allows the user to see the image. Display unit 101 outputs the image continuously in the time domain to allow the viewer to see a series of images, i.e., a video. In this way, display unit 101 displays the video to the user of display device 100.

Orientation estimation unit 102 is a functional unit for estimating the orientation of display device 100. Orientation estimation unit 102 is realized by various sensors, such as acceleration sensors, gyro sensors, etc., built into display device 100 at appropriate locations. Orientation estimation unit 102 estimates the orientation of display device 100 by estimating in which direction and by how much the orientation has changed in relation to a reference direction preset in display device 100. As explained earlier, display device 100 is supported by the user's head (external ear and root of the nose) and thus moves with the user's head.

Then, by estimating the orientation of display device 100, the viewing area corresponding to that orientation can be cut out from the wide-angle video and displayed. Stated differently, the orientation of display device 100 as estimated by orientation estimation unit 102 can be used to display the viewing area to be viewed in the 3D video space, assuming that the viewing area is in the direction in which the user's head is facing. Note that the orientation of display device 100 estimated here corresponds to the normal direction of the display panel of display device 100. The display panel is positioned to face the user's eyes, so the user's eyes are usually located in the normal direction of the display panel.

The orientation of display device 100 is therefore consistent with the direction connecting the user's eyes and the display panel.

However, the direction of display device 100 and the direction of the user's line of sight may shift due to the user's eye movements. In such cases, if display device 100 includes a sensor that detects the user's line of sight (i.e., an eye tracker), the detected user's line of sight may be used as the direction of display device 100. Stated differently, the eye tracker is another example of the orientation estimation unit.

In addition to the above, display device 100 includes a power supply, various input switches, a circuit for driving the display panel, wired and wireless communication modules for input and output, audio signal processing circuits such as a signal converter and an amplifier, and a microphone and a loudspeaker for audio input and output.

Server device 200 includes reception unit 201, differential calculation unit 202, presentation unit 203, and video generation unit 204. Reception unit 201 is a processing unit that receives (obtains) various signals from observation device 300 (to be described later). Reception unit 201 receives the wide-angle video captured at observation device 300. Reception unit 201 also receives metadata obtained at observation device 300. Reception unit 201 also receives information related to the orientation of display device 100 estimated at display device 100.

Differential calculation unit 202 is a processing unit that calculates a relative movement direction based on a difference between the orientation of display device 100 and the movement direction of capturing unit 301 that is included in the metadata. Here, the relative movement direction is a movement direction of capturing unit 301 relative to the orientation of display device 100. Operations performed by differential calculation unit 202 will be described in greater detail later.

Presentation unit 203 is a processing unit that presents, to the user of display device 100, the relative movement direction calculated in differential calculation unit 202. Although an example in which presentation unit 203 causes video generation unit 204 to make the above presentation by including content indicating the relative movement direction in the display video generated in video generation unit 204, the presentation of the relative movement direction is not limited to the example of including it in the display video. For example, the relative movement direction may be presented as audio from a predetermined direction of arrival corresponding to the relative movement direction within a 3D sound field, and may be presented by vibrating a device such as a vibrating device held by the user in both hands in a manner corresponding to the relative movement direction. Operations performed by presentation unit 203 will be described in greater detail later along with operations performed by differential calculation unit 202.

Video generation unit 204 cuts out, from the received wide-angle video, a portion corresponding to the viewing area corresponding to the orientation of display device 100 as estimated by orientation estimation unit 102, and further, if necessary, generates a display video that includes content indicating the calculated relative movement direction. Operations performed by video generation unit 204 will be described in greater detail later along with the operations performed by differential calculation unit 202 and presentation unit 203. Server device 200 also includes a communication module for transmitting the generated display video to display device 100.

Observation device 300 includes capturing unit 301, input interface 302, position detection unit 303, data obtainment unit 304, metadata obtainment unit 305, and transmission unit 306. Capturing unit 301 is the functional part related to capturing images and is integrated with other functional components of observation device 300. Therefore, moving capturing unit 301 means moving the entire observation device 300. Capturing unit 301 may be separate from other functional components of capturing device 300 and communicate via wired or wireless communication. In such cases, capturing unit 301 can be moved independently. Capturing unit 301 includes an optical element, a sensor array, and an image processing circuit. Capturing unit 301, for example, outputs the luminance value of light received by each pixel on the sensor array through the optical element as 2D luminance value data. The image processing circuit performs post-processing such as noise removal for the luminance value data, as well as processing to generate a 3D image space from 2D image data, such as stitching.

Input interface 302 is a functional unit used when inputs are made by the operator operating observation device 300. For example, input interface 302 includes a stick that can be tilted in each direction in 360 degrees corresponding to the movement direction of capturing unit 301, and a physical sensor that detects the direction of tilting. The operator can input the movement direction of capturing unit 301 to the system by tilting the stick toward the movement direction to move capturing unit 301. Capturing unit 301 may be a self-propelled device, in which case capturing unit 301 may be configured to move in the direction corresponding to the input to input interface 302. Note that input interface 302 is not an essential component. The present embodiment may be realized so long as only one of input interface 302 or position detection unit 303 (described later) is provided.

Position detection unit 303 is a sensor that detects the movement direction of capturing unit 301, i.e., observation device 300. Position detection unit 303 is realized by a distance measurement sensor such as a LiDAR sensor and an odometer, etc., and can detect the current position of observation device 300. By detecting the current position over time, position detection unit 303 can detect the movement direction of observation device 300.

Data obtainment unit 304 is a functional unit that obtains, from, for example, input interface 302 and position detection unit 303, data including information on the movement direction of capturing unit 301, i.e., the movement direction of observation device 300. Data obtainment unit 304 is connected to at least one of input interface 302 or position detection unit 303, and obtains the movement direction of observation device 300 as physical quantities from these functional units.

Metadata obtainment unit 305 is a functional unit that obtains metadata by converting the data related to the movement direction of observation device 300 obtained in data obtainment unit 304 into metadata to be added to the captured video data. In addition to the data related to the movement direction of observation device 300, the obtained metadata may include various other data to be used within video display system 500. Stated differently, metadata obtainment unit 305 is one example of a metadata composition unit that composes metadata by combining a plurality of pieces of data into a single unit of data that can be read from a single unit of information.

Transmission unit 306 is a communication module that transmits the captured video (wide-angle video) and the obtained metadata. Transmission unit 306 communicates with reception unit 201 of server device 200 to transmit the captured video and obtained metadata to be received by the reception unit.

[Operations]

Figure 17:
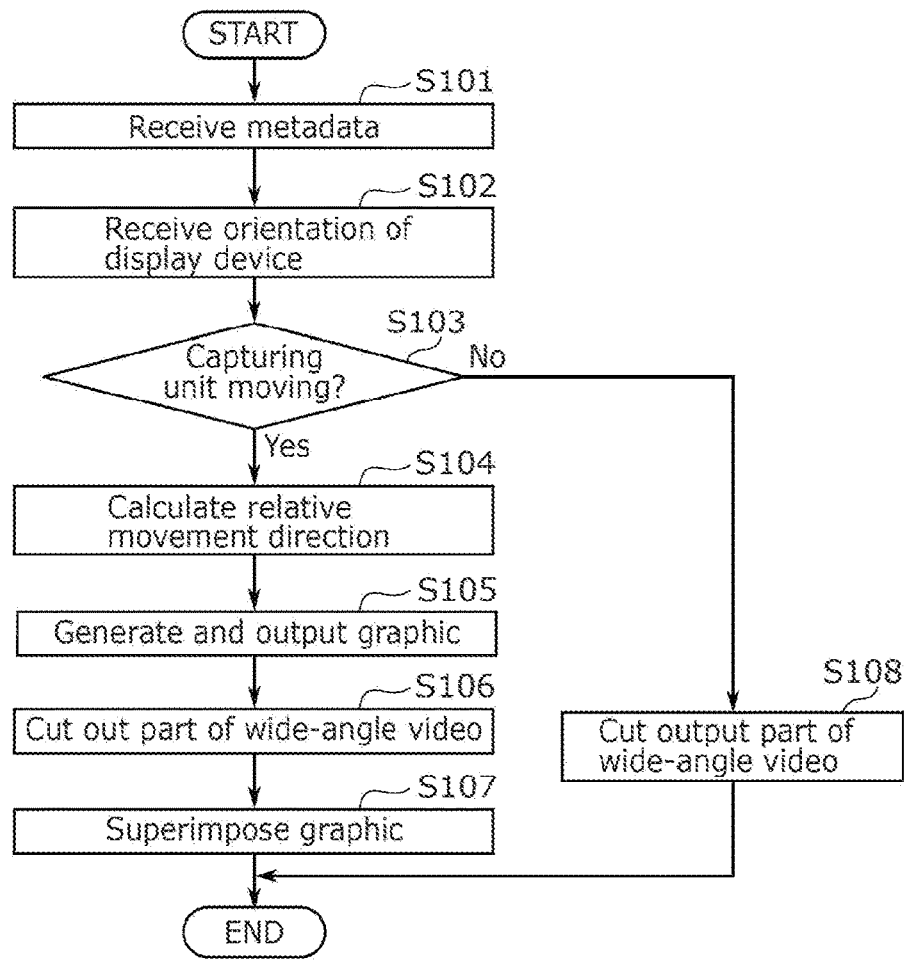
FIG. 17 is a flowchart illustrating operations performed by the video display system according to an embodiment.

Next, operations performed by video display system 500 configured as described above will be described with reference to FIG. 17 through FIG. 21. FIG. 17 is a flowchart illustrating operations performed by the video display system according to an embodiment.

When the operations of video display system 500 are started, video is captured by capturing unit 301, and input interface 302, position detection unit 303, data obtainment unit 304, and metadata obtainment unit 305 operate to obtain metadata including data related to the movement direction of capturing unit 301. The metadata is received together with the captured video by server device 200 via transmission unit 306 and reception unit 201 (S101).

Orientation estimation unit 102 of display device 100 continuously estimates the orientation of display device 100. Display device 100 transmits the orientation of display device 100 estimated by the orientation estimation unit to server device 200. As a result, server device 200 receives the estimated orientation of display device 100 (S102). Note that the order of steps S101 and S102 may be interchanged. Server device 200 determines whether capturing unit 301 is moving or not based on data related to the movement direction of capturing unit 301 (S103). If server device 200 determines that the capturing unit is moving (Yes in S103), server device 200 begins operations for presenting the relative movement direction to the user of display device 100. More specifically, differential calculation unit 202 calculates the movement direction of the video relative to the direction the user is viewing (i.e., equivalent to the orientation of display device 100) as the relative movement direction, based on the orientation of display device 100 and data related to the movement direction of capturing unit 301 in the metadata (S104).

Figure 18:
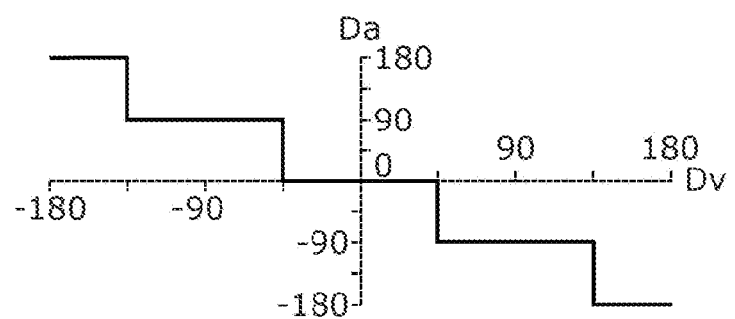
FIG. 18 is a first graph for illustrating the calculation of the relative movement direction according to an embodiment.
Figure 19:
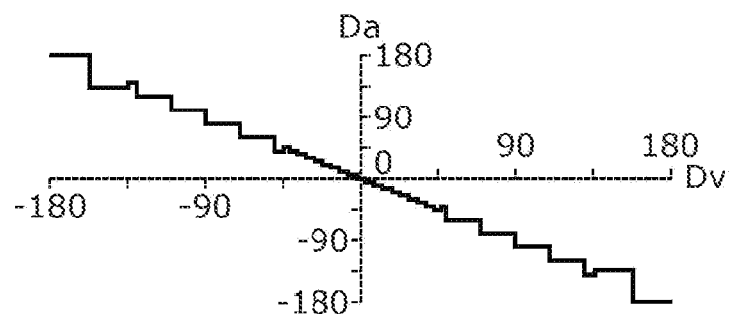
FIG. 19 is a second graph for illustrating the calculation of the relative movement direction according to an embodiment.

Next, the calculation of the relative movement direction will be described with reference to FIG. 18 and FIG. 19. FIG. 18 is a first graph for illustrating the calculation of the relative movement direction according to an embodiment. FIG. 19 is a second graph for illustrating the calculation of the relative movement direction according to an embodiment.

The calculation of the relative movement direction is performed, for example, using the following Expression (1).

[Math. 1]
$$Da = Do - Dv \quad (1)$$

In Expression (1), Do is the actual movement direction of capturing unit 301, Dv is the actual orientation of display device 100, and Da is the angular difference between them.

Usually, when people identify angles on an image, there is a range of angles that they consider to be the same. Furthermore, subtle differences in angles may not need to be taken into account when the relative movement direction of the video is shown on the image. In the present embodiment, such angular regions that need not be continuous are handled discretely, so that it is possible clarify approximately in which direction the video is moving. More specifically, in the present embodiment, a discrete display direction that changes by a first discrete value based on the actual orientation is used as the orientation of display device 100, and a discrete movement direction that changes in units of a second discrete value based on the actual orientation is used as the movement direction of capturing unit 301. Expression (2) shown below is formulated based on this.

[Math. 2]
$$Da = DD \times \left\{ \text{int}\left(\frac{Do - \frac{DD}{2}}{DD}\right) - \text{int}\left(\frac{Dv - \frac{DD}{2}}{DD}\right) \right\} \quad (2)$$

In Expression (2), int(x) is a function that truncates the decimal places of x, and DD is the first and second discrete values (same value). Note that the first and second discrete values do not have to be the same value. In Expression (2), a parallel shift of the graph, to give the graph point symmetry, is applied to the points in the direction (Dv=0) where the orientation of display device 100 coincides with the reference direction when capturing unit 301 moves in the reference direction (Do=0).

According Expression (2), when, for example, DD=90 degrees and Do=0, Da that increases or decreases discretely in units of 90 degrees with respect to Dv, as illustrated in FIG. 18, is obtained. In FIG. 18, when the reference direction is 0 degrees, the relative movement direction is 180 degrees when the user is oriented in a range of from −180 degrees or more and less than −135 degrees (−180≤Dv<−135), indicating that the video is moving behind the user. When the reference direction is 0 degrees, the relative movement direction is 90 degrees when the user is oriented in a range of from −135 degrees or more and less than −45 degrees (−135≤Dv<−45), indicating that the video is moving to the side of the user.

When the reference direction is 0 degrees, the relative movement direction is 0 degrees when the user is oriented in a range of from −45 degrees or more and less than 45 degrees (−45≤Dv<45), indicating that the video is moving in front of the user. When the reference direction is 0 degrees, the relative movement direction is −90 degrees when the user is oriented in a range of from greater than 45 degrees and less than or equal to 135 degrees (45<Dv≤135), indicating that the video is moving to the side the user. When the reference direction is 0 degrees, the relative movement direction is −180 degrees when the user is oriented in a range of from greater than 135 degrees and less than or equal to 180 degrees (135<Dv≤180), indicating that the video is moving behind the user.

Taking this discrete value as a constant may be problematic. For example, the user may be more discriminating about changes in the relative movement direction in front of the user, as opposed to changes in the relative movement direction behind the user. In such cases, the first discrete value may be varied according to the orientation of the user (orientation of display device 100). More specifically, DD=5 degrees when the user is oriented in a range of from greater than or equal to −45 degrees and less than or equal to 45 degrees (−45≤Dv≤45), DD=20 degrees when the user is oriented in a range of from greater than or equal to −135 degrees and less than −45 degrees and in a range of from greater than 45 degrees and less than or equal to 135 degrees (−135≤Dv<−45, 45<Dv≤135), and DD=45 degrees when the user is oriented in a range of from greater than or equal to −180 degrees and less than −135 degrees and in a range of from greater than 135 degrees and less than or equal to 180 degrees (−180≤Dv<−135, 135<Dv≤180). In this way, as illustrated in FIG. 19, the relative movement direction can be varied agilely when the user's orientation is close to the reference direction of movement of capturing unit 301, and the variation of the relative movement direction can be dulled as the user's orientation moves away from the reference direction of movement of capturing unit 301.

In this way, it is also effective to vary the first discrete value so that the value is larger when the actual orientation of display device 100 is 180 or −180 degrees compared to when the actual orientation of display device 100 is 0 degrees.

Figure 20:
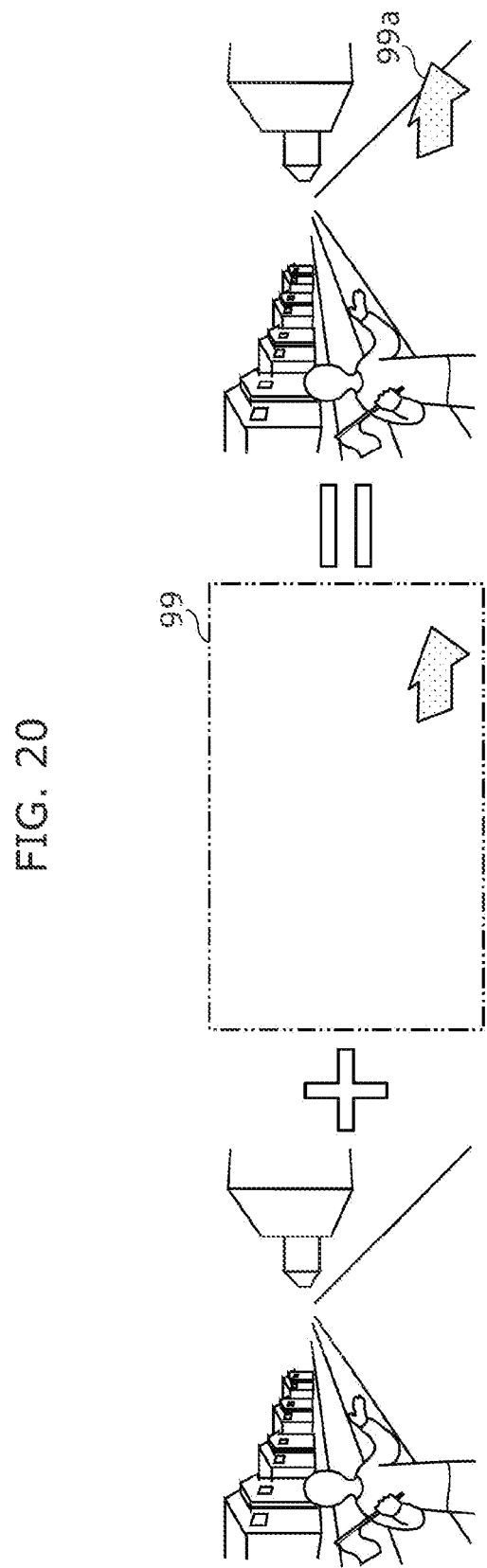
FIG. 20 conceptually illustrates the generation of display video according to an embodiment.

Returning to the flowchart in FIG. 17, after calculating the relative movement direction, presentation unit 203 generates a graphic corresponding to this relative movement direction (S105). Video generation unit 204 cuts out the viewing area corresponding to the orientation of display device 100 from the wide-angle video (S106) and superimposes the graphic generated by presentation unit 203 on the cut-out portion of the video to generate the display video (S107). FIG. 20 conceptually illustrates the generation of display video according to an embodiment. In FIG. 20, (a) illustrates a portion cut from the wide-angle video, (b) illustrates graphic 99 generated by presentation unit 203, and (c) illustrates the display video generated by superimposition. Superimposing graphic 99 on part of the video places arrow 99a pointing in the relative movement direction in the display video.

Figure 21:
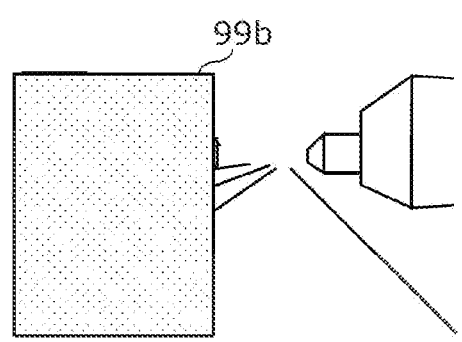
FIG. 21 conceptually illustrates another example of the generation of display video according to an embodiment.

FIG. 21 conceptually illustrates another example of the generation of display video according to an embodiment. While the direction is clearly visible with arrow 99a illustrated in FIG. 20, it may be difficult to see the changes on the video. Therefore, as illustrated in FIG. 21, mask 99b, which is an image partially covering the side of the image in the opposite direction of the relative movement direction, may be generated and superimposed as graphic 99 to impart a significant change on the display video. In this example, the user will naturally move their line of sight from the area covered by the mask to view the remaining video, whereby the direction of the eye movement will correspond to the relative movement direction, which has the advantage of making the change in the video easy to understand and making the relative movement direction naturally recognizable. The term "cover" here also includes covering the target area with an image in a semi-transparent state such that the target area partially appears through.

Returning again to the flowchart in FIG. 17, if server device 200 determines that the capturing unit is not moving (No in S103), server device 200 does not perform any operations for presenting the relative movement direction to the user of display device 100 and proceeds to step S108. Video generation unit 204 then cuts out the viewing area according to the orientation of display device 100 from the wide-angle video (S108), and uses the cut-out portion as-is as the display video.

In this way, the user can be made aware of the movement direction, so that even if the video subsequently moves, the user is less likely to have a discrepancy in their perception of the movement. Thus, with video display system 500, it possible to display appropriate videos on display device 100 in terms of inhibiting VR sickness and other symptoms.

Implementation Examples

Hereinafter, embodiments will be described in greater detail by way of implementation examples. This implementation example describes a more specific example of a solution to the technical problem of being prone to VR sickness. VR sickness is likely to occur when there is a discrepancy between the information obtained from visual and auditory senses and the acceleration information obtained from the vestibular senses (which cannot detect stimuli in the case of constant velocity motion). Although VR devices (for example, HMDs) can usually reproduce information with respect to the visual and auditory senses and can stimulate the visual and auditory senses, it is difficult to stimulate the vestibular organs to sense acceleration without installing a large-scale motion platform or the like, which is limited to VR devices found in facilities such as theme parks and VR game centers.

If users experience VR sickness while in the VR space during VR tourism, the VR tourism itself becomes a painful experience and users will stop using it. It is therefore important to avoid VR sickness.

When checking VR games, large equipment, buildings, etc., in VR, the end user can move at their own will. In such cases, jumping movement or "warp movement" is generally used to avoid "VR sickness".

In VR tourism, which involves 360° camera video in a VR space, the camera cannot be moved of its own volition. The local photographer will have to move the camera. The end user is prone to VR sickness if this camera movement is done independently of their own will, similar to the phenomenon of getting sick in the passenger seat of a car.

For example, in a roller coaster VR experience, the end user cannot decide the direction in which they move, but they can anticipate the direction in which the ride will move, so such an experience is less likely to make them sick as when driving a car.

If the 360° camera moves or pans (changing the default direction of travel) when the VR viewer does not intend it to happen (or cannot predict that it will happen), there is a risk of VR sickness.

Figure 22:
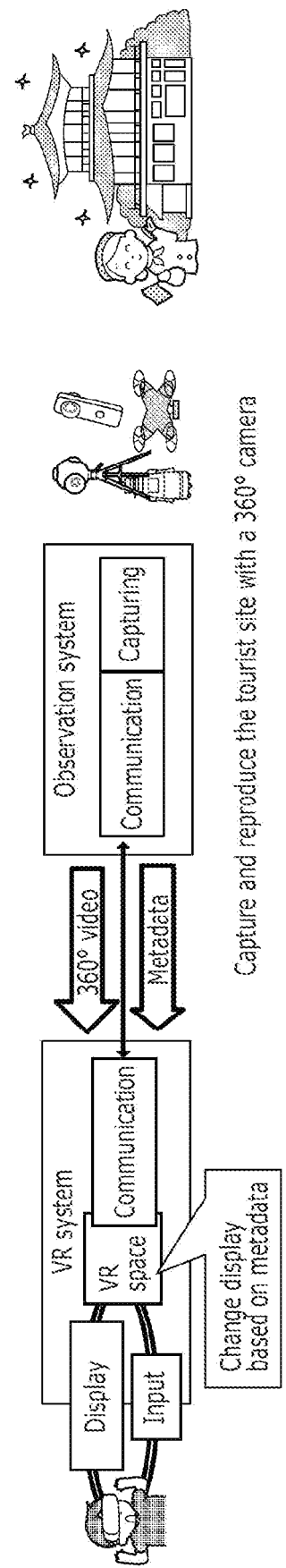
FIG. 22 is a schematic diagram of an example of the configuration of the video display system according to an implementation example.
Figure 23:
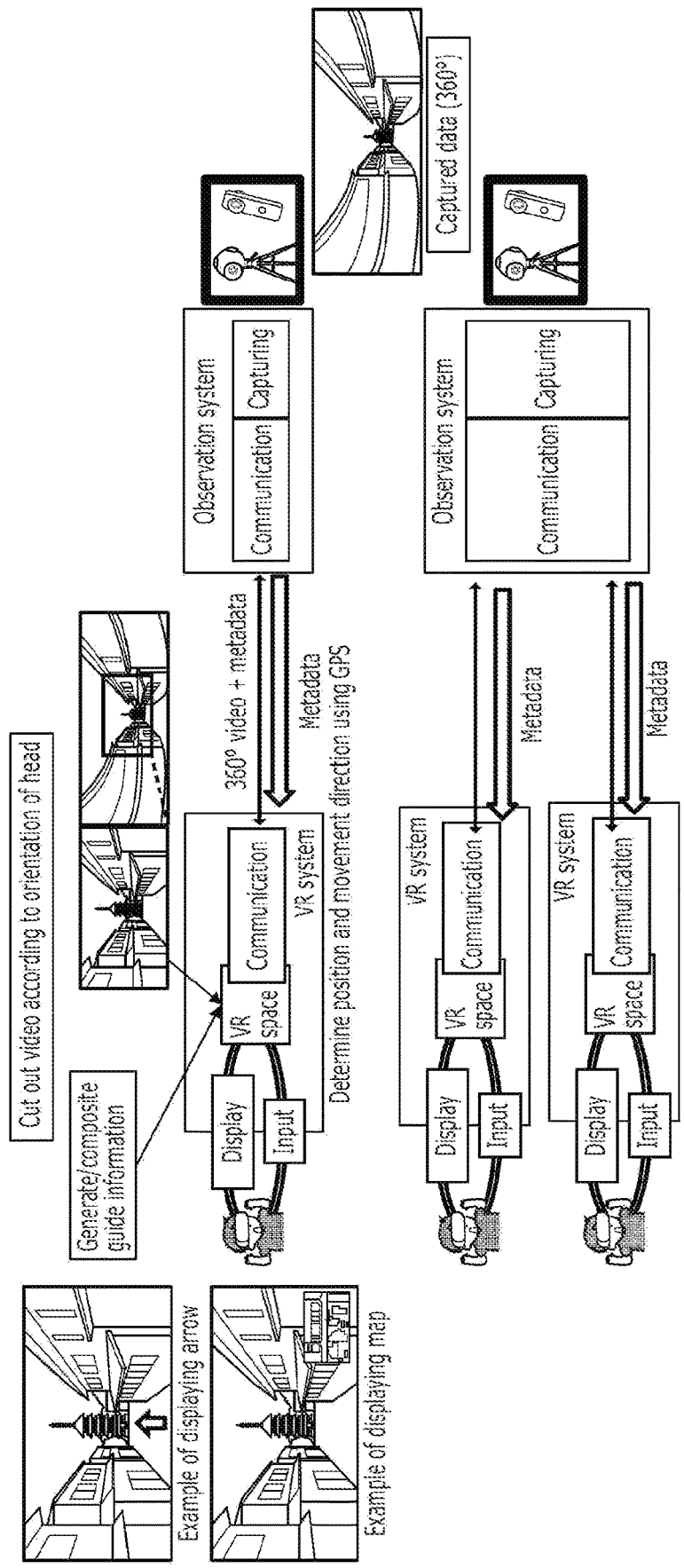
FIG. 23 is a schematic diagram of another example of the configuration of the video display system according to an implementation example.

FIG. 22 is a schematic diagram of an example of the configuration of the video display system according to an implementation example. FIG. 23 is a schematic diagram of another example of the configuration of the video display system according to an implementation example.

In the present invention, in order to avoid VR sickness caused by the movement of a 360° camera used for capturing video for VR tourism or the like, metadata (such as the start time of camera movement or panning and the movement direction thereof) is sent from the observation system to the VR system in addition to the 360° video. The VR system side generates visual effects (for example, generates graphics to be displayed on the screen) and non-visual effects (for example, sounds and controller vibrations) immediately before and during the camera movement to appropriately inform the viewer of the movement. This means that visual effects video that differs from usual video can be displayed to prompt the user to take preparations and to avoid getting sick, thereby avoiding (reducing) VR sickness.

The photographer holding the 360° camera at the remote location transmits 360° video along with metadata, and the VR equipment generates CG that informs of the movement direction based on alpha information and composites it with the transmitted 360° video. This allows the viewer to prepare for the movement, thereby reducing VR sickness and allowing the viewer to watch the video. Therefore, according to the present invention, when providing VR tourism services, VR sickness can be reduced and thus a more comfortable VR tourism experience can be provided.

Figure 24:
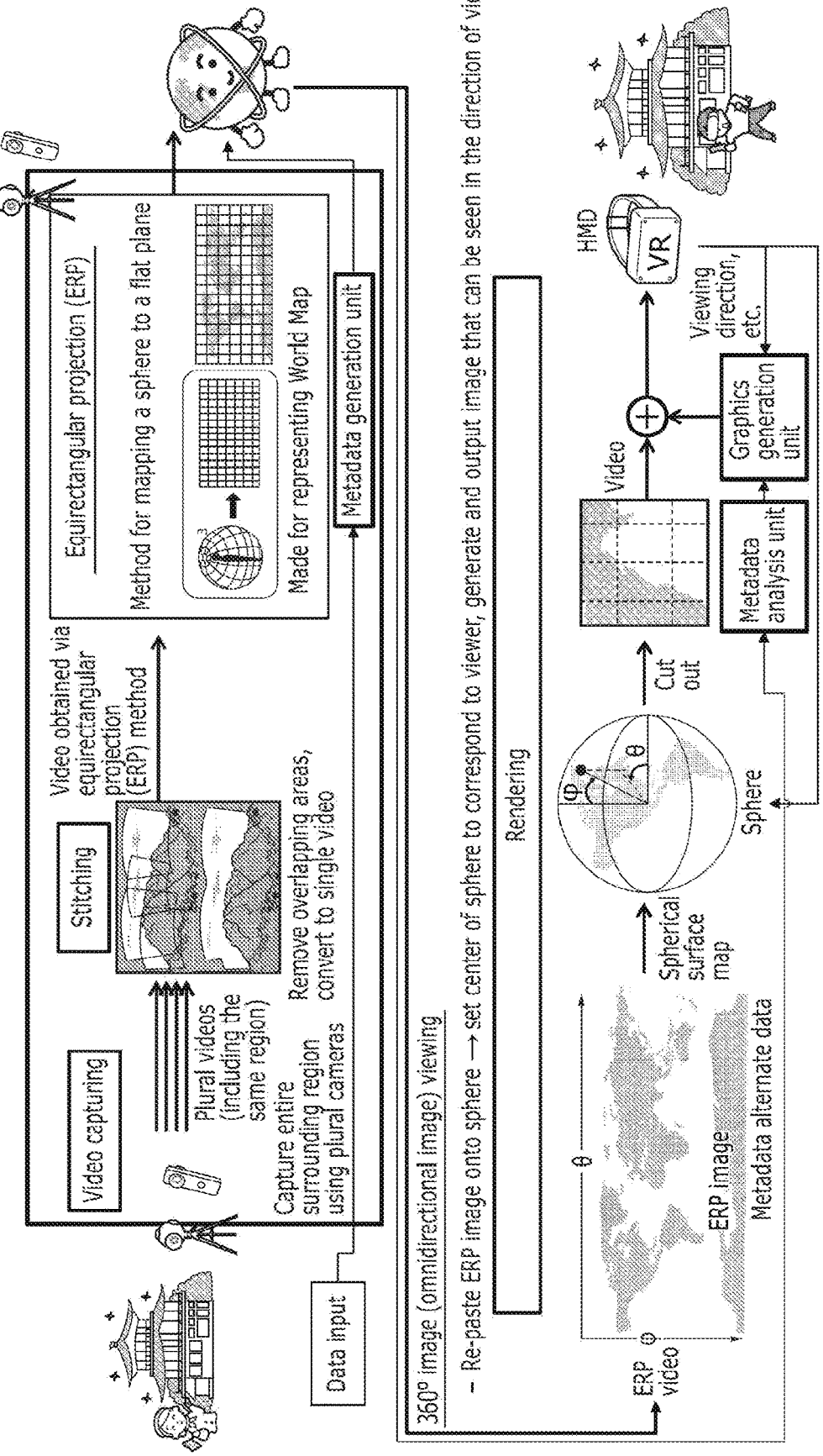
FIG. 24 illustrates one example of the configuration the entire video display system according to an implementation example.

FIG. 24 illustrates one example of the configuration the entire video display system according to an implementation example. Next, the configuration of the implementation example of the present invention will be described in detail. Compared Conventional Examples 1 and 2, the present invention additionally generates, in the observation system, metadata indicating the orientation and position of the observation system, sends it to the VR system, and performs appropriate processing on VR system side in order to reduce VR sickness. Moreover, the present invention prevents the user from becoming "lost" by providing appropriate guidance in the VR space through the obtainment of orientation and position in the VR space. Next, the differences from Conventional Example 2 will be described.

Closed communication units between plural VR systems may be further added to the configuration described here. Later, differences for when information from the observation system is pre-recorded in the case of operation from the VR system side will be described relative to the following basic configuration.

The configuration of the present invention is the same as in Conventional Example 2 in regard to capturing, stitching, ERP image conversion, and sending in the observation system, and, in the VR system, receiving, conversion from ERP image to spherical video, and cutting out the display image to be displayed on the VR system according to orientation and position of the VR system.

In the present invention, the observation system includes a metadata generation unit on the VR system side for generating metadata to inform of the orientation, position, or movement direction. The metadata generation unit generates metadata, including the movement, orientation, and position of the VR capturing device, by the guide or photographer on the observation system side entering data using a data input device, or by the data obtainment unit obtaining data related to the capturing position and movement direction of the observation system. The generated metadata is sent from the communication device to the VR system together with video (wide-angle video), audio, etc.

The VR system extracts the metadata from the communication device and sends the metadata to the metadata analysis unit. Here, as one example, an appropriate message is generated for the user of the VR system based on the contents of the metadata and the orientation and position of the VR system (estimation of the orientation of the user's face (head) by head tracking using the rotation detection unit (described later) and the motion and position sensor, and the detection of the position and movement of the VR system), for example, an arrow as an instruction for the user to move is generated as a graphic by the graphics generation unit, superimposed on the VR video (field of view video), and displayed on the VR display device.

In addition to displaying graphics, the system may also provide instructions via audio as well as appropriately process the VR video.

Although not illustrated, vibration can also be applied to the operation input unit (controller) of the VR system as appropriate according to the metadata and orientation/position of the VR system.

Figure 25:
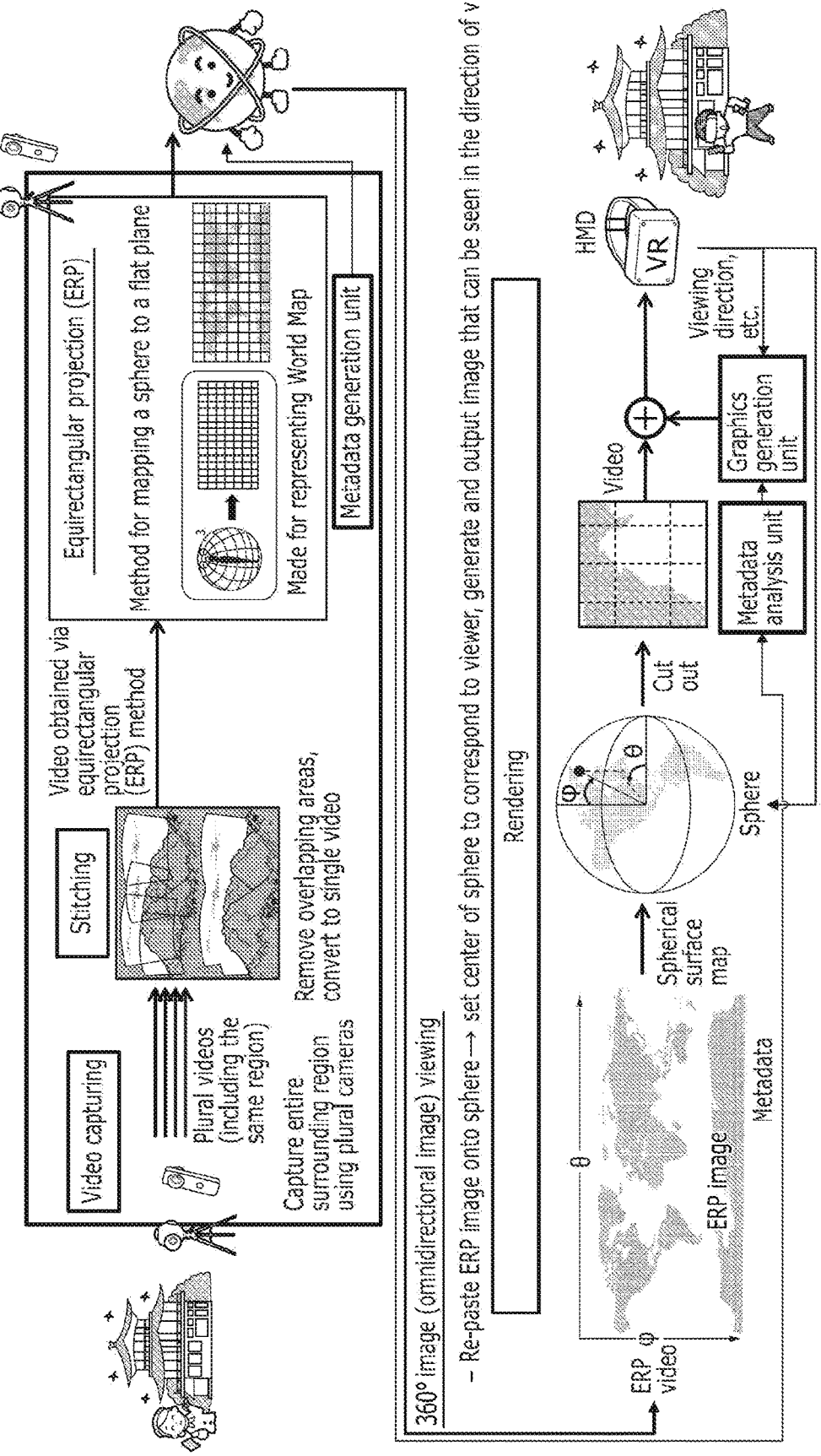
FIG. 25 illustrates another example of the configuration the entire video display system according to an implementation example.

FIG. 25 illustrates another example of the configuration the entire video display system according to an implementation example. In another example of one implementation example of the present invention, the guide or photographer on the observation system side does not input data using a data input device, but rather generates metadata by detecting the orientation, position, and movement of the observation system, or by detecting appropriate markers from the captured video.

The metadata generation unit generates metadata based on the captured video or the orientation, position, and motion information of the observation system, and sends it to the VR system via the communication device. The configuration on the VR system side is the same as in the above implementation example. Stated differently, the data input device is not an essential component of the present invention; the invention can be implemented without including a data input device.

Two important elements in the present invention are (i) a method for switching video to avoid VR sickness, and (ii) a method for detecting, recording, and transmitting direction and orientation. (i) includes four additional sub-elements: a method for switching video when changing direction, a method for switching video when changing location, a method for sending video when moving on foot, and a method for sending video when moving in a vehicle. (ii) includes two additional sub-elements: the detection of direction and orientation and the transmission of direction and orientation.

Figure 26:
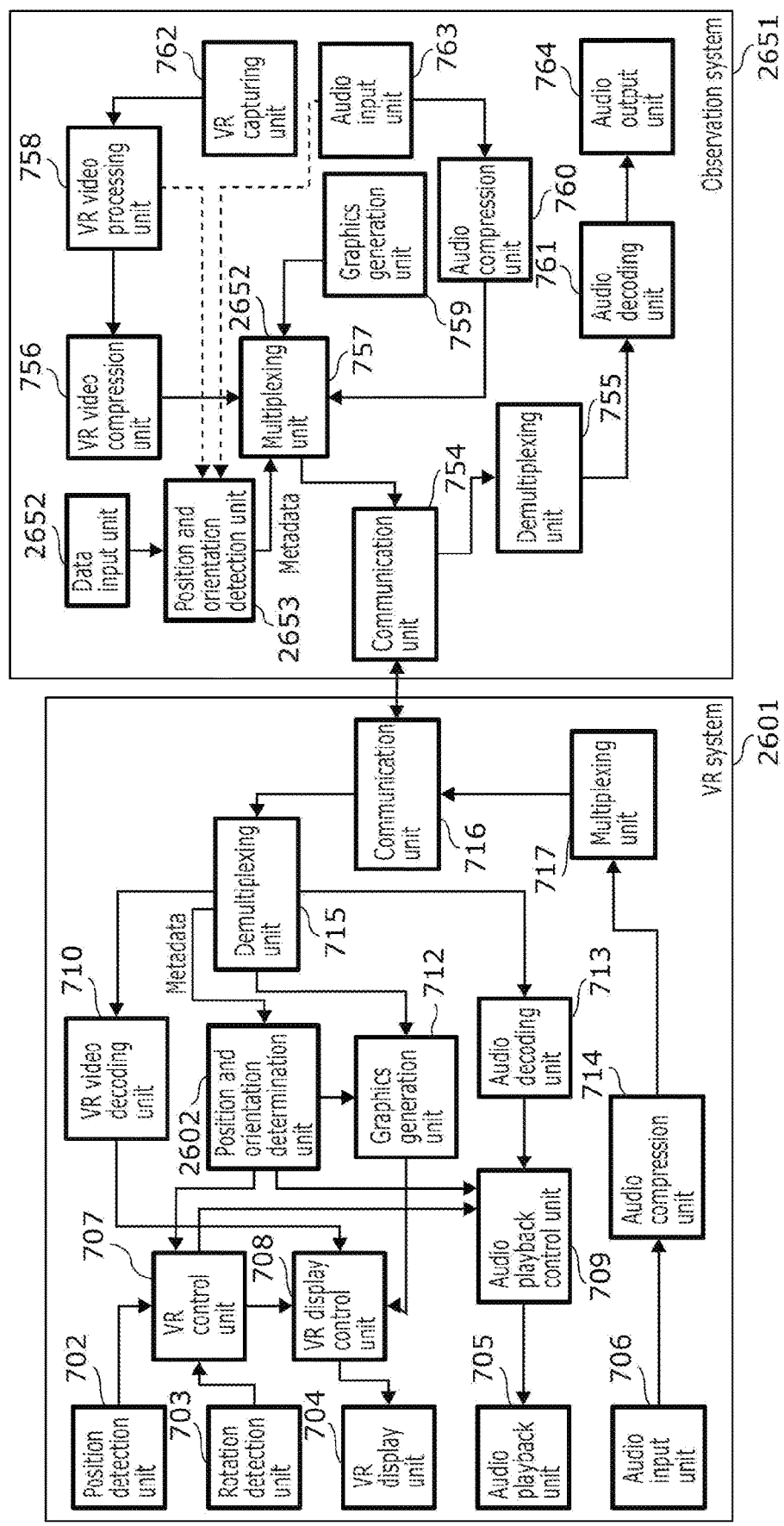
FIG. 26 illustrates one example of the functional configuration of the video display system according to an implementation example.
Figure 27:
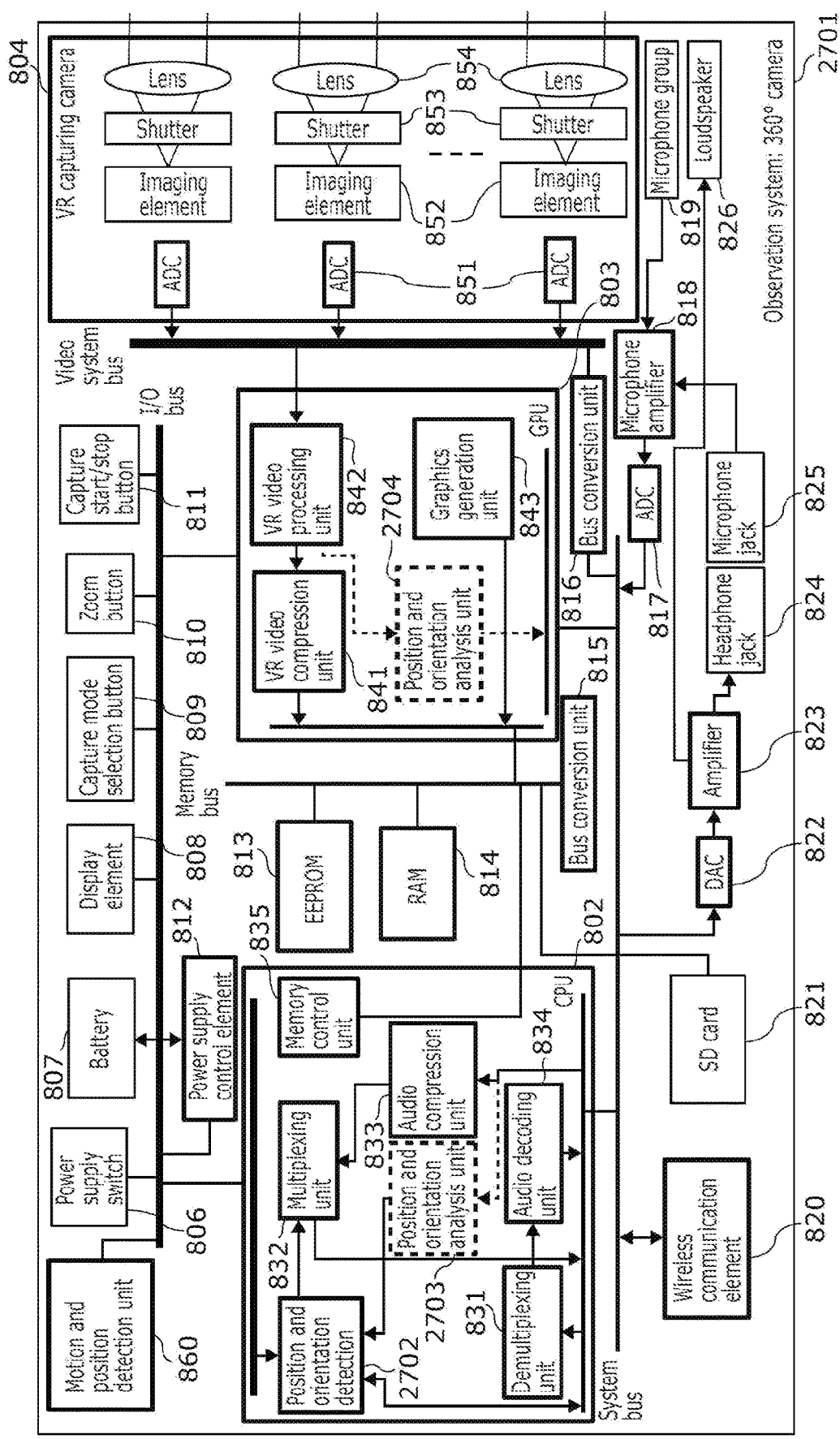
FIG. 27 illustrates one example of the functional configuration of the observation system according to an implementation example.
Figure 28:
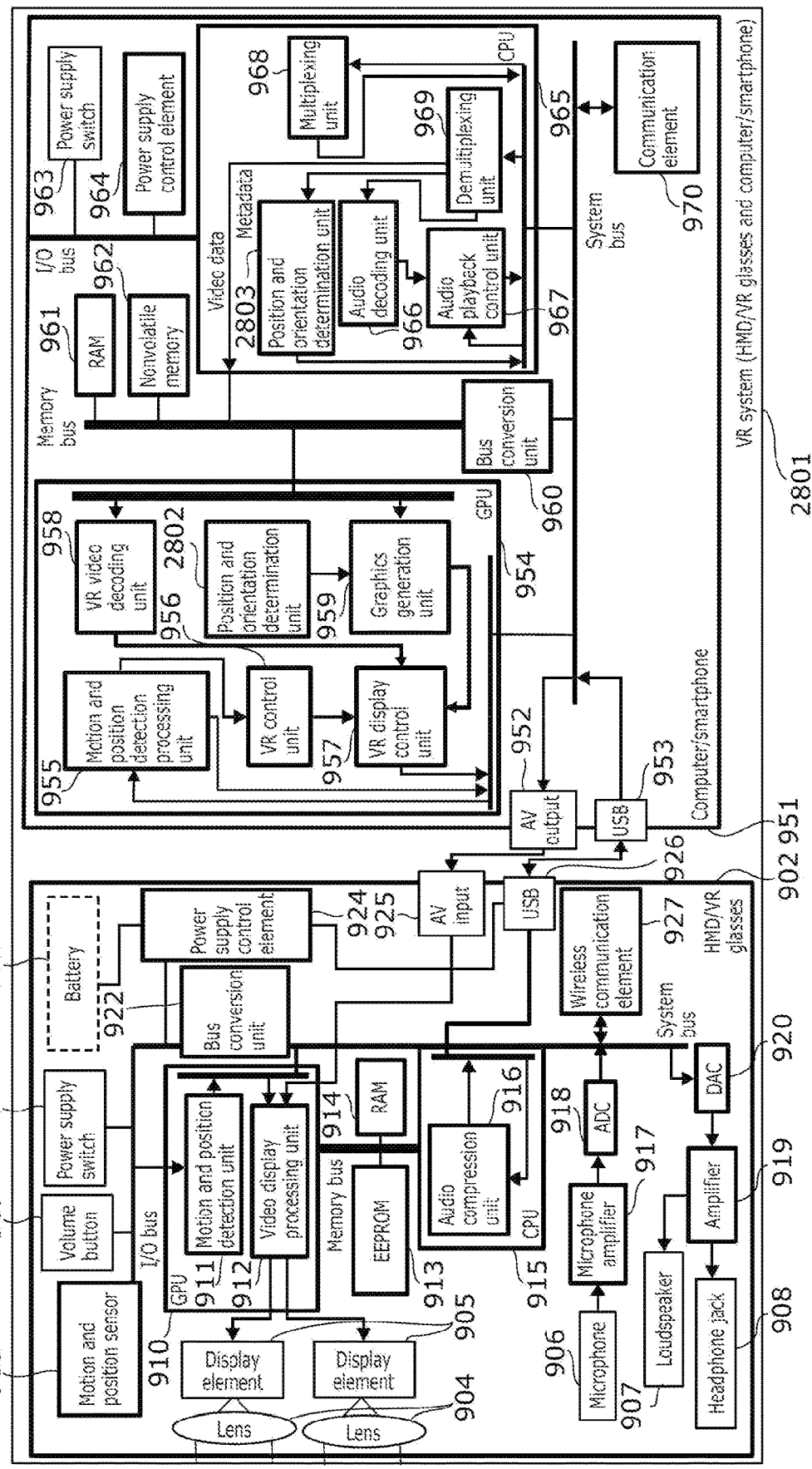
FIG. 28 illustrates one example of the functional configuration of the VR system according to an implementation example.

FIG. 26 illustrates one example of the functional configuration of the video display system according to an implementation example. FIG. 27 illustrates one example of the functional configuration of the observation system according to an implementation example. FIG. 28 illustrates one example of the functional configuration of the VR system according to an implementation example.

A realization example of a 360° camera in the realization example of observation system (observation device) 2651 according to an implementation example of the present invention will be described with reference to FIG. 26 and FIG. 27.

360° camera 2701 according to one implementation example of the present invention is almost the same as the realization example of the 360° camera according to Conventional Example 2. The differences will be described below. With 360° camera 2701 in an implementation example according to the present invention, position and orientation detection unit 2702 is added as a program of CPU 802. The metadata based on the position and orientation detected by position and orientation detection unit 2702 is multiplexed and transmitted to VR system (display device) 2601 via wireless communication element (transmission unit) 820.

The detection of the position and orientation is carried out by detecting the direction of movement, position, and the timing of movement, but the camera operator uses a movement input button (data input unit (input interface)) to input the position and direction of the destination and the timing of the movement, whereby this information is processed in position and orientation detection unit 2702 (data obtainment unit, metadata conversion unit) and transmitted to VR system 2601 as metadata.

In some cases, position and orientation analysis units 2703 and 2704, indicated by dashed lines, are used to detect the timing of the start of movement by analyzing the captured video, to detect the position and orientation of the destination by comparison with a pre-designated image to detect the destination, to detect the direction of the destination by analyzing the hand gestures and body movements of the guide, to detect the direction and position of the destination by providing a button and light-emitting element such as an LED on a pointer held by the guide and detecting a light pattern emitted in a pulse by the light-emitting element upon the guide pressing the button, or to select one of a plurality of predetermined destinations. Alternatively, audio from the microphone is analyzed to identify the destination from the words spoken by the guide to detect the movement direction, which is converted into appropriate metadata by position and orientation detection unit 2702 executed by CPU 802 and transmitted to VR system 2601.

Next, a realization example of VR system (display device) 2601 according to one implementation example of the present invention will be described with reference to FIG. 26 and FIG. 28.

Here, description will focus on the differences between VR system 2601 according to one implementation example of the present invention and the VR system according to Conventional Example 2.

In one implementation example, position and orientation determination units 2802 and 2803 are added as programs to CPU 965 and GPU 954 of computer/smartphone 2801 of the VR system according to Conventional Example 2.

In position and orientation determination unit 2803 of CPU 965, the position and orientation of observation system 2651 or the guide or a target is received as metadata from observation system 2651 via communication element (reception unit) 970, and if changing the audio, the guide audio is generated by audio playback control unit 967 realized by a program in CPU 965 and the playback audio is appropriately processed. When position and orientation determination unit 2803 of CPU 965 is configured to change the VR video or graphic, the metadata is sent to GPU 954 via the system bus.

GPU 954 processes the metadata received by position and orientation determination unit 2802, processes the information in graphics generation unit 959 for displaying it as a graphic, superimposes it on the VR video in VR display control unit 957 and displays it, or sends the metadata to VR control unit 956, processes the VR video in VR display control unit (display control unit) 957 together with the information from motion and position sensor 903 and the position and orientation state of VR system 2801 detected by the motion and position detection processing unit (detection unit) 955, the video data is sent from AV output 952 to AV input 925, and is displayed as VR video (field of view video) by video display processing unit 912 on a display element (display unit).

Each of the above audio, graphic, and VR video processes may be realized independently and without other processing, or multiple processes may be realized and processing may be selected while the VR system or observation system is operating.

The position and orientation detection process performed by observation system 2651 may also be realized by a computer system between observation system 2651 and VR system 2801, such as a cloud. In such cases, observation system 2651 does not send metadata, or the data input by the operator is sent out as metadata. Via the position and orientation detection unit, which is in the cloud, the position, orientation, or movement of the observation system, guide, or target is detected from the video, audio, or metadata sent from the observation system, and sent to the VR system as metadata. This makes it possible to achieve the advantageous effect of this implementation example using existing 360° cameras.

Whether a process is performed by GPU 954 or CPU 965 may differ from this example, and the bus configuration may also differ from this example, but even in such cases, there is no difference in the functional configuration and operations that will be described below.

Regarding an integrated VR system, the present implementation example is almost the same as the conventional example, and small integrated VR system can be realized by realizing the functions of CPU 965 and GPU 954 as a single unit.

Figure 29:
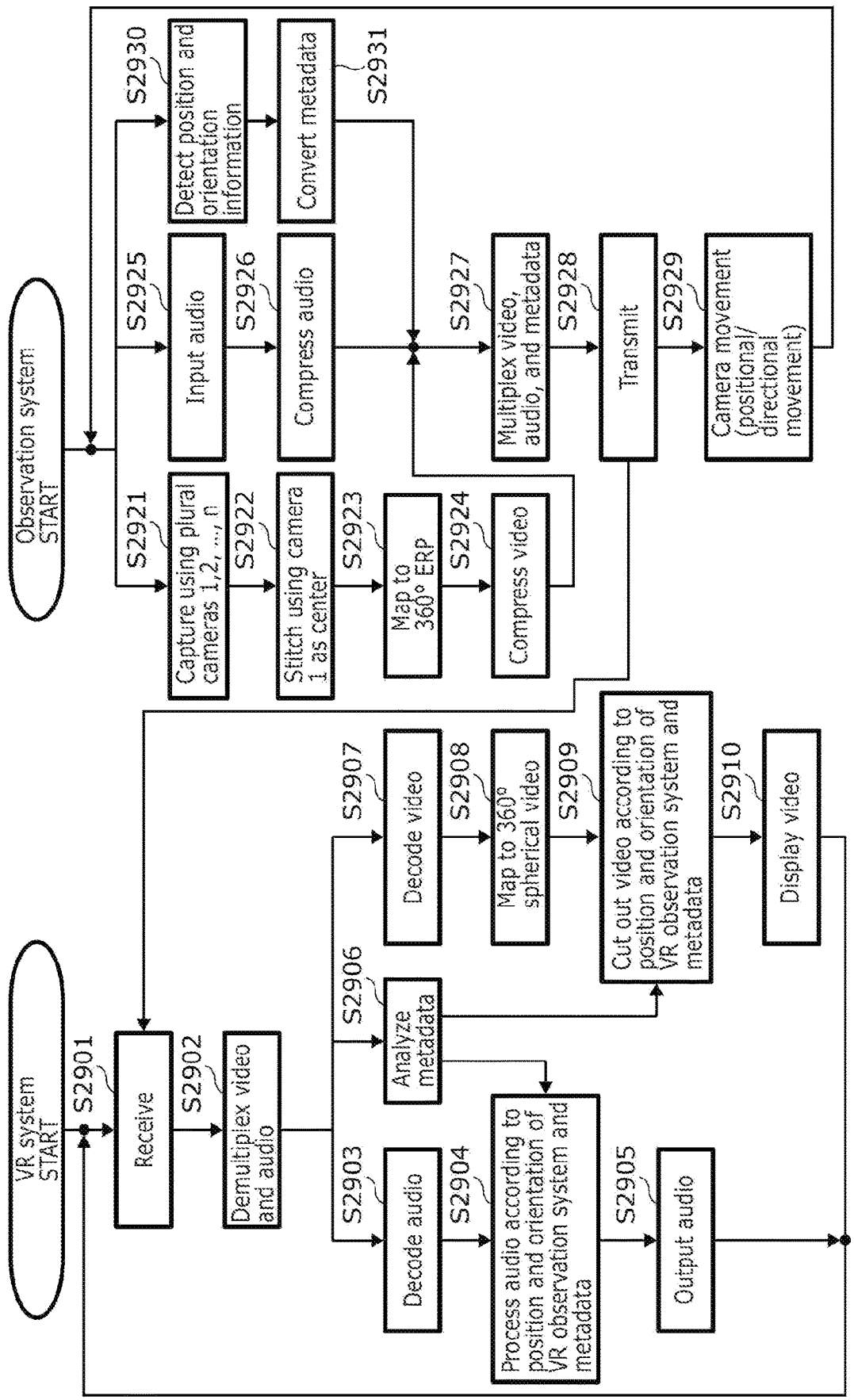
FIG. 29 illustrates one example of the flow of operations performed by the video display system according to an implementation example.

FIG. 29 illustrates one example of the flow of operations performed by the video display system according to an implementation example. Next, operations according to the implementation example of the present invention will be described.

The basic operations of audio input in the observation system and VR video input from the VR capturing camera, and graphics, as well as the basic operations of audio information, video information, and graphics in the VR system, are the same as in Conventional Example 2, and are therefore omitted.

In the position and orientation information detection step of the observation system according to an implementation example of the present invention, the position and orientation of the observation system are detected by the position and orientation information detection unit (data obtainment unit) realized by a program in the CPU, from signals from the motion and position detection unit (S2930). In the next metadata detection step, the detected position and orientation are converted into metadata (S2931), and in the next video/audio/metadata multiplexing step, the video, audio, graphics, and metadata are multiplexed by the multiplexing unit (S2927). In the next transmission step, the multiplexed information is sent to the VR system by the wireless communication element (S2928).

Here, when the position and orientation are detected by analyzing the video captured by the VR capturing camera or the audio input by the audio input unit, the operator of the observation system or the guide may enter the position and orientation by using a movement input button. In the case of detection from sound, the sound is analyzed by the position and orientation analysis unit, which is realized by a program in the CPU, and the analysis results are transmitted to the position and orientation detection unit. If analyzing video, the video is analyzed by a position and orientation analysis unit, which is realized by a GPU program or dedicated circuit, and the analysis results are sent to the position and orientation detection unit of the CPU via the system bus.

The movement input button may be a switch like on a remote control or a GUI like on a smartphone. Position and orientation analysis is based on speech recognition, specifically the recognition of words such as right side, left side, etc., the addition or modulation within the audible bandwidth of audio emitted from a tool held by the guide and the analysis of instructions related to position and orientation from the input audio, the recognition of the guide and specific buildings or views from captured images and the comparison with the position and orientation of the observation system, the capturing and recognition of the movement of a tool held by the guide for giving instructions, such as a small flag, and the analysis video capturing the emission of an appropriate pulse of visible light or non-visible light such as infrared light from a tool held by the guide.

In addition to sending the position and orientation information to the VR system as metadata, the graphics generation unit of the GPU can generate graphics data from the information in the position and orientation detection unit, such as graphics data of an arrow indicating the movement direction, and send the generated graphics data to the VR system.

The VR system receives metadata sent from the observation system by the computer/smartphone in the receiving step via the communication element (S2901), and the metadata is demultiplexed in the demultiplexing unit of the CPU in the video/audio/metadata demultiplexing step (S2902) and sent to the position and orientation determination unit of the CPU and the position and orientation determination unit of the GPU via the memory bus. In the metadata analysis step, the position and orientation determination unit of the CPU analyzes the metadata (S2906) and sends the obtained position and orientation information to the audio playback control unit of the CPU or to the VR control unit or the graphics generation unit of the GPU via the memory bus. Alternatively, the position and orientation determination unit of the GPU analyzes the metadata, which is then sent to the VR control unit or the graphics generation unit of the GPU.

In the video cutout step based on the position and orientation of the VR system and the metadata, audio, video, and graphics processing (for example, step S2304 and step S2309) based on the position and orientation information sent from the observation system are performed in the audio playback control unit, the VR control unit, and the graphics generation unit, respectively.

More specifically, the audio processing unit may play a guide sound indicating the movement direction, play noise before the start of movement, for example, the rattling sound of a vehicle starting to move, change the sound level from the observation system or play appropriate sound effects while moving, or change the spatial spread to make only the movement direction clear.

In the VR control unit, the frame rate can be reduced to achieve a time-lapse frame-by-frame effect, still images can be taken while moving, and the visuals may be returned to video when the movement is complete. The resolution can be reduced except for the display of the movement direction, the VR video can be tilted according to the movement direction and movement speed, and areas other than the display of the movement direction can be masked and made difficult to see.

If the position and orientation information is sent as graphics information to the graphics generation unit, graphics are generated in the graphics generation unit and are superimposed on the VR video with appropriate changes to the direction in the VR display control unit. When graphics are generated on the VR system side, a portion of the video other than in the frontal plane in the movement direction may be masked with a semitransparent graphic, or an arrow indicating the movement direction may be displayed, or a map showing movement may be displayed.

The above processes may be handled by the observation system or a computer system such as a cloud-based computer system that is between the observation system and the VR system.

Steps not described above are omitted here since they can be referenced by way of similar steps in FIG. 13. More specifically, step S2303 corresponds to step S1303, step S2305 corresponds to step S1305, step S2307 corresponds to step S1307, step S2308 corresponds to step S1308, step S2310 corresponds to step S1310 step S2321 corresponds to step S1321, step S2322 corresponds to step S1322, step S2323 corresponds to step S1323, step S2324 corresponds to step S1324, step S2325 corresponds to step S1325, and step S2326 corresponds to step S1326.

Figure 30:
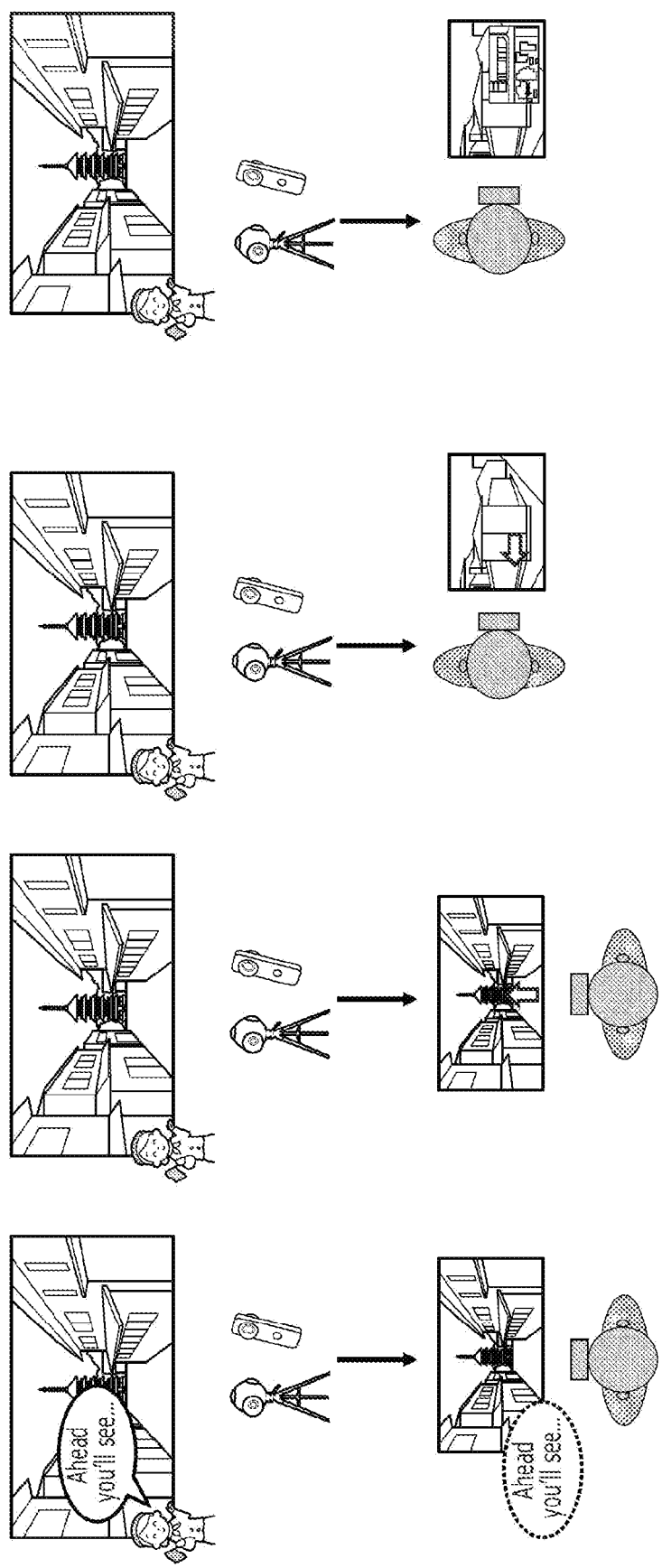
FIG. 30 illustrates the results of operations performed by the video display system according to one implementation example.

FIG. 30 illustrates the results of operations performed by the video display system according to one implementation example. The example in FIG. 30 illustrates a case where a graphics displaying arrows are superimposed. More specifically, the position and orientation determination unit receives the position and orientation of the observation system or the guide or a target object as metadata, transmits this information to the graphics generation unit for displaying it as a graphic, and superimposes it on the VR video in the VR display unit.

For example, in the leftmost example in the figure, when the tour is stopped, a still image in the forward direction is shown. Next, in the second example from the left, just before the tour starts to move again, an arrow indicating the direction in which to move is shown. Next, in the third example from the left, if the user of the VR system is facing right, the arrow will point left, if the user is facing left, the arrow will point right, and if the user is facing backward, the arrow will point backward (in the figure, the arrow pointing left when facing right is shown as one example). When the user changes direction, the display indicates an arrow pointing forward, as in the second example from the left. Since the display is based on the user turning their orientation in the direction of travel, the arrow will be a right or left arrow (not an arrow pointing forward) until the direction of travel and the user's orientation are approximately the same. This is also true for changes in direction from left to right. Next, in the rightmost example, a map is displayed. In cases in which a map is displayed, the arrow and the map are appropriately rotated according to the orientation as well.

Figure 31:
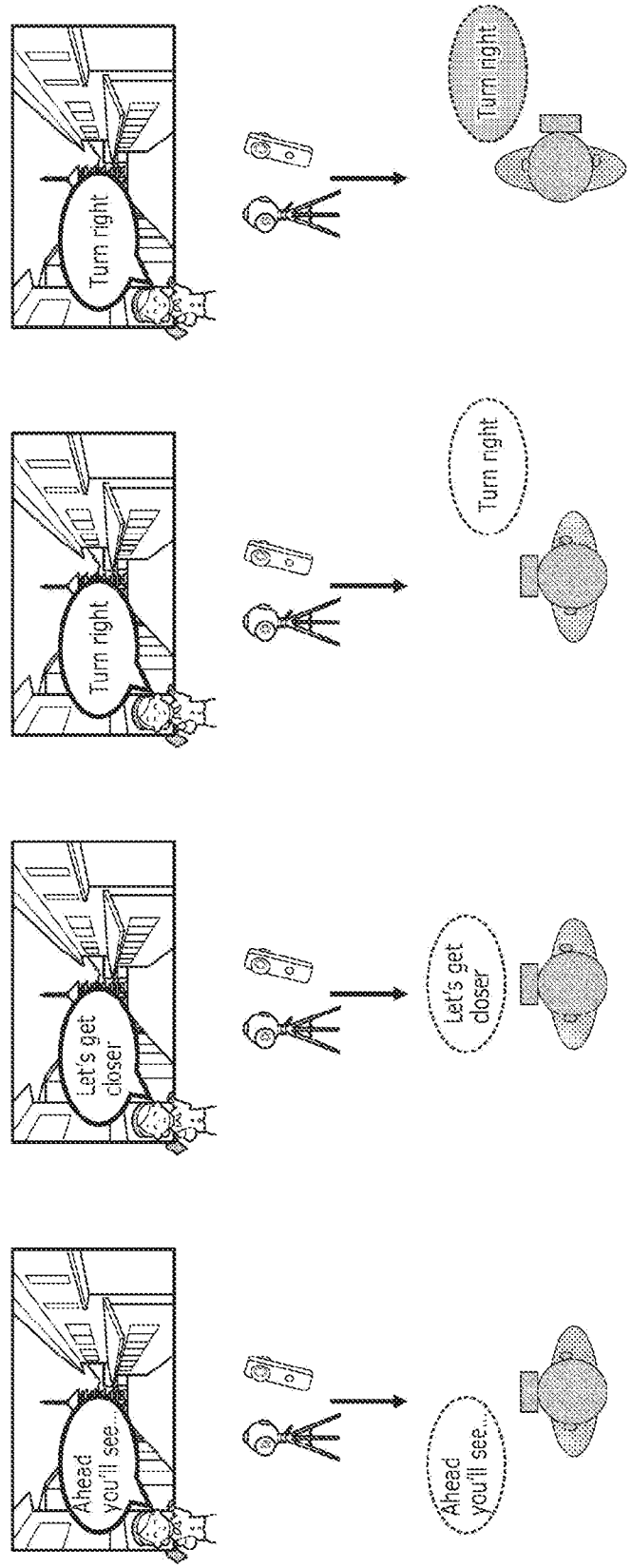
FIG. 31 illustrates the results of operations performed by the video display system according to one implementation example.

FIG. 31 illustrates the results of operations performed by the video display system according to one implementation example. The example in FIG. 31 illustrates a case where an audio guide is played. More specifically, the position and orientation determination unit receives the position and orientation of the observation system or the guide or a target object as metadata, and this information is used to generate guide audio and process the playback audio appropriately via the audio playback control unit.

For example, in the leftmost example, when the tour is stopped, audio is played so that the guide's voice is heard from the left side, which is the side on which the guide is standing. Next, the second example from the left shows how the guide's voice can be heard from the front as the guide begins to walk straight ahead. In the case of a car or other mobile object, the sound of vibration is heard before moving. Next, the third example from the left shows how, when starting to turn right, a guide's voice can be heard from the right side saying "turn right". Next, the rightmost example shows how the voice of the guide is heard from the left or front if the user of the VR system turns to the right or back and the original right hand side changes to correspond to the left hand side. If there is confusion, replace "right" with "left" in the audio, or use arrows or other means in combination with graphics to indicate direction.

Figure 32:
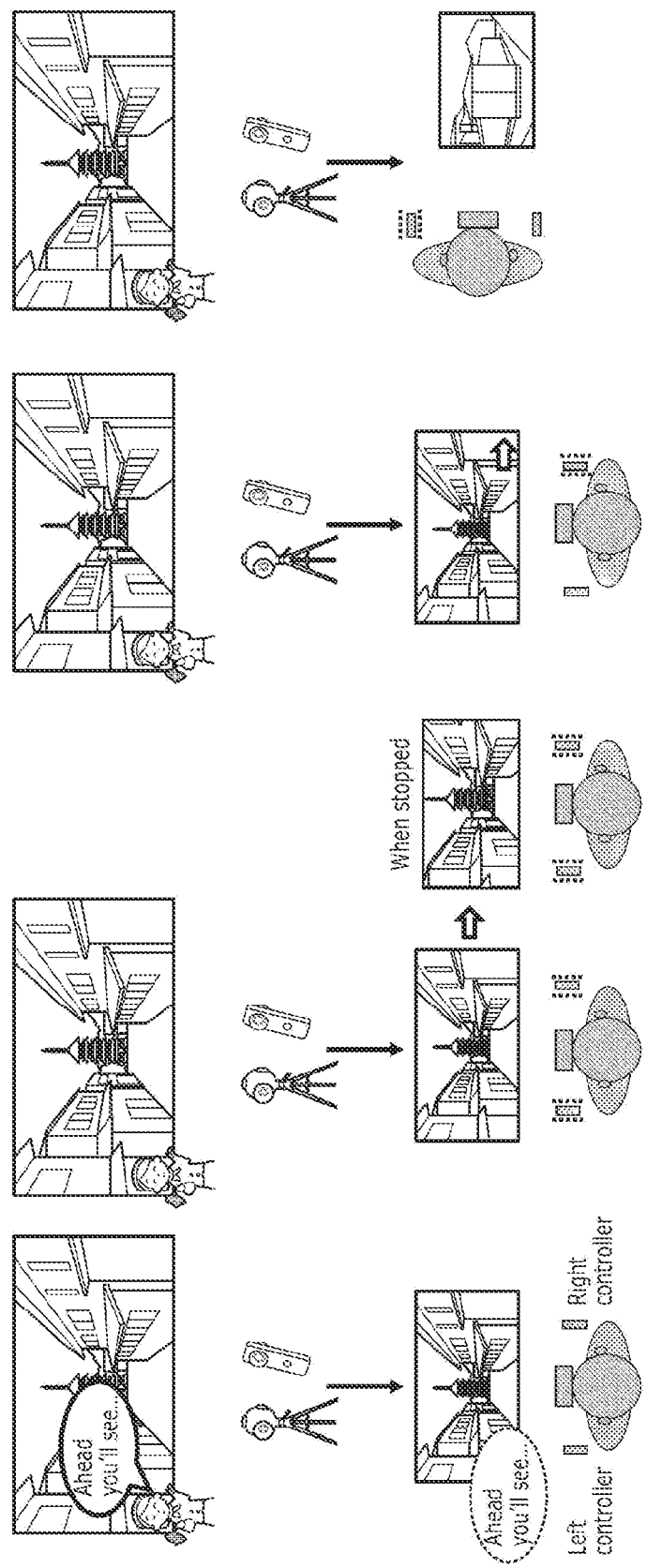
FIG. 32 illustrates the results of operations performed by the video display system according to one implementation example.

FIG. 32 illustrates the results of operations performed by the video display system according to one implementation example. The example in FIG. 32 illustrates a case in which the controllers vibrate. More specifically, it is possible to convey that the VR system is moving by vibrating a control unit (controller), etc., held by the operator of the VR system, or, if there are two or more controllers, to convey the movement direction via vibration with by selecting one controller and vibrating it, or to convey the movement speed by vibration by varying the strength of the vibration. The movement speed may be conveyed by a combination of graphics, such as by the color and size of the arrows, and may be conveyed by the loudness of the audio.

For example, in the leftmost example in the figure, when the tour is stopped, a still image in the forward direction is shown, and the controllers are not vibrated. Next, the second example from the left shows how the left and right controllers vibrate just before the tour starts moving in the case of moving straight ahead. Patterns may also be employed, such as vibrating lightly while moving and vibrating strongly just before stopping. The vibration patterns are not limited to this example. Next, the third example from the left shows how only the right controller vibrates when turning to the right. Next, the rightmost example shows how, if the user of the VR system is facing right, the left controller vibrates and continues to vibrate until the user faces forward.

Figure 33:
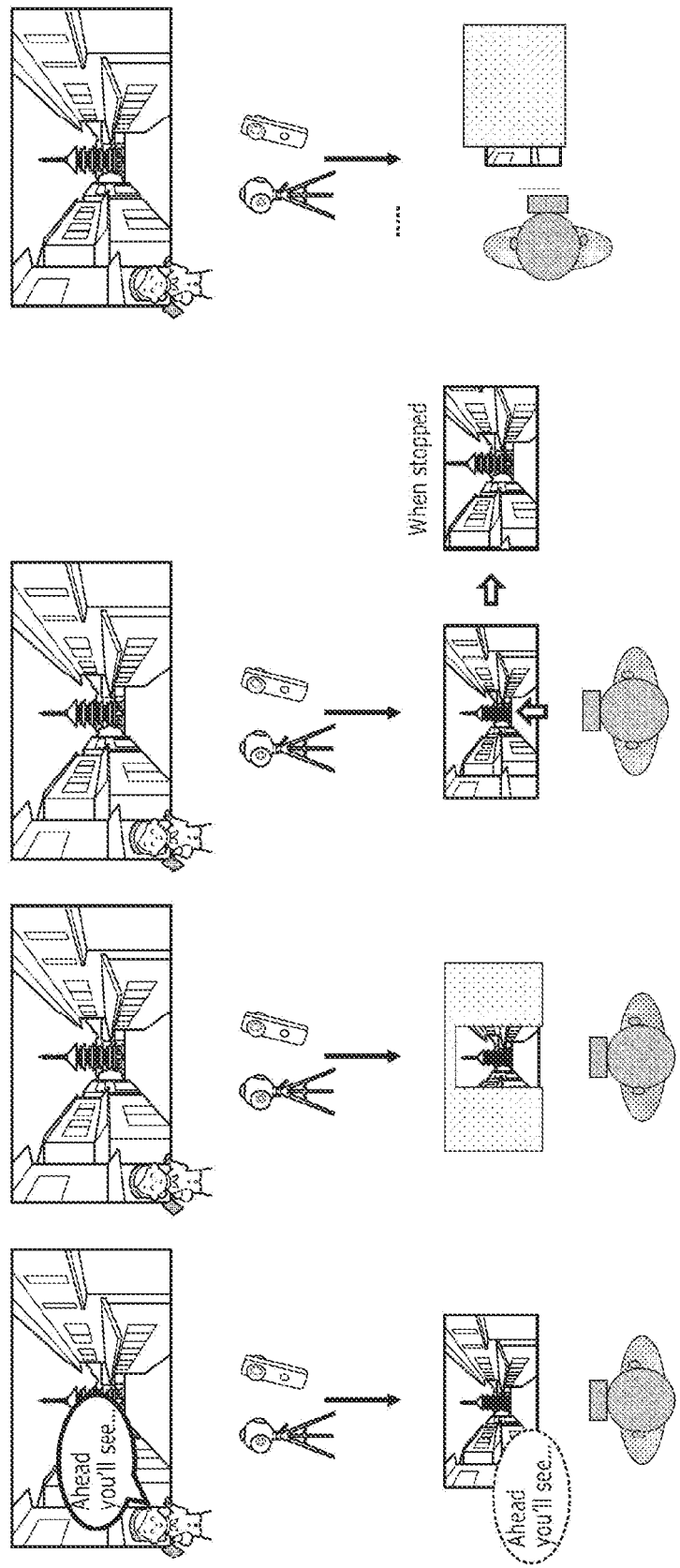
FIG. 33 illustrates the results of operations performed by the video display system according to one implementation example.

FIG. 33 illustrates the results of operations performed by the video display system according to one implementation example. The example in FIG. 33 illustrates a case in which the VR image is converted. More specifically, the position and orientation determination unit receives the position and orientation of the observation system or the guide or a target object as metadata, transmits this information to the VR control unit, and together with the position and orientation state of the VR system, the VR video is appropriately processed by the VR display control unit and displayed by the VR display unit.

For example, in the leftmost example in the figure, when the tour is stopped, a still image in the forward direction is shown. Next, the second example from the left shows how the movement direction is clarified and the field of view is narrowed by masking areas other than the movement direction just before the tour starts to move. Next, the third example from the left shows how the arrow appears before the tour starts to move and how the resolution of the video is reduced until the tour stops, or how the video stays still while the tour is moving. Next, the rightmost example shows how the masking changes depending on the orientation of the user of the VR system.

Next, an implementation example of a method for detecting direction and orientation will be described. As a method for detecting, recording, and transmitting absolute (static) orientation, orientation can be detected by compass function or GPS, and markers indicating orientation can be embedded in the video being captured. In addition to embedding a marker indicating the forward-facing position of 360° camera or a default position (for example, the center of the ERP video to be sent out is the front), (a) an orientation mark is embedded in the video itself, (b) an orientation mark is embedded in the header of the video, (c) the orientation is transmitted before the video is transmitted, (d) the orientation is transmitted as metadata periodically in the case of video. The orientation at which the photographer starts capturing may be stored as the home orientation, and the orientation may then be recorded or transmitted in terms of angles from that orientation. Buildings and scenery may also be used as markers.

However, as a method of detecting, recording, and transmitting relative orientation, the main guide or moderator can be defined, and the orientation can always be controlled according to the orientation relative to that person. In such a case, (a) detection by voice, (b) detection by the shape of a marker (for example, a tour guide flag), and (c) detection by light can be employed. Here, the direction and position relative to a marker such as a building or view may also be used.

More detailed information can be conveyed to the user of the VR system in accordance with the distance to the destination and the speed by changing the size of the graphics, the length of the arrows, the use of color, the intensity of the colors, the volume of the sound, the frequency of the sound, the length of the controller vibration, the vibration pattern, and the intensity of the vibration. For example, the arrow may be short when the distance is close and long when the distance is far, the arrow may be light in color when the distance is close and dark when the distance is far, the voice may be quiet when the distance is close and loud when the distance is far, the vibration of the controller may be weak when the distance is close and strong when the distance is far.

Figure 34:
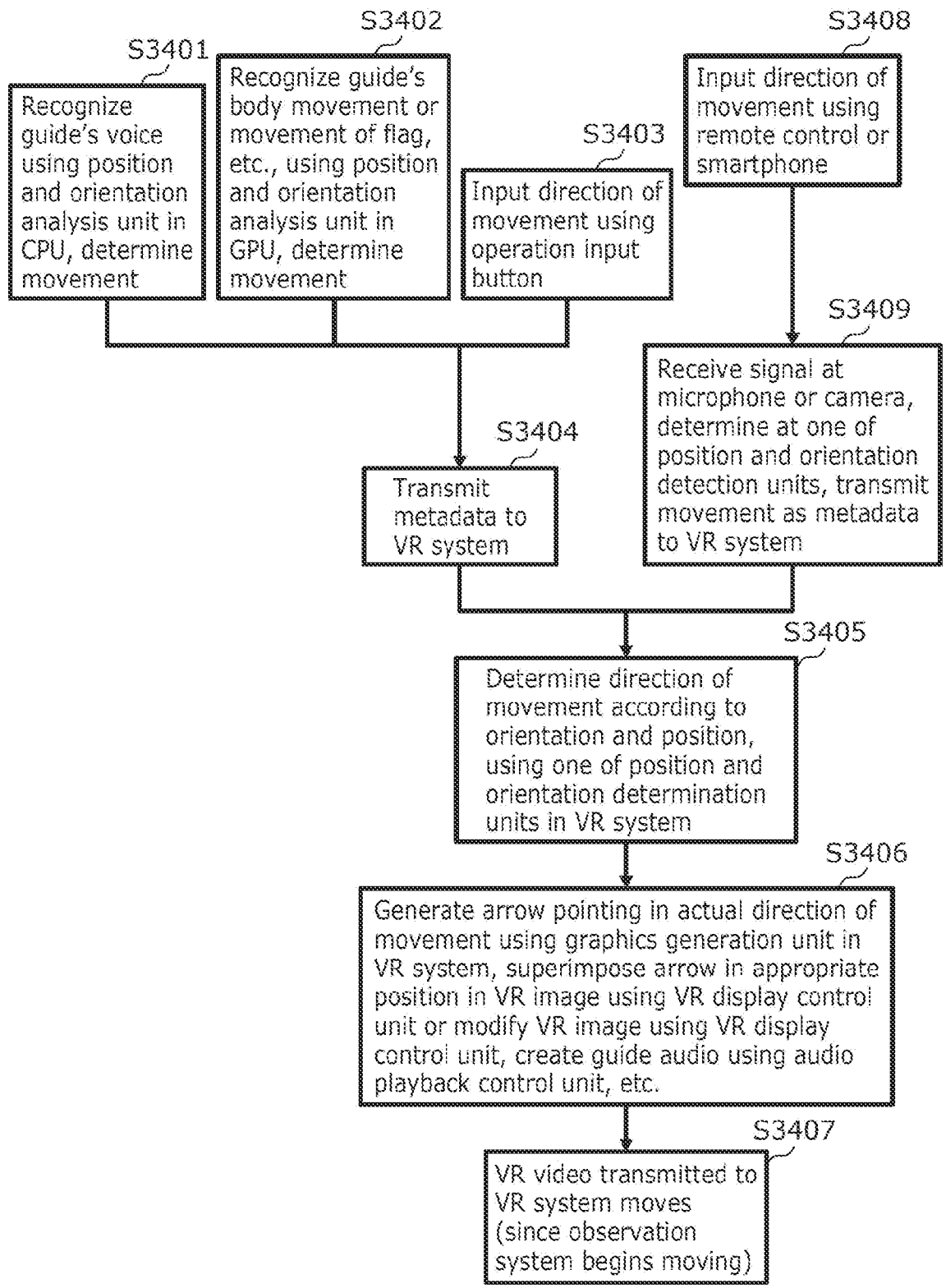
FIG. 34 illustrates one example of the flow of operations for detecting position and orientation information according to an implementation example.
Figure 35:
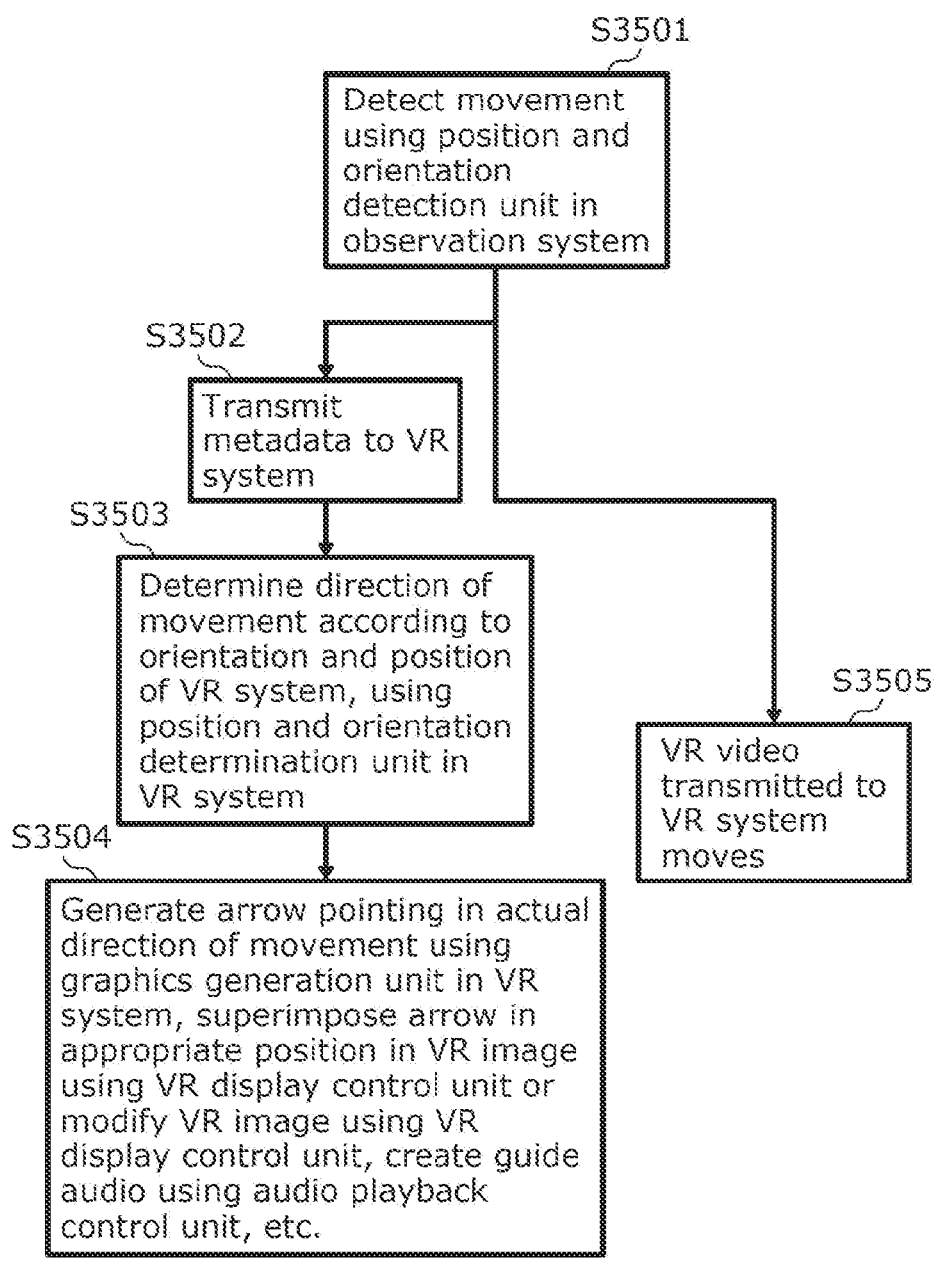
FIG. 35 illustrates one example of the flow of operations for detecting position and orientation information according to an implementation example.

FIG. 34 and FIG. 35 illustrate one example of the flow of operations for detecting position and orientation information according to an implementation example. One specific example of detecting orientation and position is, for example, doing so from a GPS device included in the observation system. The movement speed and direction (orientation) are detected using coordinates that change from moment to moment relative to the coordinates of the point where movement begins, and are recorded and transmitted as metadata. When processing is performed on the cloud side, GPS data may be sent as is or appropriately sampled. The movement direction (orientation) should be processed to vary smoothly by appropriate sampling, averaging over a given time, etc.

Another example is to detect the movement speed and direction from the movement of the scenery being captured by the observation system, and record and transmit this information as metadata. As one example, the direction of change is calculated from the captured data to detect the movement speed and direction. As another example, the movement speed and direction (orientation) are detected from a predetermined target such as a building or view.

Another example is that the photographer sets the movement direction to the observation system. As one example, the guide or the photographer moves using a switches or a remote control included in the observation system and sets the direction of the movement in the observation system, which is then transmitted as metadata. Accordingly, the switch close to the guide's hand, and the information may be transmitted to the observation system by modulating radio waves, audio or light appropriately, or in the case of light or audio, by recording it as it is in the video or audio that is sent to the VR system without doing any special processing in the observation system, and sending it to the VR system, whereby the VR system side can also determine the start and direction of movement. Similarly, a computer system in the cloud between the observation system and the VR system may detect the start and direction of movement and transmit it as metadata to the VR system.

As another example, the system determines the guide's hand gestures, voice, flag direction, etc., and when predetermined conditions are met by the observation system, the movement is assumed to start and the direction is transmitted as metadata. Accordingly, as above, the start and direction of movement may be detected by a computer system or VR system in the cloud. It is also possible for the guide or the photographer to perform a set or hand gesture or other action well before the change occurs so that the user of the VR system can be informed in advance.

Specific examples of recording and transmitting direction, orientation, and movement speed include, for example, recording and transmitting them as metadata separately from the video and audio to be transmitted to the VR system, or recording and transmitting them as markers such as arrows composited on the video to be transmitted to the VR system. However, it is assumed that all users of the VR system are in approximately the same state, and this is effective in cases such as when sending not only markers but also cockpit and window graphics, etc., because of the independence of the state of the users on the VR system side.

Another example would be to add a description of the direction, orientation, position, speed, etc., to the audio that is transmitted to the VR system. Again, the assumption is that all users of the VR system are in approximately the same state.

For example, the video and audio sent to the VR system may indicate direction and orientation through processing such as lowering the frame rate or resolution, or hiding part of the video. These processes may be performed by a computer system in the cloud between the observation system and the VR system and transmitted to the VR system, or performed on the VR system side.

FIG. 36 illustrates an example of the metadata structure according to an implementation example. Next, an example of metadata structure according to this implementation example will be given.

The metadata type is a default code or string that indicates that the metadata is the metadata according to the present invention. The version number is a number for when the metadata structure is changed. For example, major versions and minor versions are used, such as 0.81 (0081) during the evaluation phase, 0.92 (0092) during demonstration testing, and 1.0 (0100) during release. The concept is to guarantee compatibility across the same major version.

The function code, when 0, indicates that the information in the metadata is invalid; otherwise, it indicates the type of information in the metadata. For example, 0001 indicates that the format is to describe the position, movement direction, and speed of the reference position, camera, guide, and target. 0002 indicates graphics data, 0003 indicates information on the VR system, 0011 is 0001 with cue data sent from the observation system, 0021 comes with cue data and defines the target to be moved, etc.

The reference position is data for the position acting as a reference for the position data, and is predefined as a whole system, including units such as X (distance from east to west), Y (distance from north to south), Z (distance in height), or expressed in terms of latitude/longitude and altitude. A reference position of 0 indicates that the position at reset of the whole system is used as the reference. Whether the position of the camera and the position of the guide are absolute coordinates or relative to a reference position is determined in advance.

The movement direction and speed indicate the movement status of the observation system or guide, and if cue data is available, how it will move in the future.

The target count indicates the tourism destination to be visited in the case of VR tourism. A target count of 0 indicates no target.

The verification code is a code for verifying that the metadata data is not incorrect during transmission, and is, for example, a CRC.

The order of items, contents of items, and values of each metadata item may be different from this configuration example but have the same functionality.

Figure 37:
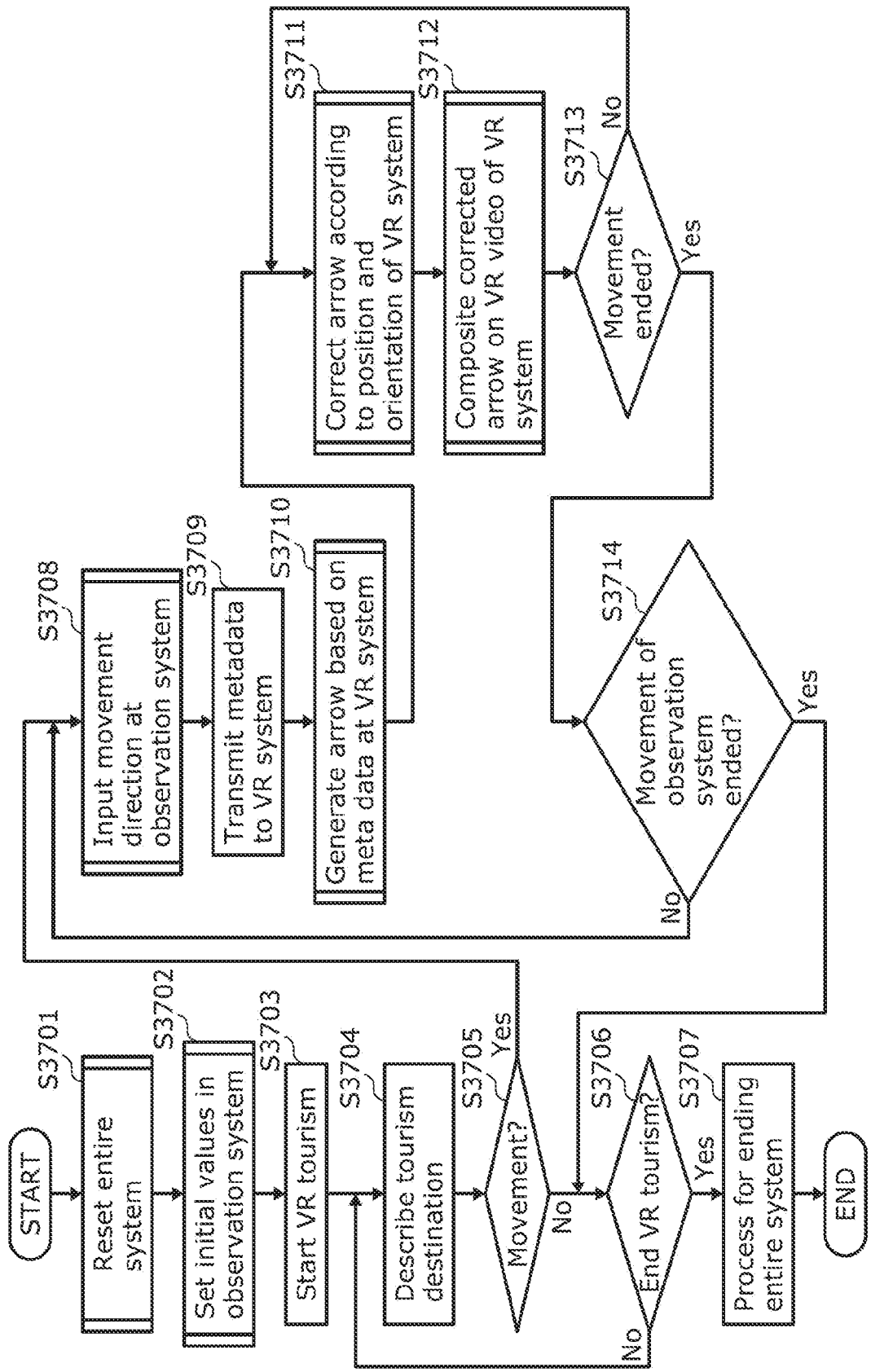
FIG. 37 illustrates a flow of operations related to the metadata according to an implementation example.
Figure 38:
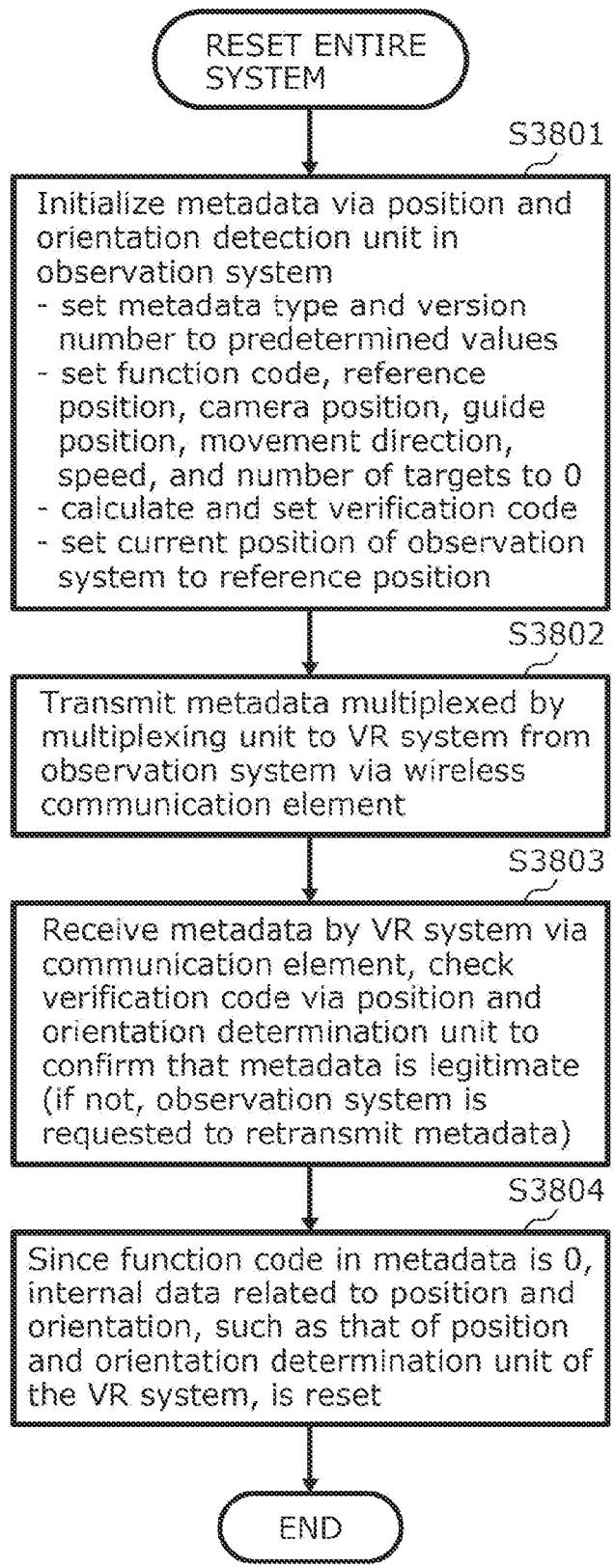
FIG. 38 illustrates a flow of operations related to the metadata according to an implementation example.
Figure 39:
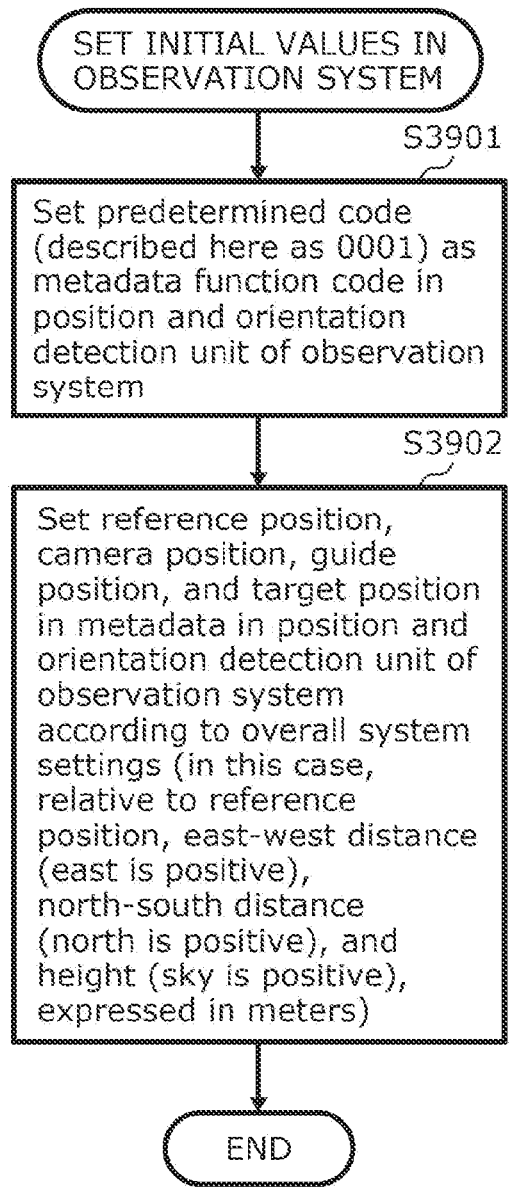
FIG. 39 illustrates a flow of operations related to the metadata according to an implementation example.
Figure 40:
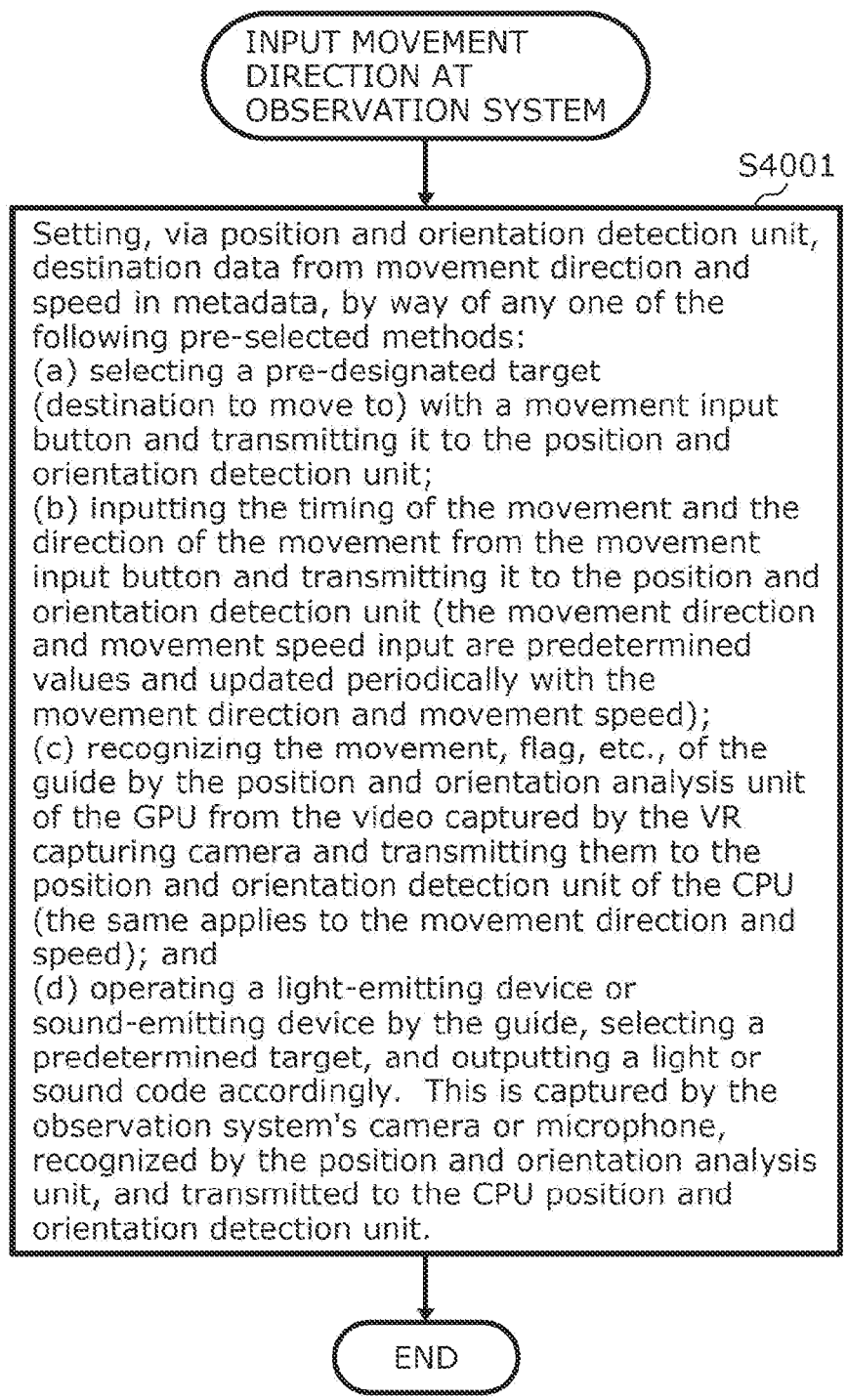
FIG. 40 illustrates a flow of operations related to the metadata according to an implementation example.
Figure 41:
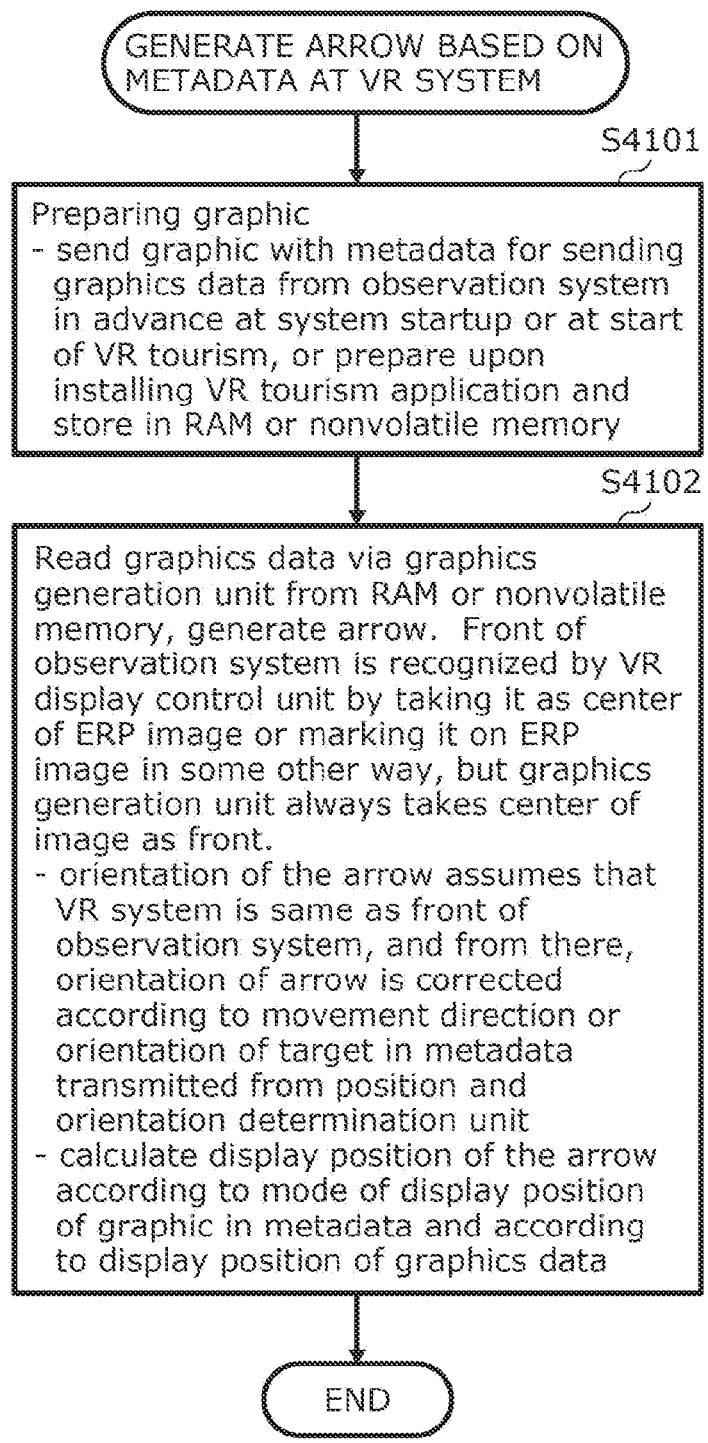
FIG. 41 illustrates a flow of operations related to the metadata according to an implementation example.
Figure 42:
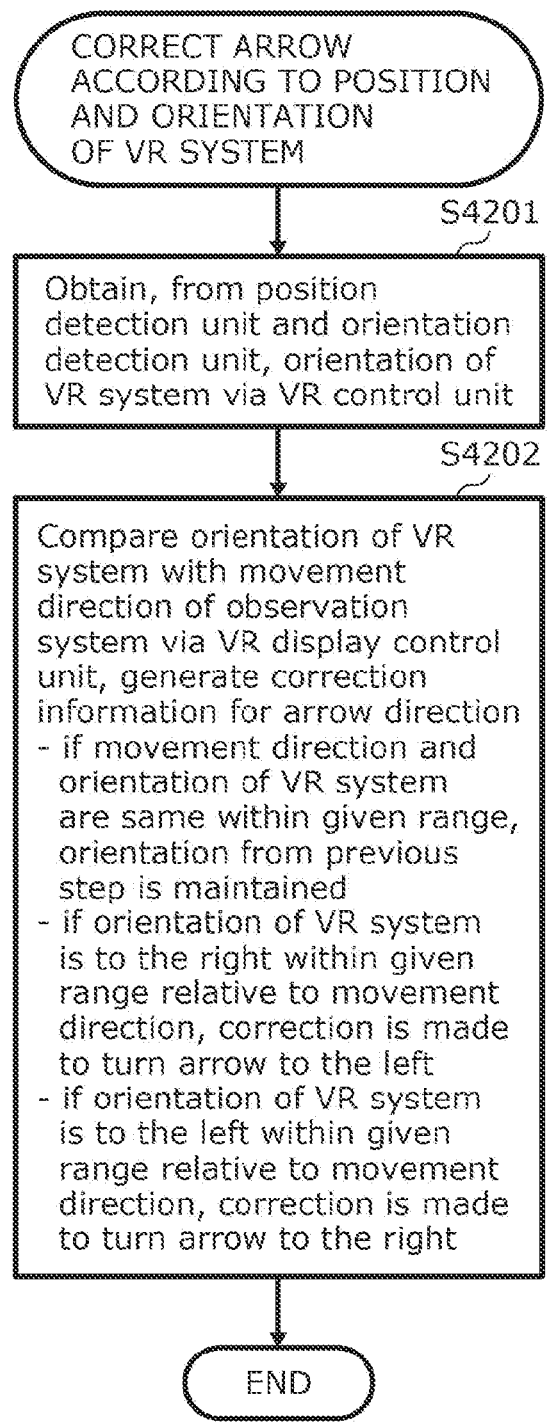
FIG. 42 illustrates a flow of operations related to the metadata according to an implementation example.
Figure 43:
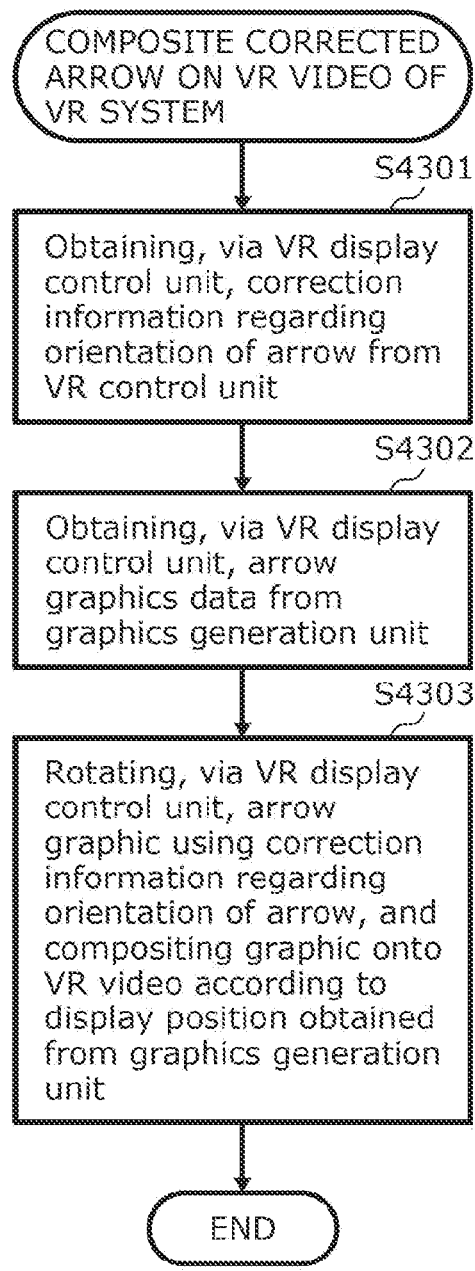
FIG. 43 illustrates a flow of operations related to the metadata according to an implementation example.

FIG. 37 illustrates a flow of operations related to the metadata according to an implementation example. FIG. 38 illustrates a flow of operations related to the metadata according to an implementation example. FIG. 39 illustrates a flow of operations related to the metadata according to an implementation example. FIG. 40 illustrates a flow of operations related to the metadata according to an implementation example. FIG. 41 illustrates a flow of operations related to the metadata according to an implementation example. FIG. 42 illustrates a flow of operations related to the metadata according to an implementation example. FIG. 43 illustrates a flow of operations related to the metadata according to an implementation example.

FIG. 38 through FIG. 43 each show a subflow in the flow of operations illustrated in FIG. 37. As illustrated in FIG. 37, firstly, the entire system is reset (S3701). Next, initial values are set in the observation system (S3702). Next, VR tourism is started (S3703). Next, a description of the tourism destination is given (S3704). Whether there is movement or not is then determined (S3705), and if there is no movement (No in S3705), whether the VR tourism has ended or not is further determined (S3706). If the VR tourism has not ended (No in S3706), the process returns to the description of the tourism destination (S3704). If the VR tourism has ended (Yes in S3706), the entire system is ended and the flow of operations ends.

However, if there is movement, the movement direction is input at the observation system (S3708). The metadata is then transmitted to the VR system (S3709), and the VR system generates an arrow based on the metadata (S3710). Next, the arrow is corrected according to the position and orientation of the VR system (S3711). The corrected arrow is composited on the VR video of the VR system (S3712) and whether the movement has ended is determined (S3713). If the movement has not ended (No in S3713), the VR system returns to correcting the arrow according to the position and orientation of the VR system (S3711).

If the movement has ended (Yes in S3713), whether movement of the observation system has ended is determined (S3714). If the movement of the observation system has ended (Yes in S3714), processing returns the determination of whether the VR tourism has ended (S3706). If the movement of the observation system has not ended (No in S3714), the processing returns to the input of the movement direction at the observation system (S3708).

As illustrated in FIG. 38, in resetting the entire system (S3701), the metadata is initialized in the position and orientation detection unit of the observation system (S3801). Here, the metadata type and version number are set to predetermined values, the function code, reference position, camera position, guide position, movement direction, speed, and number of targets is set to 0, the verification code is calculated and set, and the current position of the observation system is set to the reference position. The metadata multiplexed by the multiplexing unit is then transmitted to the VR system from the observation system via the wireless communication element (S3802). The metadata is then received by the VR system via the communication element, and the position and orientation determination unit checks the verification code to confirm that the metadata is legitimate (if it is not, it requests the observation system to retransmit the metadata) (S3803). Since the function code in the metadata is 0, internal data related to position and orientation, such as that of the position and orientation determination unit of the VR system, is reset (S3804) and the process is ended.

As illustrated in FIG. 39, in setting the initial values in the observation system (S3702), a predetermined code is set (described here as 0001) as the metadata function code in the position and orientation detection unit of the observation system (S3901). Then, the reference position, camera position, guide position, and target position are set in the metadata in the position and orientation detection unit of the observation system according to the overall system settings (in this case, relative to the reference position, the east-west distance (east is positive), the north-south distance (north is positive), and the height (sky is positive), expressed in meters) and the process is ended (S3902).

As illustrated in FIG. 40, in the inputting of the movement direction at the observation system (S3708), by way of any one of the following pre-selected methods, the position and orientation detection unit sets the destination data from the movement direction and speed in the metadata, and ends the processing (S4001). The pre-selected methods are: (a) selecting a pre-designated target (destination to move to) with a movement input button and transmitting it to the position and orientation detection unit; (b) inputting the timing of the movement and the direction of the movement from the movement input button and transmitting it to the position and orientation detection unit (the movement direction and movement speed input are predetermined values and updated periodically with the movement direction and movement speed); (c) recognizing the movement, flag, etc., of the guide by the position and orientation analysis unit of the GPU from the video captured by the VR capturing camera and transmitting them to the position and orientation detection unit of the CPU (the same applies to the movement direction and speed); and (d) operating a light-emitting device or sound-emitting device by the guide, selecting a predetermined target, and outputting a light or sound code accordingly. This is captured by the observation system's camera or microphone, recognized by the position and orientation analysis unit, and transmitted to the CPU position and orientation detection unit.

As illustrated in FIG. 41, the generation of an arrow according to metadata in the VR system (S3710) involves the preparation of a graphic (S4101), which is then sent with metadata for sending graphics data from the observation system in advance at system startup or at the start of VR tourism, or prepared upon installing the VR tourism application and stored in RAM or nonvolatile memory. The graphics generation unit then reads the above graphics data from RAM or nonvolatile memory to generate the arrow, and ends the process (S4102). The front of the observation system is recognized by the VR display control unit by taking it as the center of the ERP image or marking it on the ERP image in some other way, but the graphics generation unit always takes the center of the image as the front. The orientation of the arrow assumes that the VR system is the same as the front of the observation system, and from there, the orientation of the arrow is corrected according to the movement direction or orientation of the target in the metadata transmitted from the position and orientation determination unit, and the display position of the arrow is calculated according to the mode of the display position of the graphic in the metadata and according to the display position of the graphics data.

As illustrated in FIG. 42, in correcting the arrow according to the position and orientation of the VR system (S3711), the orientation of the VR system is obtained by the VR control unit from the position detection unit and the orientation detection unit (S4201). The VR display control unit then compares the orientation of the VR system with the movement direction of the observation system, generates correction information for the arrow direction, makes the correction, and ends the process (S4202). As a result, if the movement direction and the orientation of the VR system are the same within a given range, the orientation from the previous step is maintained; if the orientation of the VR system is to the right within a given range relative to the movement direction, a correction is made to turn the arrow to the left; if the orientation of the VR system is to the left within a given range relative to the movement direction, a correction is made to turn the arrow to the right, and if the orientation of the VR system is backward within a given range relative to the movement direction, a correction is made to point the arrow in the opposite direction.

As illustrated in FIG. 43, in the compositing of the corrected arrow into the VR video of the VR system (S3712), the VR display control unit obtains correction information regarding the orientation of the arrow from the VR control unit (S4301). The VR display control unit then obtains the arrow graphics data from the graphics generation unit (S4302). The VR display control unit then rotates the arrow graphic using the correction information regarding the orientation of the arrow, composites the graphic onto the VR video according to the display position obtained from the graphics generation unit, and ends the process (S4303).

FIG. 44 illustrates another example of the metadata structure according to an implementation example. For example, when graphics data and a still image are sent, the metadata is composed as illustrated in the figure. FIG. 45 illustrates yet another example of the metadata structure according to an implementation example. For example, if some functions are realized in the cloud, the metadata shown in the figure is composed if sending it from the VR system to the cloud computer.

Returning to FIG. 26, next, another configuration of an implementation example according to the present invention will be described. The implementation example illustrated in FIG. 26 illustrates not actual connections between the observation system in FIG. 27 and the VR system in FIG. 28 as functional blocks, but illustrate an integrated unit of the two systems, and the flow of data and control between the units.

In the observation system, the VR capturing camera in FIG. 27 called the VR capturing unit in FIG. 26. Similarly, the VR video processing unit is called by the same name; the VR video compression unit is called the VR compression unit; the microphone group, the microphone jack, the microphone amplifier, and the ADC are called the audio input unit; the audio compression unit is called by the same name; the movement input button is called the data input unit, the motion and position detection unit, position and orientation detection unit, the two position and orientation analysis units of the GPU and CPU are called the position and orientation detection unit; the multiplexing unit is called by the same name; the wireless communication element is called the communication unit; the demultiplexing unit is called by the same name; the audio decoding unit is called by the same name; and the DAC, the amplifier, the headphone jack, and the loudspeaker are called the audio output unit. The video system bus, the memory bus, the system bus, the I/O bus, the bus conversion, the RAM, the EEPROM, the SD card, the power supply switch, the power supply control element, the battery, the display element, the capture mode selection button, the zoom button, and the capture start/stop button are omitted from illustration because they are not directly related to the operations pertaining to the present invention.

In the VR system, the communication element in FIG. 28 is called the communication unit in FIG. 26. Similarly, the demultiplexing unit is called by the same name; the audio decoding unit is called by the same name; the audio playback control unit is called by the same name; the DAC, the amplifier, the loudspeaker, and the headphone jack are called the audio output unit; the VR video decoding unit is called by the same name; the graphics generation unit is called by the same name; the position and orientation determination units in the CPU and the GPU are called by the same names, the motion and position sensor and the movement and position detection unit are called the position detection unit and the rotation detection unit; the motion and position detection processing unit and the VR control unit are called the VR control unit; the VR display control unit is called by the same name; the video display processing unit, the display element, and the lens are called the VR video display unit; the microphone, the microphone amplifier, and the ADC are called the audio input unit; the audio compression unit is called by the same name; and the multiplexing unit is called by the same name. The video system bus, the memory bus, the system bus, the I/O bus, the bus conversion, the RAM, the EEPROM, the nonvolatile memory, the power supply switch, the power supply control element, the battery, the volume button, the AV output, the AV input, and the USB are omitted from illustration because they are not directly related to the operations pertaining to the present invention or are described as a single system. The wireless communication element is necessary for communication with the controller, but is omitted in FIG. 26 because the controller is omitted.

In Conventional Example 2, a data input unit and a position and orientation detection unit are added to the observation system, and metadata based on the position and orientation detected by the position and orientation detection unit is multiplexed by the multiplexing unit and transmitted to the VR system via the communication unit.

The position and orientation detection unit may use temporal changes in position and orientation to detect the movement of the observation system itself, or of a guide or target object. Alternatively, the operator of the observation system may input the direction and timing of the movement by means of a data input unit. Alternatively, the video information or audio information from the VR video processing unit or audio input unit may be used to detect movement or input of the direction or timing of the movement by the guide or operator (dashed lines).

In the VR system, the position and orientation determination unit has been added, and functions have been added to the VR control unit, the VR display control unit, and the graphics generation unit. The communication unit receives the communication information from the observation system, and the demultiplexing unit demultiplexes the metadata and transmits it to the position and orientation determination unit.

The position and orientation determination unit receives the position and orientation of the observation system or the guide or a target object as metadata, transmits this information to the graphics generation unit for displaying it as a graphic, and superimposes it on the VR video in the VR display unit. Alternatively, the position and orientation determination unit transmits this information to the VR control unit, and together with the position and orientation state of the VR system, the VR video is appropriately processed by the VR display control unit and displayed by the VR display unit. Alternatively, the position and orientation determination unit uses this information to generate guide audio and process the playback audio appropriately via the audio playback control unit.

The units of the observation system and the VR system may be realized via hardware or software, and may be implemented as additional applications in an existing observation system or VR system.

Furthermore, the position and orientation determination unit on the VR system side and the control of the VR video and audio thereby may be implemented by a computer system in part or in whole, such as a cloud-based computer system, between the VR system and the observation system. In such cases, the same process can be performed in one place, making it easy to provide the same advantageous effect to a plurality of VR systems at the same time, or to provide the advantageous effect of the present invention to existing systems.

Although not illustrated, it is possible to convey that the VR system is moving by vibrating a control unit (controller), etc., held by the operator of the VR system, or, if there are two or more controllers, to convey the movement direction via vibration with by selecting one controller and vibrating it, or to convey the movement speed by vibration by varying the strength of the vibration. Furthermore, when the controller is held in the hand and rotated around the body, the vibration can be made stronger to inform the user of the VR system of finer directions by making the vibration stronger when it is almost in line with the movement direction.

More specifically, two controllers can vibrate once at the same time to indicate a direction, and then one of the left and right controllers can vibrate to tell that it is right or left depending on the direction, two simultaneously vibrating strongly to tell that it is forward, and two simultaneously vibrating weakly to tell that it is back. However, the pattern of vibration is not limited to this example; other patterns are possible so long as they achieve the same effects.

The movement speed may be conveyed by a combination of graphics, such as by the color and size of the arrows, and may be conveyed by the loudness of the audio.

Figure 46:
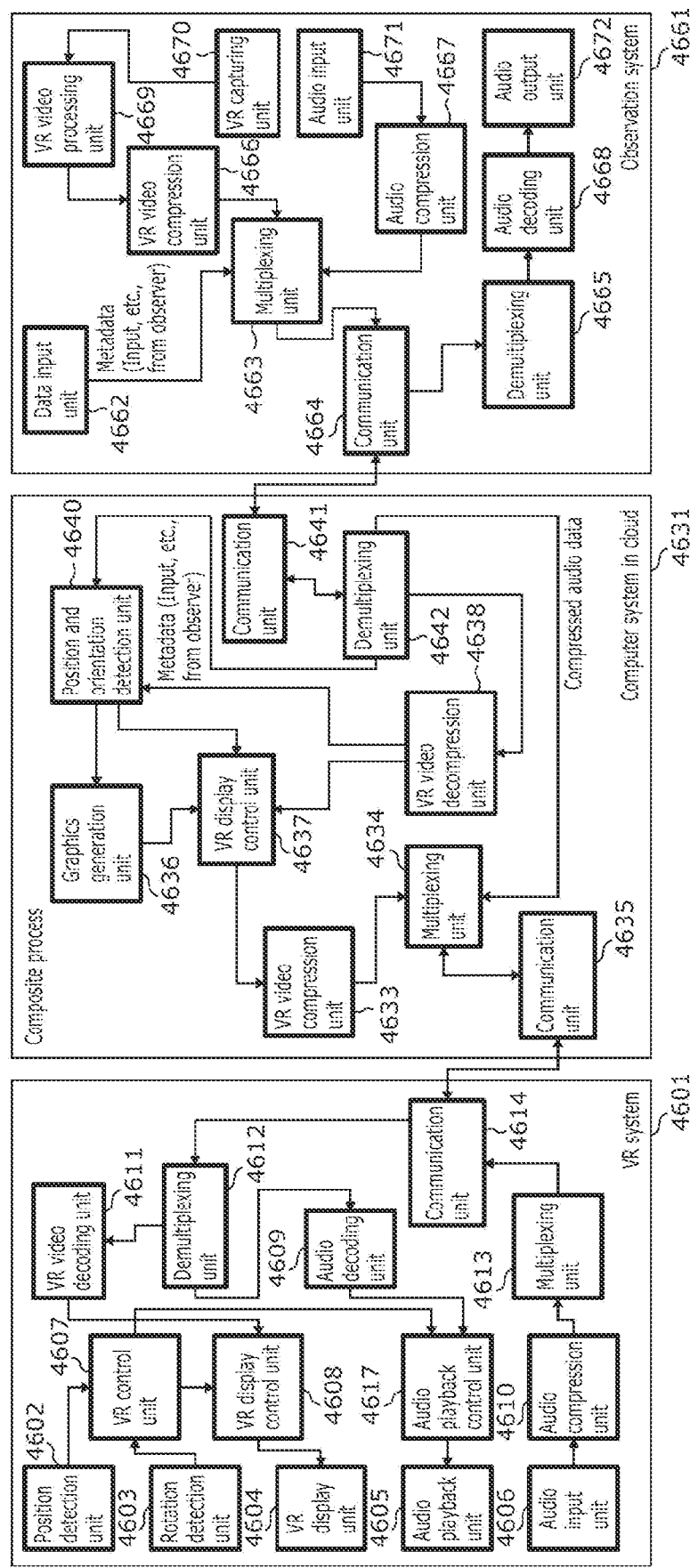
FIG. 46 is for illustrating an example of a configuration of the video display system according to an implementation example realized using the cloud.

FIG. 46 is for illustrating an example of a configuration of the video display system according to an implementation example realized using the cloud. As illustrated in FIG. 46, position and orientation detection unit 4640 of the observation system may be realized by computer system 4631, which is, e.g., cloud-based, between observation system 4661 and VR system 4601. In such cases, observation system 4661 does not send metadata indicating the direction, or the data input by the operator is sent out as metadata. Via position and orientation detection unit 4640, which is in the cloud, the position, orientation, or movement of observation system 4661, guide, or target is detected from the video, audio, or metadata sent from observation system 4661, and sent to VR system 4601 as metadata. This makes it possible to achieve the advantageous effect of this implementation example using existing 360° cameras.

Furthermore, the position and orientation determination unit on the VR system side and the control of the VR video and audio thereby may be implemented by a computer system, such as a cloud-based computer system 4631, between VR system 4601 and observation system 4661. In such cases, the same process can be performed in one place, making it easy to provide the same advantageous effect to a plurality of VR systems 4601 at the same time, or to provide the advantageous effect of the present invention to existing systems. However, to apply the direction and position of VR system 4601, it is necessary to send the position and direction of VR system 4601 from VR system 4601 to the cloud side, and it is necessary to provide a processing unit for each VR system 4601 on the cloud side.

The configuration in FIG. 46 is an example of a case where the position and orientation of VR system 4601 are not transmitted to the cloud side. In this case, it becomes difficult to display arrows or change the sound according to the position and orientation of VR system 4601, but VR display control unit 4608 can, according to the output of position and orientation detection unit 4640, change the resolution of the VR video, mask the video, change the sound position, etc.

Note that configurations not described above are omitted here since they can be referenced by way of similar configurations in FIG. 26. Position detection unit 4602, rotation detection unit 4603, VR display unit 4604, audio playback unit 4605, audio input unit 4606, VR control unit 4607, VR display control unit 4608, audio decoding unit 4609, audio compression unit 4610, VR video decoding unit 4611, demultiplexing unit 4612, multiplexing unit 4613, and communication unit 4614 included in VR system 4601, as well as VR video compression unit 4633, multiplexing unit 4634, communication unit 4635, graphics generation unit 4636, VR display control unit 4637, VR video decompression unit 4638, position and orientation detection unit 4640, communication unit 4641, and demultiplexing unit 4642 included in computer system 4631, as well as data input unit 4662, multiplexing unit 4663, communication unit 4664, demultiplexing unit 4665, VR video compression unit 4666, audio compression unit 4667, audio decoding unit 4668, VR video processing unit 4669, VR capturing unit 4670, audio input unit 4671, and audio output unit 4672 included in observation system 4661 respectively correspond one-to-one, many-to-one, one-to-many, or many-to-many to position detection unit 702, rotation detection unit 703, VR display unit 704, audio playback unit 705, audio input unit 706, VR control unit 707, VR display control unit 708, audio playback control unit 709, VR video decoding unit 710, position and orientation determination unit 2602, graphics generation unit 712, audio decoding unit 713, audio compression unit 714, demultiplexing unit 715, communication unit 716, multiplexing unit 717, communication unit 754, demultiplexing unit 755, VR video compression unit 756, multiplexing unit 2652, VR video processing unit 758, graphics generation unit 759, audio compression unit 760, audio decoding unit 761, VR capturing unit 762, audio input unit 763, audio output unit 764, data input unit 2652, and position and orientation determination unit 2653.

Figure 47:
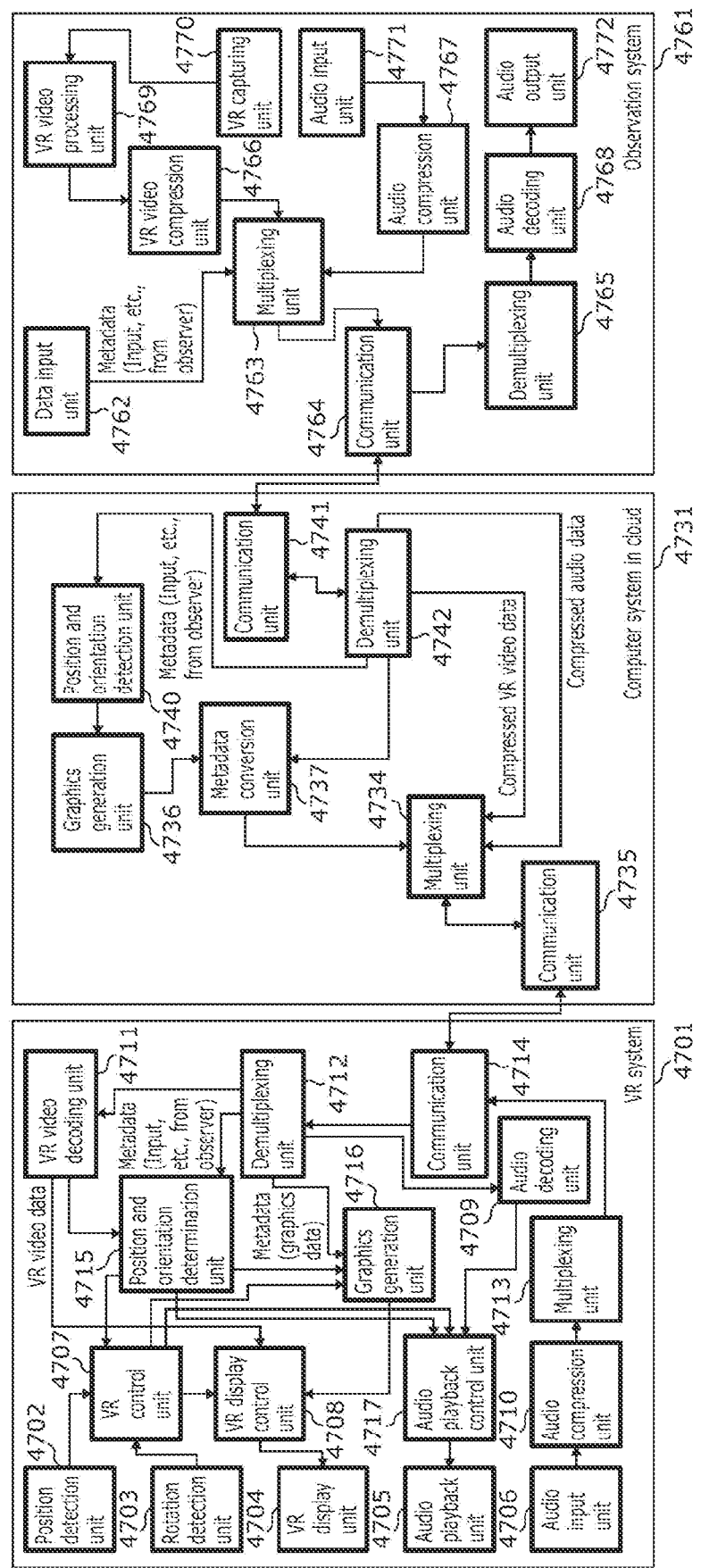
FIG. 47 is for illustrating an example of a configuration of the video display system according to an implementation example realized using the cloud.

FIG. 47 is for illustrating an example of a configuration of the video display system according to an implementation example realized using the cloud. In the configuration in FIG. 46, it was difficult to display arrows or change sound according to the position and orientation of the VR system, but in the configuration illustrated in FIG. 47, by including a position and orientation determination unit in the VR system, the position and orientation of the observation system are retrieved from metadata demultiplexed by the demultiplexing unit, a video of, for example, a helicopter and arrows are generated by the graphics generation unit based on the retrieved information, the generated video and arrows are converted by the metadata conversion unit into metadata along with the position and orientation information transmitted from the observation system, multiplexed by the multiplexing unit, and transmitted to the VR system.

In the VR system, a graphic is generated from the metadata demultiplexed by the demultiplexing unit, the position and orientation of the observation system and the position and direction of the VR system obtained from the position detection unit and the rotation detection unit are determined by the VR control unit, and the VR display control unit appropriately composites VR video and graphics or processes VR video, and the audio playback control unit changes the audio position or the content of the audio, thereby making it possible to output display and audio appropriate to the position and orientation of the VR system. Although not illustrated here, it is possible to inform the user of the VR system of the direction and position by controlling, such as vibrating, a controller of the VR system appropriately.

Note that configurations not described above are omitted here since they can be referenced by way of similar configurations in FIG. 26. Position detection unit 4702, rotation detection unit 4703, VR display unit 4704, audio playback unit 4705, audio input unit 4706, VR control unit 4707, VR display control unit 4708, audio decoding unit 4709, audio compression unit 4710, VR video decoding unit 4711, demultiplexing unit 4712, multiplexing unit 4713, and communication unit 4714, position and orientation determination unit 4715, graphics generation unit 4716, and audio playback control unit 4717 included in VR system 4701, as well as multiplexing unit 4734, communication unit 4735, graphics generation unit 4736, VR display control unit 4737, position and orientation detection unit 4740, communication unit 4741, and demultiplexing unit 4742 included in computer system 4731, as well as data input unit 4762, multiplexing unit 4763, communication unit 4764, demultiplexing unit 4765, VR video compression unit 4766, audio compression unit 4767, audio decoding unit 4768, VR video processing unit 4769, VR capturing unit 4770, audio input unit 4771, and audio output unit 4772 included in observation system 4761 respectively correspond one-to-one, many-to-one, one-to-many, or many-to-many to position detection unit 702, rotation detection unit 703, VR display unit 704, audio playback unit 705, audio input unit 706, VR control unit 707, VR display control unit 708, audio playback control unit 709, VR video decoding unit 710, position and orientation determination unit 2602, graphics generation unit 712, audio decoding unit 713, audio compression unit 714, demultiplexing unit 715, communication unit 716, multiplexing unit 717, communication unit 754, demultiplexing unit 755, VR video compression unit 756, multiplexing unit 2652, VR video processing unit 758, graphics generation unit 759, audio compression unit 760, audio decoding unit 761, VR capturing unit 762, audio input unit 763, audio output unit 764, data input unit 2652, and position and orientation determination unit 2653.

Figure 48:
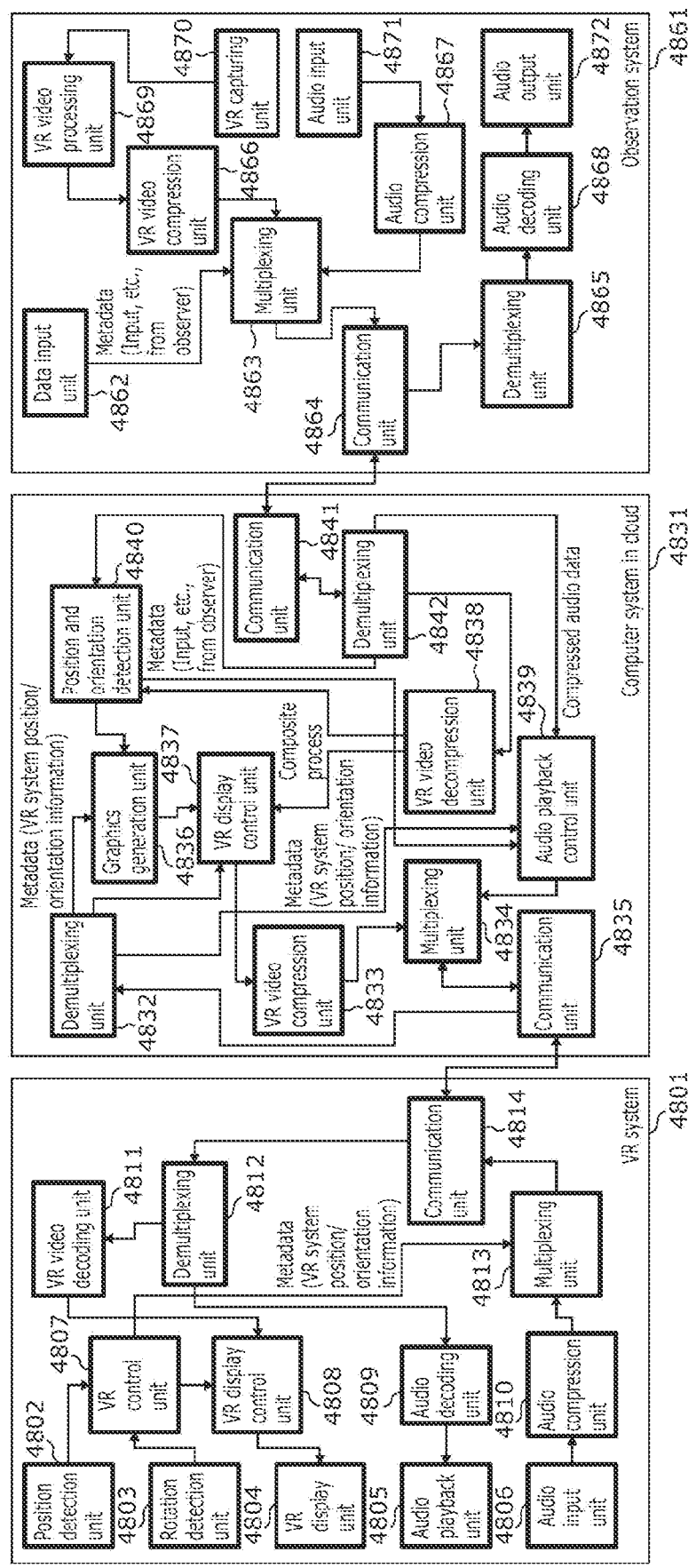
FIG. 48 is for illustrating an example of a configuration of the video display system according to an implementation example realized using the cloud.

FIG. 48 is for illustrating an example of a configuration of the video display system according to an implementation example realized using the cloud. In the configuration illustrated in FIG. 47, the VR system has the function of controlling graphics, VR video, sound, and controller vibration according to the position and orientation of the observation system and the position and orientation of the VR system, and providing appropriate information to the user of the VR system, but this requires providing the VR system with additional functions. The configuration illustrated in FIG. 48 can be similarly effective in a simple VR system by having these functions in the cloud.

The position and orientation information of the VR system detected by the position detection unit and rotation detection unit of the VR system is multiplexed with other information in the multiplexing unit as metadata, and is sent to the computer system in the cloud by the communication unit. This feature is included in most common VR systems.

In the cloud, the process is similar to the configuration in FIG. 47, and modified VR video and audio are sent out to the VR system. The units added to the configuration of FIG. 47 must be provided for each connected VR system, but in the cloud, these are realized via software, making them easy to implement. Vibrating the controller of a VR system is also common and less difficult.

Note that configurations not described above are omitted here since they can be referenced by way of similar configurations in FIG. 26. Position detection unit 4802, rotation detection unit 4803, VR display unit 4804, audio playback unit 4805, audio input unit 4806, VR control unit 4807, VR display control unit 4808, audio decoding unit 4809, audio compression unit 4810, VR video decoding unit 4811, demultiplexing unit 4812, multiplexing unit 4813, and communication unit 4814 included in VR system 4801, as well as demultiplexing unit 4832, VR video compression unit 4833, multiplexing unit 4834, communication unit 4835, graphics generation unit 4836, VR display control unit 4837, VR video decompression unit 4838, audio playback control unit 4839, position and orientation detection unit 4840, communication unit 4841, and demultiplexing unit 4842 included in computer system 4831, as well as data input unit 4862, multiplexing unit 4863, communication unit 4864, demultiplexing unit 4865, VR video compression unit 4866, audio compression unit 4867, audio decoding unit 4868, VR video processing unit 4869, VR capturing unit 4870, audio input unit 4871, and audio output unit 4872 included in observation system 4861 respectively correspond one-to-one, many-to-one, one-to-many, or many-to-many to position detection unit 702, rotation detection unit 703, VR display unit 704, audio playback unit 705, audio input unit 706, VR control unit 707, VR display control unit 708, audio playback control unit 709, VR video decoding unit 710, position and orientation determination unit 2602, graphics generation unit 712, audio decoding unit 713, audio compression unit 714, demultiplexing unit 715, communication unit 716, multiplexing unit 717, communication unit 754, demultiplexing unit 755, VR video compression unit 756, multiplexing unit 2652, VR video processing unit 758, graphics generation unit 759, audio compression unit 760, audio decoding unit 761, VR capturing unit 762, audio input unit 763, audio output unit 764, data input unit 2652, and position and orientation determination unit 2653.

Other Embodiments

Although the above description is based on embodiments and the like, the present disclosure is not limited to the above embodiments.

Although the above embodiments and the like give examples of elements included in the video display system, the functions of the elements included in the video display system may be assigned to a plurality of units included in the video display system in any way.

Furthermore, in the above embodiments, each element may be realized by executing a software program suitable or the element. Each element may be realized as a result of a program execution unit of a CPU or processor or the like reading and executing a software program recorded on a recording medium such as a hard disk or semiconductor memory.

Each element may be realized by hardware. For example, each element may be a circuit (or integrated circuit). These circuits may be configured as a single circuit as a whole and, alternatively, may be individual circuits. Moreover, these circuits may be general-purpose circuits and, alternatively, may be dedicated circuits.

General or specific aspects of the present disclosure may be realized as a system, a device, a method, an integrated circuit, a computer program, a computer readable recording medium such as a CD-ROM, or any given combination thereof.

Various modifications of the embodiments as well as embodiments resulting from arbitrary combinations of elements of different embodiments that may be conceived by those skilled in the art are intended to be included within the scope of the present disclosure as long as these do not depart from the essence of the present disclosure.

INDUSTRIAL APPLICABILITY

The present disclosure is useful in applications where the appropriate video is displayed on a display device.

REFERENCE SIGNS LIST 99 graphic
99a arrow
99b mask
100 display device
101 display unit
102 orientation detection unit
150 network
200 server device
201 reception unit
202 differential calculation unit
203 presentation unit
204 video generation unit
300 observation device
300a, 300b capturing device
301 capturing unit
302 input interface
303 position detection unit
304 data obtainment unit
305 metadata obtainment unit
306 transmission unit
500 video display system

The invention claimed is:

1. A video display system for displaying a display video via a display device, the video display system comprising:
an observation device including a capturing unit configured to capture a wide-angle video, a data obtainment unit configured to obtain data related to a movement direction of the capturing unit, a metadata composition unit configured to obtain metadata based on the data obtained, and a transmission unit configured to transmit, together with the metadata, the wide-angle video captured; and
a VR device including:
a reception unit configured to receive the wide-angle video and the metadata;
an orientation estimation unit configured to estimate an orientation of the display device;
a differential calculation unit configured to calculate a relative movement direction based on a difference between the orientation of the display device estimated and the movement direction of the capturing unit in the metadata, the relative movement direction being a movement direction of the capturing unit relative to the orientation of the display device;
a presentation unit configured to present the relative movement direction calculated to a user of the display device;
a video generation unit configured to generate, from the wide-angle video received, the display video including a portion corresponding to a viewing area corresponding to the orientation of the display device as estimated by the orientation estimation unit; and
the display device that displays the display video.

2. The video display system according to claim 1, wherein the presentation unit is configured to:
generate and output a graphic indicating the relative movement direction calculated; and
cause the video generation unit to superimpose the graphic onto the portion to present the relative movement direction.

3. The video display system according to claim 2, wherein the graphic displays an arrow indicating the relative movement direction on the display video.

4. The video display system according to claim 2, wherein the graphic displays, as a mask, an image for covering at least part of the display video other than a part corresponding to the relative movement direction of the mobile object.

5. The video display system according to claim 1, wherein
the orientation of the display device estimated is a discrete display direction that changes in units of a first discrete value based on an actual orientation of the display device, and
the differential calculation unit is configured to calculate a difference between the discrete display direction and the movement direction of the capturing unit in the metadata.

6. The video display system according to claim 5, wherein
the first discrete value varies from a minimum when the actual orientation of the display device and an inclination in a horizontal plane in the movement direction of the capturing unit in the metadata are coincident, to a maximum when a difference between the actual orientation of the display device and the inclination in the horizontal plane in the movement direction of the capturing unit in the metadata is a maximum.

7. The video display system according to claim 1, wherein
the movement direction of the capturing unit in the metadata is a discrete movement direction that changes in units of a second discrete value based on an actual orientation of the display device, and
the differential calculation unit is configured to calculate a difference between the orientation of the display device estimated and the discrete movement direction.

8. The video display system according to claim 1, wherein
the observation device includes an input interface for input by an operator who moves the capturing unit, and
the data obtainment unit is configured to obtain the data input by the operator via the input interface.

9. The video display system according to claim 1, wherein
the observation device includes a position detection unit configured to detect a position of the capturing unit, and
the data obtainment unit is configured to obtain the data based on the position of the capturing unit detected over time by the position detection unit.

10. The video display system according to claim 1, wherein
the capturing unit is configured to capture the wide-angle video as a virtual video by capturing video in a virtual image space constructed by computer graphics.

11. The video display system according to claim 1, further comprising
an information processing device that includes at least one of functions included in the observation device and the VR device, is connected to the observation device and the VR device over a network, and takes over one or more processes of the observation device or the VR device.

12. The video display system according to claim 11, wherein
the information processing device includes:
a reception unit configured to receive the wide-angle video and the data from the observation device;
a metadata composition unit configured to generate metadata based on the wide-angle video and the data;
a movement information calculation unit configured to calculate movement information related to movement of the capturing unit in the metadata;
a presentation unit configured to generate and output a graphic that indicates the movement information calculated and presents, to a user of the display device, the movement direction of the capturing unit by being superimposed on a portion of the wide-angle video that corresponds to a viewing area corresponding to the orientation of the display device estimated; and
a transmission unit configured to transmit the wide-angle video, the graphic, and the metadata.

13. The video display system according to claim 11, wherein
the information processing device includes:
a reception unit configured to receive the wide-angle video and the data from the observation device;
a metadata composition unit configured to generate metadata based on the wide-angle video and the data;
a movement information calculation unit configured to calculate movement information related to movement of the capturing unit in the metadata; and
a transmission unit configured to transmit the wide-angle video, the movement information, and the metadata.

14. The video display system according to claim 11, wherein
the information processing device includes:
a reception unit configured to receive the wide-angle video, the data, and data related to the orientation of the display device;
a metadata composition unit configured to generate metadata based on the wide-angle video, the data, and the data related to the orientation of the display device;
a differential calculation unit configured to calculate a relative movement direction based on a difference between the orientation of the display device and movement information related to movement of the capturing unit, the relative movement direction being a movement direction of the capturing unit relative to the orientation of the display device;
a presentation unit configured to generate and output a graphic that indicates the relative movement direction calculated and presents, to a user of the display device, the relative movement direction by being superimposed on a portion of the wide-angle video that corresponds to a viewing area corresponding to the orientation of the display device estimated; and
a transmission unit configured to transmit the wide-angle video, the graphic, and the metadata.

15. The video display system according to claim 11, wherein
the information processing device is provided in a cloud connected to a wide-area network, and is connected to the observation device and the VR device over the wide-area network.

16. An information processing method for displaying a display video on a display device, the method comprising:
receiving, from a capturing unit configured to capture a wide-angle video, the wide-angle video;
receiving metadata based on data related to a movement direction of the capturing unit;
estimating an orientation of the display device;
calculating and outputting, to the display device, a relative movement direction based on a difference between the orientation of the display device estimated and the movement direction of the capturing unit in the metadata, the relative movement direction being a movement direction of the capturing unit relative to the orientation of the display device; and
generating and outputting, to the display device, the display video including a portion corresponding to a viewing area corresponding to the orientation of the display device estimated from the wide-angle video received.

17. A non-transitory computer-readable recording medium having recorded thereon a computer program for causing a computer to execute the information processing method according to claim 16.

\* \* \* \* \*